US010263228B2

(12) United States Patent
Nishikawa et al.

(10) Patent No.: US 10,263,228 B2
(45) Date of Patent: Apr. 16, 2019

(54) ELECTRIC DEVICE INCLUDING SEALING MEMBER BETWEEN ATTACHMENT PART AND BATTERY PACK

(71) Applicant: HITACHI KOKI CO., LTD., Tokyo (JP)

(72) Inventors: Tomomasa Nishikawa, Hitachinaka (JP); Tetsuhiro Harada, Hitachinaka (JP); Chikai Yoshimizu, Hitachinaka (JP); Hiroyuki Hanawa, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 629 days.

(21) Appl. No.: 14/419,239

(22) PCT Filed: Jul. 16, 2013

(86) PCT No.: PCT/JP2013/004330
§ 371 (c)(1),
(2) Date: Feb. 2, 2015

(87) PCT Pub. No.: WO2014/027439
PCT Pub. Date: Feb. 20, 2014

(65) Prior Publication Data
US 2015/0214520 A1 Jul. 30, 2015

(30) Foreign Application Priority Data

Aug. 14, 2012 (JP) ................... 2012-179676
Aug. 14, 2012 (JP) ................... 2012-179677
(Continued)

(51) Int. Cl.
B25F 5/02 (2006.01)
H01M 2/10 (2006.01)

(52) U.S. Cl.
CPC ............. *H01M 2/1055* (2013.01); *B25F 5/02* (2013.01); *H01M 2/1022* (2013.01); *H01M 2/1094* (2013.01); *H01M 2220/30* (2013.01)

(58) Field of Classification Search
CPC ............. H01M 2/1022; H01M 2/1055; H01M 2/1094; B25F 5/02
(Continued)

(56) References Cited

U.S. PATENT DOCUMENTS 8,733,471 B2    5/2014   Nagasaka et al.
2004/0081883 A1* 4/2004  Mooty ................... B23D 51/01
                                                      429/96
(Continued)

FOREIGN PATENT DOCUMENTS

CN    1813364 A     8/2006
CN    101842921 A   9/2010
(Continued)

OTHER PUBLICATIONS

Machine translation of JP H0216563 U, Feb. 1990 (Year: 1990).*
(Continued)

*Primary Examiner* — Sean P Cullen
(74) *Attorney, Agent, or Firm* — McDermott Will & Emery LLP

(57) ABSTRACT

The sealing property obtained when a battery pack is attached to an electric power tool is improved. An electric power tool to/from which a battery pack retaining a battery cell is attachable/detachable has: a tool main body being provided with an attachment part to/from which the battery pack is attached/detached; a guide groove which is provided in the attachment part and which determines a direction of the attachment/detachment of the battery pack; a device-side terminal which is provided in the attachment part and which is connected to a battery-side terminal provided in the
(Continued)

battery pack; and a seal member which is provided in the attachment part and which seals a connecting part between the battery-side terminal and the device-side terminal.

7 Claims, 52 Drawing Sheets

(30) Foreign Application Priority Data

Oct. 31, 2012 (JP) ................................ 2012-240266
Nov. 29, 2012 (JP) ................................ 2012-260602

(58) Field of Classification Search
USPC ........................................................ 429/100
See application file for complete search history.

(56) References Cited

U.S. PATENT DOCUMENTS

| | | | |
|---|---|---|---|
| 2012/0045678 A1* | 2/2012 | Hayashi | H01M 2/1022 429/100 |
| 2012/0048587 A1 | 3/2012 | Umemura et al. | |
| 2012/0073847 A1* | 3/2012 | Nagasaka | B25F 5/02 173/217 |
| 2012/0208048 A1* | 8/2012 | Ogura | H01M 2/1022 429/7 |
| 2012/0292070 A1* | 11/2012 | Ito | H02K 5/225 173/217 |
| 2014/0190718 A1 | 7/2014 | Nagasaka et al. | |

FOREIGN PATENT DOCUMENTS

| | | | |
|---|---|---|---|
| CN | 102398252 A | | 4/2012 |
| CN | 102416616 A | | 4/2012 |
| JP | S62-024981 A | | 2/1987 |
| JP | 02-16563 U | | 2/1990 |
| JP | H0216563 U | * | 2/1990 |
| JP | 2002-254356 A | | 9/2002 |
| JP | 2012-081576 A | | 4/2012 |

OTHER PUBLICATIONS

Japanese Office Action issued in Application No. 2012-240266 dated Jul. 4, 2016, with English translation.
Japanese Office Action issued in Application No. 2012-260602 dated Apr. 26, 2016, with English translation.
Chinese Office Action issued in Application No. 201380042499.6 dated Dec. 8, 2016, with English translation.
Declaration of Non-Establishment of International Search Report and Written Opinion issued in International Application No. PCT/JP2013/004330 dated Oct. 23, 2013.
Chinese Office Action issued in Application No. 2013800424996 dated Mar. 20, 2017, with English translation.
Japanese Office Action issued in Application No. 2012-179676 dated Aug. 4, 2015, with English translation.
Japanese Office Action issued in Application No. 2012-179677 dated Aug. 4, 2015, with English translation.
Chinese Office Action issued in Chinese Application No. 201380042499.6 dated Nov. 20, 2015.

* cited by examiner

ELECTRIC DEVICE INCLUDING SEALING MEMBER BETWEEN ATTACHMENT PART AND BATTERY PACK

RELATED APPLICATIONS

This application is the U.S. National Phase under 35 U.S.C. § 371 of International Application No. PCT/JP2013/004330, filed on Jul. 16, 2013, which in turn claims the benefit of Japanese Application No. 2012-179676, filed on Aug. 14, 2012; Japanese Application No. 2012-179677, filed on Aug. 14, 2012; Japanese Application No. 2012-240266, filed on Oct. 31, 2012 and Japanese Application No. 2012-260602, filed on Nov. 29, 2012, the disclosures of which are incorporated by reference herein.

TECHNICAL FIELD

The present invention relates to an electric device to/from which a battery pack is attachable/detachable, relates to the battery pack which is attachable/detachable to/from the electric device, and relates to an electric apparatus configured by combining the electric device and the battery pack.

BACKGROUND ART

Conventionally, an electric device to/from which a battery pack is attached/detached and the battery pack configured to be attachable/detachable to/from the electric device have been known, and examples of the electric device and the battery pack are described in Patent Literature 1. An electric device described in Patent Literature 1 includes: a hollow tool main body; a hammer case fixed to an open end of the tool main body; and a grip provided continuously from the tool main body. Also, a preferred aim of the electric device described in Patent Literature 1 is to ensure a sealing property, and Patent Literature 1 describes providing elastic rubber at an insertion port for the battery pack in the grip by a double-layered molding process.

CITATION LIST

Patent Literature

PTL 1: Japanese Patent Application Laid-Open Publication No. 2002-254356

SUMMARY OF INVENTION

Technical Problem

Incidentally, there is a configuration in which the battery pack and the grip are moved in a direction of intersecting them with a protruding direction of the grip upon the attachment/detachment of the battery pack to/from the grip of the electric device. However, in the configuration described in Patent Literature 1 for ensuring the sealing property, the direction of movement of the battery pack and the grip for attaching the battery pack to the insertion port is not described. Therefore, even when the structure described in Patent Literature 1 is used in an electric device having the configuration in which the battery pack and the grip are moved in the direction of intersecting them with the protruding direction of the grip so that the battery pack is attached to the grip, there is a possibility that a sufficient sealing property is not obtained.

A preferred aim of the present invention is to improve the sealing property of the electric device to which the battery pack is attached, to improve the sealing property of the battery pack attached to the electric device, and to improve the sealing property of the electric apparatus.

Solution to Problem

An electric device of an embodiment is an electric device to/from which a battery pack retaining a battery cell is attachable/detachable, and the electric device includes: a device main body which is provided with an attachment part to/from which the battery pack is attached/detached; a guide part which is provided on the attachment part and which determines a direction of the attachment/detachment of the battery pack; a device-side terminal which is provided on the attachment part and which is connected to a battery-side terminal provided on the battery pack; and a seal member which is provided on the attachment part and which seals a connecting part between the battery-side terminal and the device-side terminal.

An electric device of another embodiment is an electric device to/from which a battery pack retaining a battery cell is attachable/detachable, and the electric device includes: a device main body which is provided with an attachment part to/from which the battery pack is attached/detached; a terminal holder which is provided on the attachment part; and a device-side terminal which is provided on the terminal holder and which is connected to a battery-side terminal provided on the battery pack, and a seal member which seals a connecting part between the battery-side terminal and the device-side terminal is interposed between the attachment part and the terminal holder.

A battery pack of another embodiment is a battery pack which retains a battery cell and which is attachable/detachable to/from an electric device, and the battery pack includes: a housing case which houses the battery cell; a battery-side terminal which is provided inside the housing case and which is connected to a device-side terminal provided on the electric device; a terminal insertion hole which is formed in the housing case, through which inside and outside of the housing case communicate to each other, and into which the battery-side terminal is inserted; and a seal member which is provided in a periphery of the terminal insertion hole in the housing case and which is in contact with the electric device.

An electric apparatus of another embodiment is an electric device including a battery pack retaining a battery cell and an electric device to/from which the battery pack is attachable/detachable, the battery pack includes a battery-side terminal, and the electric device includes: a device main body which is provided with an attachment part to/from which the battery pack is attached/detached; a guide part which is provided on the attachment part and which determines a direction of the attachment/detachment of the battery pack; a device-side terminal which is provided on the attachment part and which is connected to a battery-side terminal provided on the battery pack; and a seal member which is provided on the attachment part and which seals a connecting part between the battery-side terminal and the device-side terminal.

An electric apparatus of another embodiment is an electric apparatus including a battery pack retaining a battery cell and an electric device to/from which the battery pack is attachable/detachable, the electric device includes a device-side terminal, and the battery pack includes: a housing case which houses the battery cell; a battery-side terminal which is provided inside the housing case and which is connected to the device-side terminal; a terminal insertion hole which is formed in the housing case, through which inside and outside of the housing case communicate to each other, and into which the battery-side terminal is inserted; and a seal member which is provided in a periphery of the terminal insertion hole in the housing case and which is in contact with the electric device.

An electric device of another embodiment is an electric device which includes a device main body and in which a battery pack retaining a battery cell is attachable/detachable to/from the device main body, the device main body is provided with a seal member which is in contact with the battery pack to be attached thereto, and the seal member is formed to have an endless shape on an abutting part opposed to the battery pack in the device main body.

A battery pack of another embodiment is a battery pack which retains a battery cell and which includes a retaining case attachable/detachable to/from an electric device, the retaining case includes a seal member which is in contact with the electric device upon the attachment of the retaining case to the electric device, and the seal member is formed to have an endless shape on an abutting part opposed to the electric device in the retaining case.

An electric apparatus of another embodiment is an electric apparatus including a battery pack retaining a battery cell and an electric device in which the battery pack is attachable/detachable to/from a device main body, the device main body includes a seal member which is in contact with the battery pack, and the seal member is formed to have an endless shape on an abutting part opposed to the battery pack in the device main body.

An electric apparatus of another embodiment is an electric apparatus including a battery pack which is provided with a retaining case for retaining a battery cell and an electric device in which the retaining case is attachable/detachable to/from a device main body, the retaining case includes a seal member which is in contact with the electric device upon the attachment of the retaining case to the electric device, and the seal member is formed to have an endless shape on an abutting part opposed to the electric device in the retaining case.

An electric device of another embodiment is an electric device provided with a device main body including: an attachment part to/from which a battery pack including a battery-side terminal connected to a battery cell is attachable/detachable; and a device-side retaining member which is provided on the attachment part and which retains a device-side terminal connected to the battery-side terminal, the device-side retaining member and the attachment part include engagement parts to be engaged with each other, and a seal member which is in contact with the device-side retaining member and the attachment part is provided at a position except for a position at which the engagement parts are provided.

The electric device of another embodiment is an electric device provided with a device main body to/from which a battery pack including a battery-side terminal connected to a battery cell is attachable/detachable and which includes a device-side terminal connected to the battery-side terminal, a seal member which prevents foreign substances from entering a connecting part between the battery-side terminal and the device-side terminal from the battery pack and the device main body in a state in which the battery pack is attached to the device main body.

Another electric device is an electric device including a battery pack and a device main body to/from which the battery pack is attached/detached, the battery pack includes: a housing case which houses a battery cell; a battery-side terminal which is connected to the battery cell; a retaining member which is provided inside the housing case and which retains the battery-side terminal; and a terminal insertion hole which is provided in the housing case and into which the battery-side terminal is inserted, the electric device including: a terminal holder provided on the device main body; a device-side terminal which is provided on the terminal holder and which is connected to the battery-side terminal upon the attachment of the battery pack to the device main body; a sealing target space which is formed between the battery pack and the device main body upon the attachment of the battery pack to the device main body and in which the battery-side terminal and the device-side terminal are arranged; a first seal member which seals a part between the device main body and the terminal holder; and a second seal member which is provided between the housing case and the retaining member.

An electric device of another embodiment is an electric device in which a battery pack retaining a battery cell is attachable/detachable to/from an electric-device main body, and the electric device includes: a seal member which is provided between the electric-device main body and the battery pack and which is provided on either one member of the electric-device main body or the battery pack; a guide mechanism which is provided on the electric-device main body and the battery pack and which regulates a direction of relative movement of the electric-device main body and the battery pack upon the attachment/detachment of the battery pack to/from the electric-device main body; and a contact preventing mechanism which prevents the seal member from being in contact with either of the other member of the electric-device main body or the battery pack upon the relative movement of the electric-device main body and the battery pack.

An electric device of another embodiment is an electric device in which a battery pack is attachable/detachable to/from an electric-device main body, a seal member which is provided between the electric-device main body and the battery pack; and a guide mechanism which is provided on the electric-device main body and the battery pack and which regulates a direction of relative movement of the electric-device main body and the battery pack upon the attachment/detachment of the battery pack to/from the electric-device main body, and the guide mechanism causes the electric-device main body and the battery pack to approach each other upon the attachment of the battery pack to the electric-device main body.

Advantageous Effects of Invention

According to the electric device of the present invention, upon the attachment of the battery pack retaining the battery cell to the attachment part, the connecting part between the battery-side terminal and the device-side terminal can be sealed by a seal member. Therefore, the entering of the foreign substances into the connecting part between the battery-side terminal and the device-side terminal can be suppressed.

DESCRIPTION OF EMBODIMENTS

First Embodiment

Figure 1:
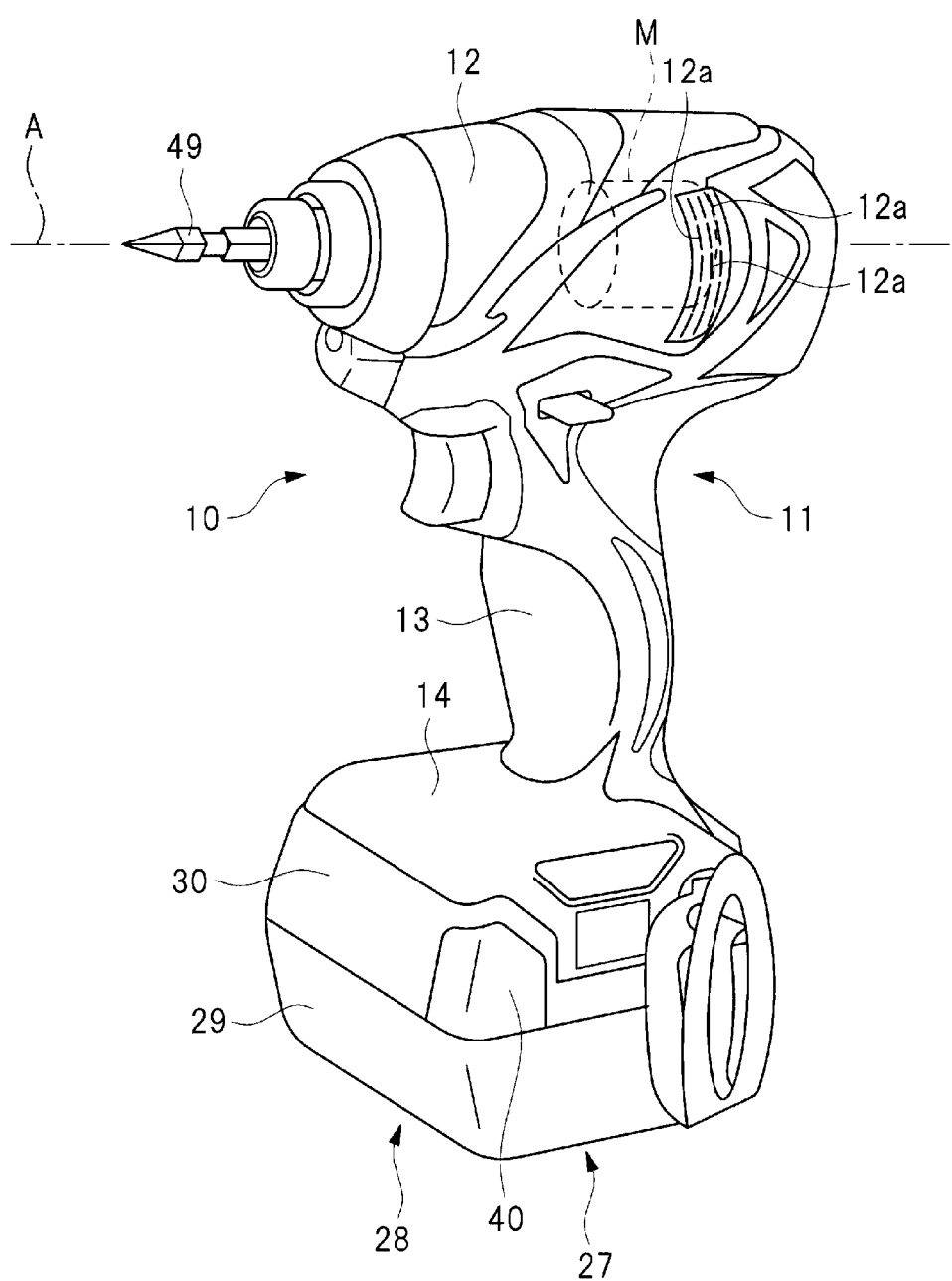
FIG. 1 is a perspective view illustrating a state in which an electric power tool according to a first embodiment of the present invention has been assembled.

Hereinafter, embodiments of an electric apparatus, an electric device, and a battery pack of the present invention will be explained in detail with reference to drawings. The following embodiments will be explained by taking an electric power tool included in the electric device as an example. An electric power tool 10 illustrated in FIGS. 1 and 2 has a tool main body 11, which has been molded by using a resin material. The tool main body 11 has a casing 12, a grip 13, and an attachment part 14. The casing 12 is formed in a tubular shape, and an electric motor M is provided inside the casing 12. The electric motor M has a rotation shaft, which rotates around an axis line A. And, a tip tool 49 is configured at an end of the casing 12 to be attachable/detachable thereto/therefrom. Further, a motive-power transmitting mechanism, which transmits the motive power of the electric motor M to the tip tool 49, is provided inside the casing 12. The motive-power transmitting mechanism has at least one of structures among a structure in which the rotary motion of the rotation shaft of the electric motor M is converted into rotary motion of the tip tool 49 and a structure in which the rotary motion of the electric motor M is converted into reciprocating motion of the tip tool 49. The tip tool 49 moves in the rotary motion or in the reciprocating motion with centering the axis line A. That is, as the electric power tool 10, a drill, a driver, a hammer, a hammer drill, a hammer driver, and others are included.

Figure 3:
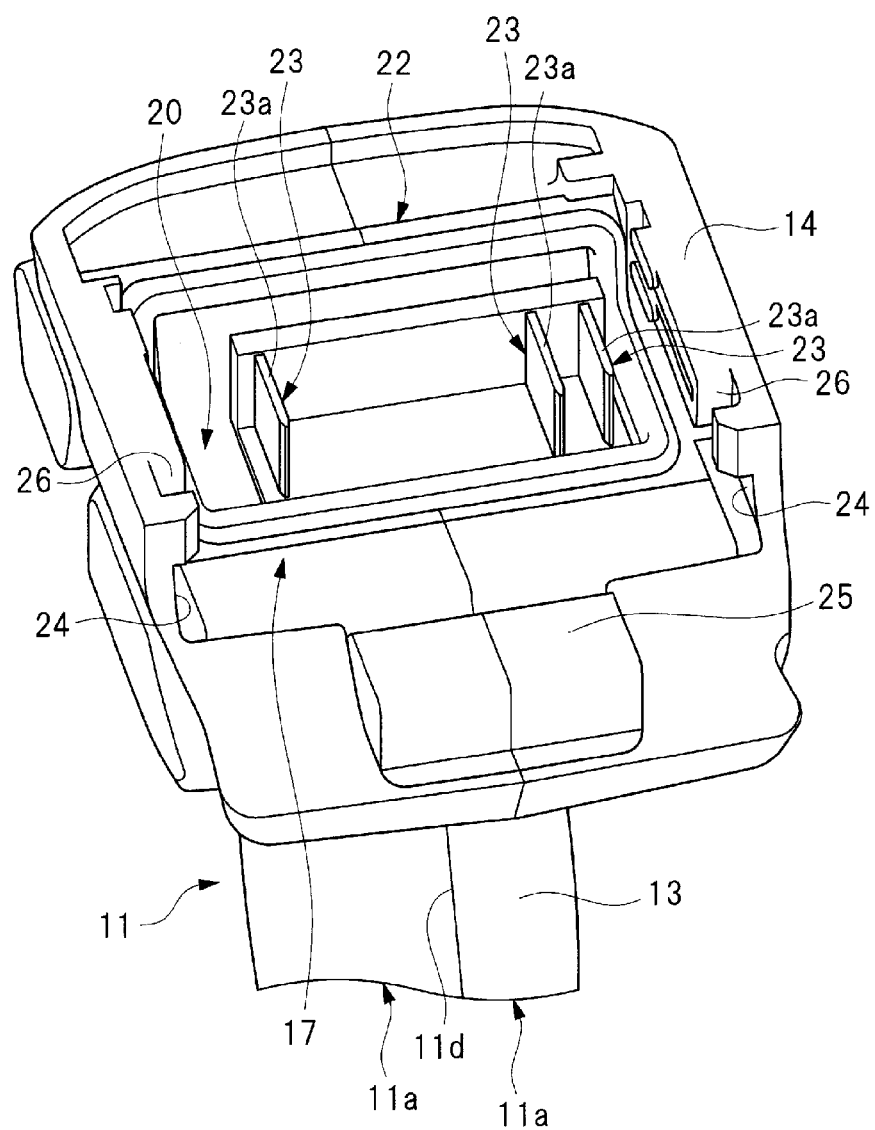
FIG. 3 is a perspective view illustrating an attachment part of the electric power tool of FIG. 1.

Also, the grip 13 is formed continuously from the casing 12 and is protruded from the casing 12 in a predetermined direction. The protruding direction of the grip 13 is a direction which intersects with the axis line A in a plane including the axis line A. A circuit board, which is electrically connected to the electric motor M, is provided inside the grip 13. The attachment part 14 is provided at an end of the grip 13 in the protruding direction thereof. The casing 12, the grip 13, and the attachment part 14 are integrally molded by using a resin material or others. Also, as illustrated in FIG. 3, the tool main body 11 has two constituent pieces 11a divided along a dividing surface 11d, and the tool main body 11 is assembled by coupled and fixed the two constituent pieces 11a to each other. The axis line A is positioned inside the dividing surface 11d, and the dividing surface 11d is positioned over the casing 12, the grip 13, and the attachment part 14. Also, the two constituent pieces 11a have shapes and configurations substantially bilaterally symmetrical with each other across the dividing surface 11d. That is, the casing 12, the grip 13, and the attachment part 14 have shapes and structures bilaterally symmetrical with each other across the dividing surface 11d.

Figure 4:
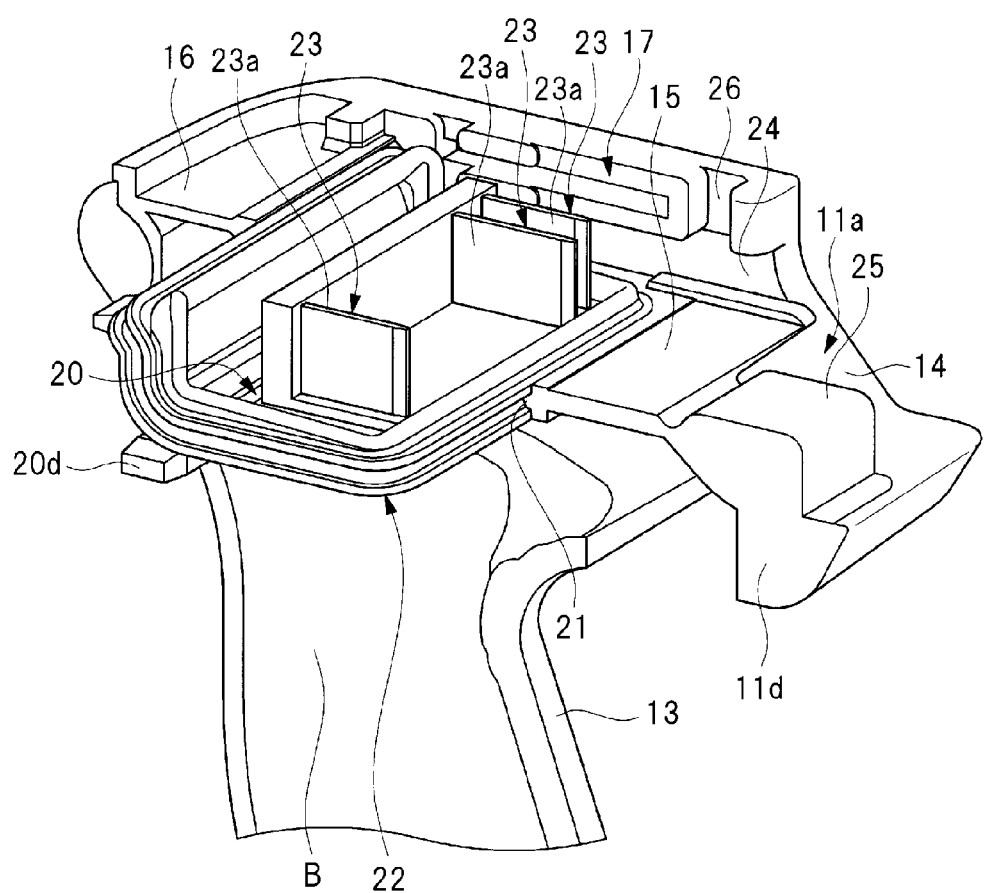
FIG. 4 is a perspective view illustrating a state in which a tool main body of the electric power tool of FIG. 1 is divided.
Figure 5:
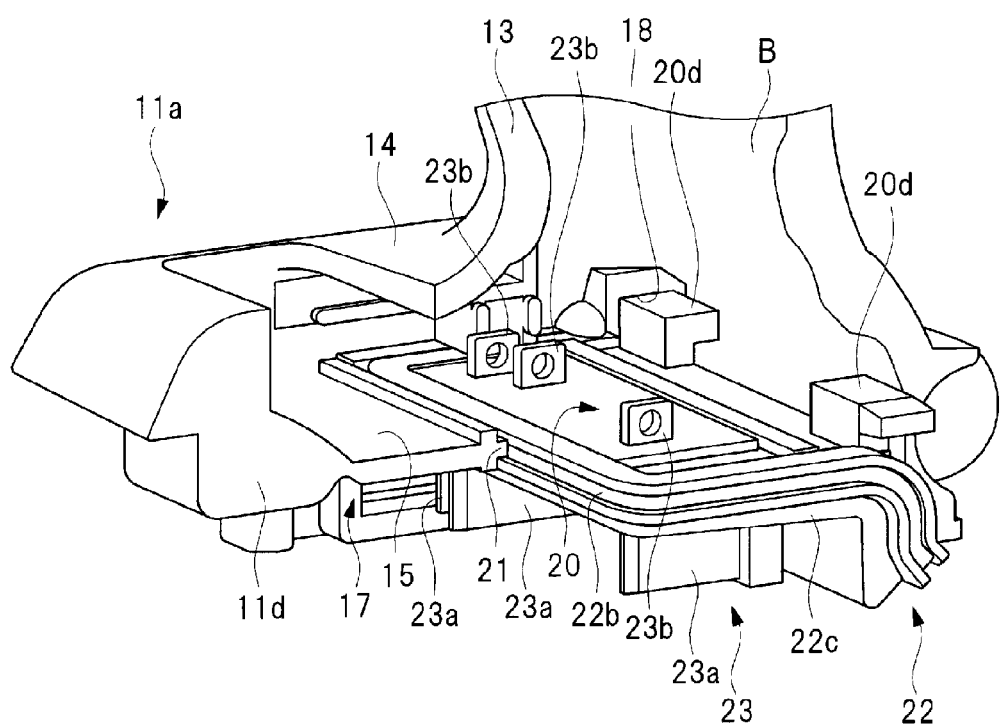
FIG. 5 is a perspective view illustrating another state in which the tool main body of the electric power tool of FIG. 1 is divided.
Figure 6:
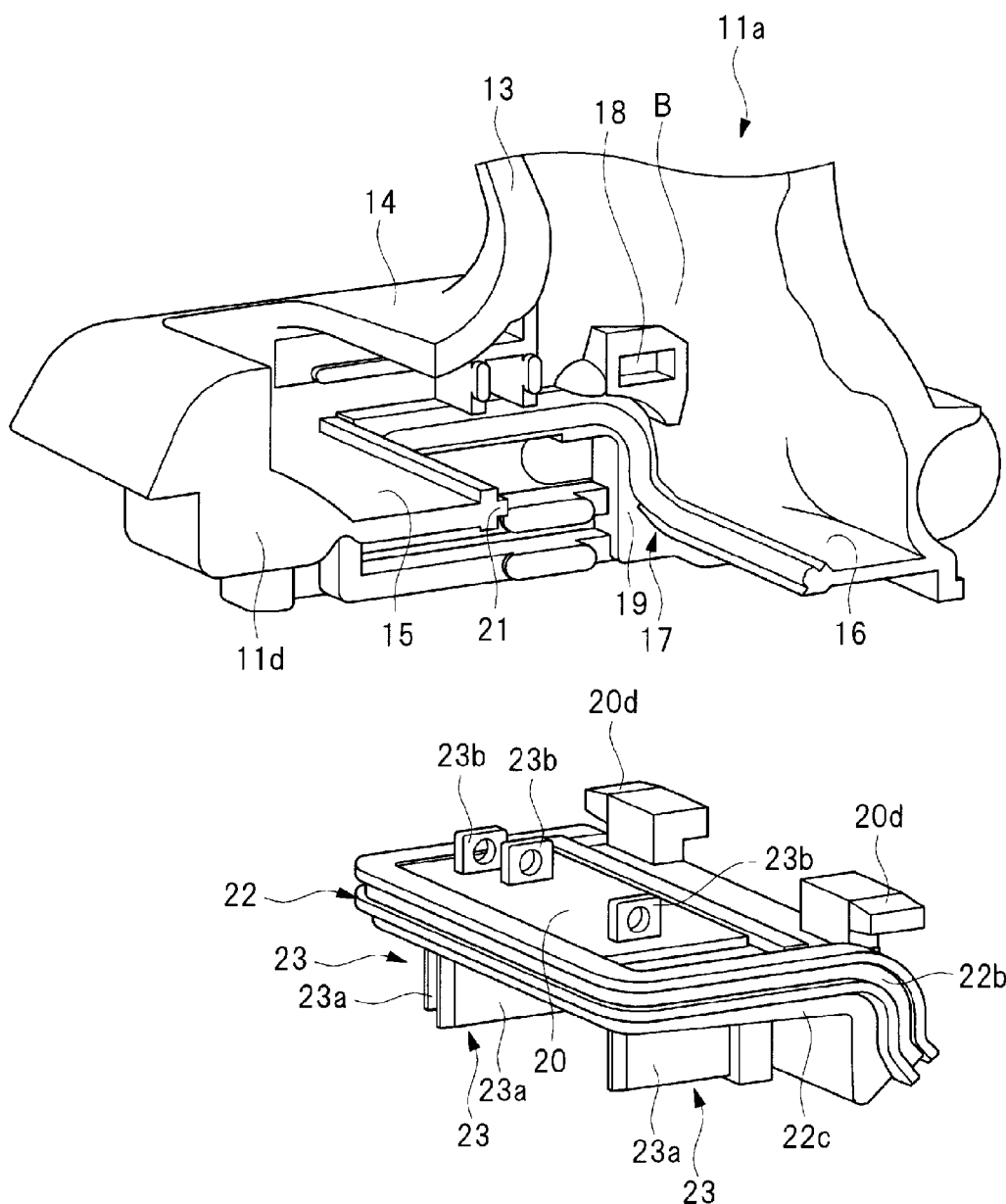
FIG. 6 is a perspective view obtained by dividing a terminal holder from the tool main body of the electric power tool of FIG. 1.

A vent hole 12a is formed in the casing 12, and the inside and the outside of the casing 12 are communicated from each other by the vent hole 12a. The vent hole 12a is a passage of air which cools the electric motor M. As illustrated in FIGS. 4 to 6, the attachment part 14 is provided with a first partition wall 15 and a second partition wall 16. The first partition wall 15 and the second partition wall 16 are extended in a direction substantially perpendicular to the dividing surface 11d. That is, the first partition wall 15 and the second partition wall 16 are extended substantially in parallel to the axis line A. By the first partition wall 15 and the second partition wall 16, the inside B formed from the inside of the attachment part 14 to the inside of the grip 13 is partitioned from an opening 17 of the attachment part 14.

The first partition wall 15 and the second partition wall 16 are arranged in the rear of the tip tool 49 in the direction along the axis line A. Also, the first partition wall 15 is arranged in the front of the second partition wall 16 in the direction along the axis line A. Further, the first partition wall 15 and the second partition wall 16 are provided at different positions from each other in the protruding direction of the grip 13. The first partition wall 15 is provided at a position closer to the grip 13 than the second partition wall 16 in the protruding direction of the grip 13. The first partition wall 15 and the second partition wall 16 are formed over the two constituent pieces 11a. Also, the inside B communicates with the inside of the casing 12. Further, the attachment part 14 is provided with a latch hole 18. The latch hole 18 is provided in each of the two constituent pieces 11a.

As illustrated in FIG. 6, an attachment hole 19 is provided between the first partition wall 15 and the second partition wall 16 in the attachment part 14. The attachment hole 19 is formed by the two constituent pieces 11a. The attachment hole 19 is provided in order to attach a terminal holder 20 thereto.

Figure 7:
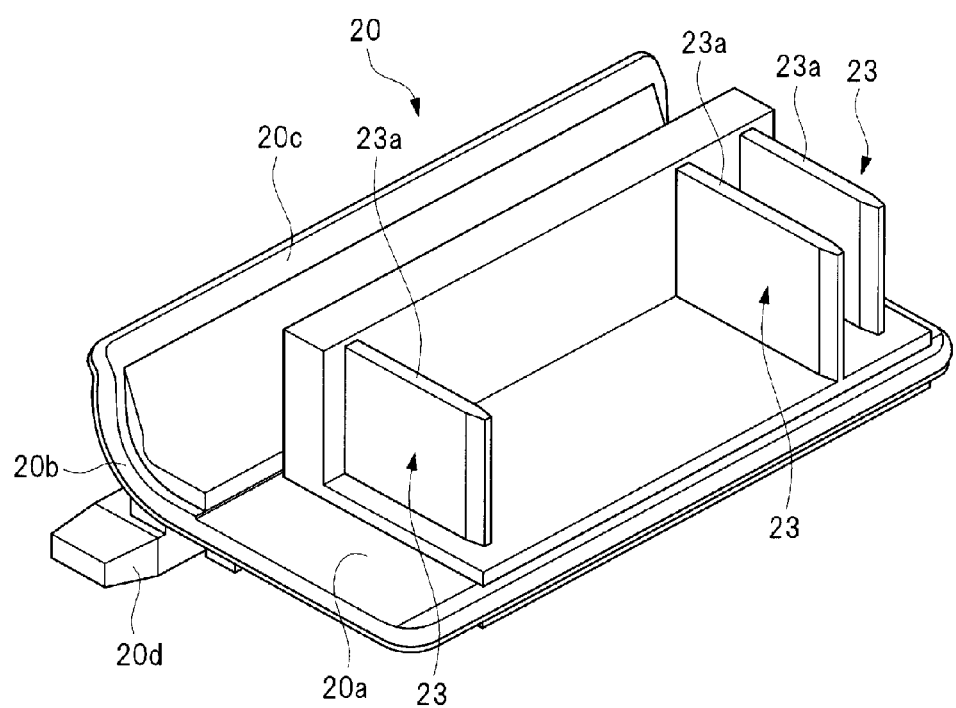
FIG. 7 is a perspective view of the terminal holder illustrated in FIGS. 3 to 6.
Figure 8:
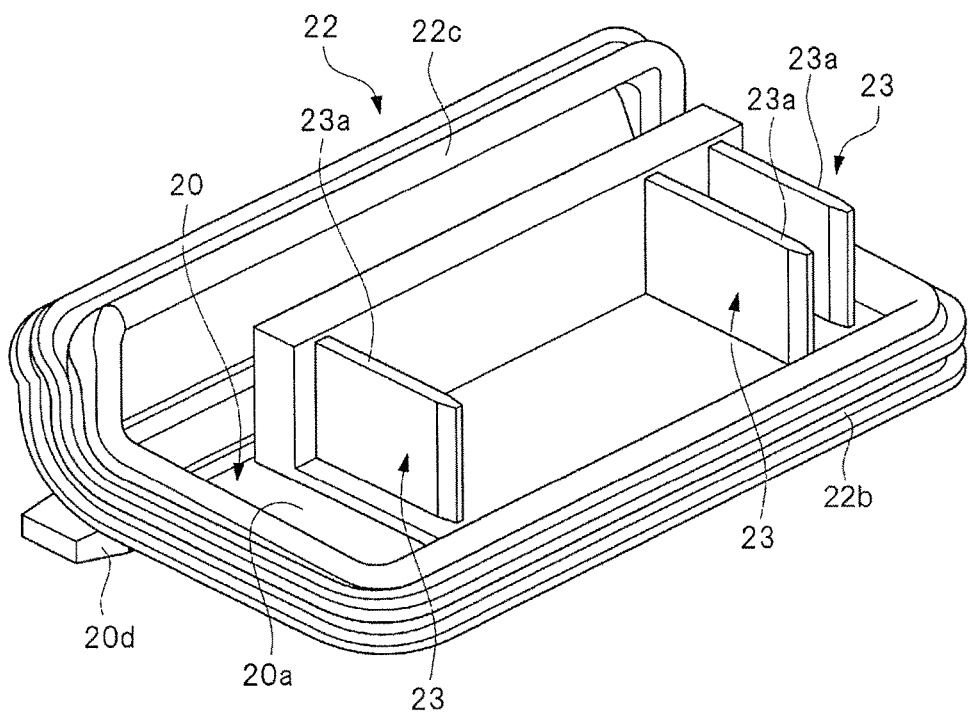
FIG. 8 is a perspective view of a state in which a seal member is attached to the terminal holder illustrated in FIG. 7.
Figure 9:
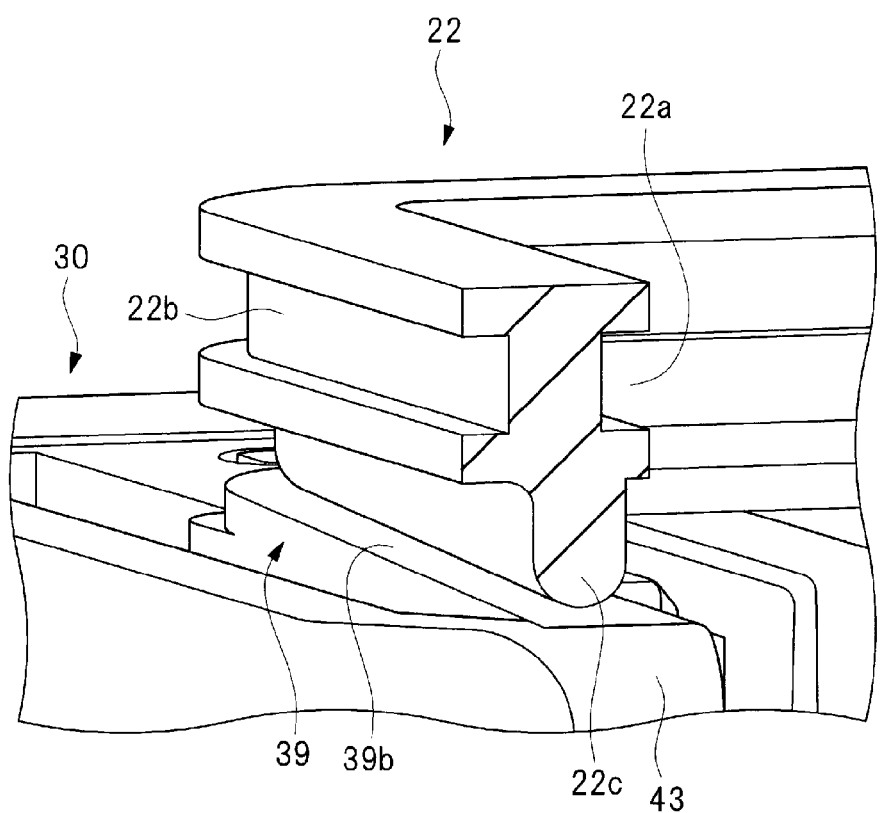
FIG. 9 is a partial perspective view illustrating a state in which the seal member is in contact with a cover of a battery pack in the first embodiment of the present invention.

On the other hand, a rib 21 is formed on edges of the first partition wall 15 and the second partition wall 16 which form the attachment hole 19 and on an inner surface of the attachment part 14 which forms the attachment hole 19. The rib 21 is annularly formed over the two constituent pieces 11a. By the rib 21, the terminal holder 20 is indirectly supported. The terminal holder 20 is integrally molded by using a resin material. As illustrated in FIGS. 7 and 8, the terminal holder 20 has a substantially-rectangular flat plate 20a and a connecting plate 20c which is connected to a long side of the flat plate 20a via a curved part 20b. A seal member 22 is attached to an outer periphery of the terminal holder 20. The seal member 22 is integrally molded by using a rubber-like elastic body. As illustrated in FIG. 9, an annular inner groove 22a is formed on an inner periphery of the seal member 22, and an annular outer groove 22b is formed on an outer periphery of the seal member 22. An annular seal lip 22c is formed over the entire periphery of the seal member 22. An outer peripheral edge of the terminal holder 20 is fitted in the inner groove 22a of the seal member 22, and the terminal holder 20 and the seal member 22 are integrated with each other by using an adhesive agent. Note that the terminal holder 20 and the seal member 22 can be integrated with each other by two-layer molding.

Also, the rib 21 is fitted in the outer groove 22b of the seal member 22 so that the seal member 22 is fixed to the attachment part 14. In this manner, the terminal holder 20 is clamped and fixed by the rib 21, which is provided on the two constituent pieces 11a, via the seal member 22. As illustrated in FIGS. 5 and 6, the terminal holder 20 is provided with a latch piece 20d which is protruded from each short side of the flat plate 20a. The latch piece 20d is inserted in the latch hole 18 of the attachment part 14. In this manner, the terminal holder 20 is more reliably positioned and fixed with respect to the attachment part 14. In a state in which the terminal holder 20 is fixed to the attachment part 14, the seal lip 22c of the seal member 22 is positioned on the opening 17 side.

Figure 10:
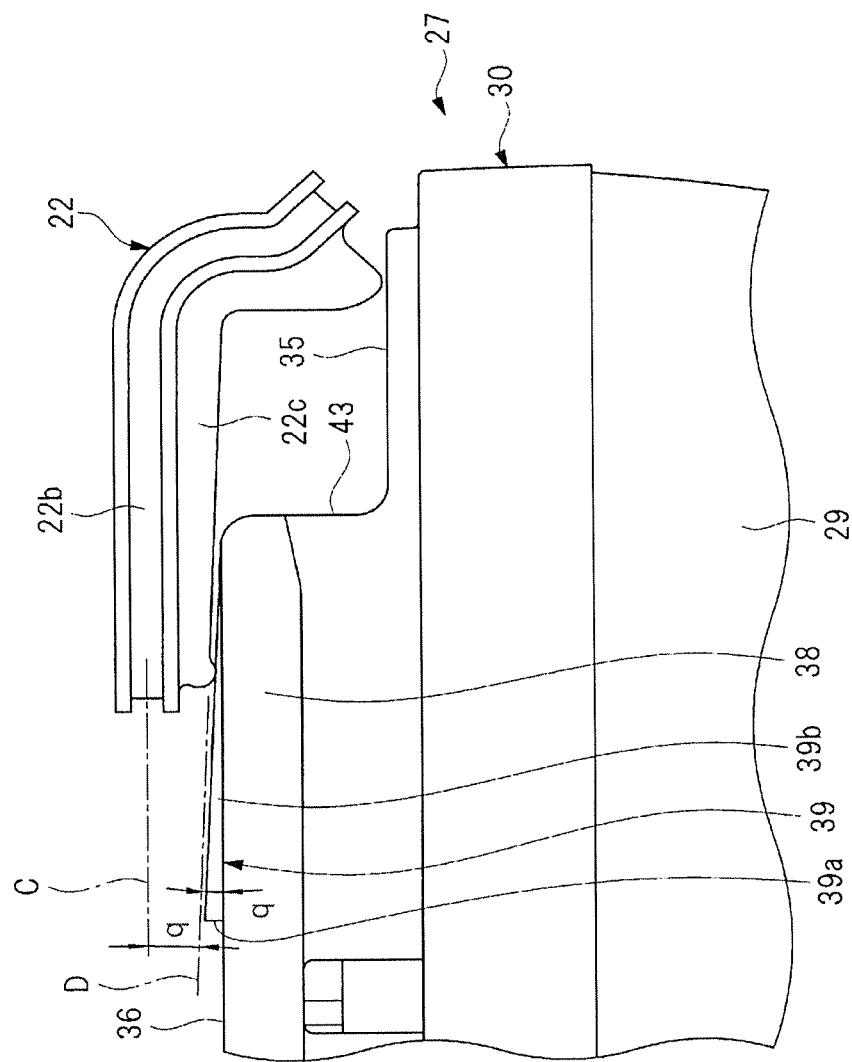
FIG. 10 is a partial side view illustrating another state in which the seal member is in contact with a cover of a battery pack in the first embodiment of the present invention.

As illustrated in FIGS. 8 and 10, the seal lip 22c is tilted in such a direction that a height of a tip thereof at a location corresponding to the short side of the flat plate 20a is larger as being closer to the curved part 20b. In a state in which the seal member 22 is fixed to the attachment part 14, the short side of the flat plate 20a is extended in a direction along the axis line A. Also, "the height of the tip of the seal lip 22c" includes a height along a protruding direction of the grip 13. Here, when it is assumed that a center line of the outer groove 22b in a width direction at the location corresponding to the short side of the flat plate 20a is "C" and an extension line of the tip of the seal lip 22c is "D", an angle q is set between the center line C and the extension line D. In the state in which the seal member 22 is fixed to the attachment part 14, the center line C is parallel to the axis line A. Also, when a battery pack 27 is attached to the attachment part 14 of the electric power tool 10, a direction of the center line C matches a direction along the moving direction of the battery pack 27.

Further, a tip at a part corresponding to a short side of the connecting plate 20c of the tip of the seal lip 22c is substantially at a right angle with respect to the center line C. Note that a cross section of the seal lip 22c in the width direction has a shape whose width is narrower as being closer to the tip side. In the present embodiment, the cross-sectional shape of the tip of the seal lip is an arc shape as illustrated in FIG. 9. The cross-sectional shape of the seal lip 22c in the width direction is formed in the same shape over the entire periphery.

As illustrated in FIGS. 4 to 8, a plurality of device-side terminals 23 are embedded in the terminal holder 20. Each of the plurality of device-side terminals 23 is made of an electrically-conductive metal material. In the state in which the terminal holder 20 is fixed to the attachment part 14, one ends 23a of the plurality of device-side terminals 23 are positioned on a space side, and the other ends 23b of the plurality of device-side terminals 23 are positioned in the opening 17. The one ends 23a of the device-side terminals 23 are electrically connected to the board. Each of the other ends 23b of the plurality of device-side terminals 23 has a plate shape, and the other ends 23b of the plurality of device-side terminals 23 are extended in the direction along the dividing surface 11d between the two constituent pieces 11a.

As illustrated in FIGS. 3 and 4, the attachment part 14 has two guide grooves 24 provided on both sides of the opening 17. The guide grooves 24 are provided on the two constituent pieces 11a, respectively. The two guide grooves 24 are extended in the direction along the axis line A, and the two guide grooves 24 are parallel to each other. Further, the attachment part 14 is provided with a convex part 25. The convex part 25 is divided by and provided on the two constituent pieces 11a. Further, in the vicinities of the guide grooves 24 of the attachment part 14, latch grooves 26 are provided, and the latch grooves 26 are provided on the two constituent pieces 11a, respectively.

Next, a configuration of the battery pack 27 will be explained with reference to FIGS. 2 and 11 to 13. The battery pack 27 is attachable/detachable to/from the attachment part 14. More specifically, the battery pack 27 and the electric power tool 10 are relatively moved to each other in the direction along the axis line A so as to attach or detach the battery pack 27 to/from the attachment part 14.

The battery pack 27 has a housing case 28, and the housing case 28 has a case main body 29 and a cover 30, which covers an opening 29a of the case main body 29. A housing chamber is formed inside the case main body 29 and the cover 30, and a plurality of battery cells 31 are housed in the housing chamber. The plurality of battery cells 31 are retained by a holder 32, which has been molded by using a resin material. In the battery cells 31, a lithium-ion battery, a nickel-cadmium battery, a nickel-hydrogen battery, and others are included. A circuit board 33 is attached to the holder 32, and the circuit board 33 is electrically connected to electrodes of the battery cells 31. Also, the circuit board 33 is provided with a plurality of battery-side terminals 34. Each of the plurality of battery-side terminals 34 is made of an electrically-conductive metal material.

The cover 30 is provided with a flat plate part 35 and a mount part 36 whose height is different from that of the plate part 35. The mount part 36 is provided with a plurality of terminal insertion holes 37. The plurality of terminal insertion holes 37 are formed in a slit shape. The plurality of terminal insertion holes 37 communicate between the housing chamber of the housing case 28 and the outside. The plurality of battery-side terminals 34 are inserted into the plurality of terminal insertion holes 37, respectively. Also, in the mount part 36, two guide rails 38 are provided on both sides of the plurality of terminal insertion holes 37. The two guide rails 38 are parallel to each other and are extended in a longitudinal direction of the plurality of terminal insertion holes 37.

Further, two connecting surfaces 43 which connect between a surface of the mount part 36 and a surface of the plate part 35 are formed. The two connecting surfaces 43 are provided at ends of the plate part 35 in the two guide rails 38. The surface of the mount part 36 and the surface of the plate part 35 have different heights from each other, and extension lines of the two surfaces are parallel to each other. Here, the height is in the direction that intersects with the longitudinal directions of the guide rails 38. In the cover 30 of the present embodiment, the longitudinal directions of the guide rails 38 and the height direction are at a substantially right angle with respect to each other. The two connecting surfaces 43 are at a substantially right angle with respect to the surface of the plate part 35 and the surface of the mount part 36. And, the two connecting surfaces 43 are parallel to the height direction, and the plurality of terminal insertion holes 37 are opened from the surface of the mount part 36 to the connecting surfaces 43. Also, at an end of the cover 30 on an opposite side of the plate part 35, a protruding part 44 higher than the mount part 36 is provided. A concave part 44a is provided in the protruding part 44.

Further, a rib 39 is provided on the surface of the mount part 36 of the cover 30. The rib 39 is protruded from the surface of the mount part 36, and the rib 39 is provided between the two guide rails 38. When the surface of the mount part 36 is viewed on a plane, the rib 39 is provided in a U shape so as to surround the plurality of terminal insertion holes 37. The rib 39 has: a first protruding part 39a which is linearly extended in the arranged direction of the plurality of terminal insertion holes 37; and two second protruding parts 39b which are linearly extended continuously from both ends of the first protruding part 39a. The first protruding part 39a is extended in a direction which is at a right angle with respect to the two guide rails 38. The two second protruding parts 39b are extended in parallel to the two guide rails 38 and are parallel to each other. A height of the first protruding part 39a is constant in the longitudinal direction thereof, and heights of the two second protruding parts 39b are changed in the longitudinal directions thereof. As illustrated in FIG. 10, the heights of the second protruding parts 39b are lower as being farther from the first protruding part 39a. That is, an angle q is set between each of the tips of the second protruding parts 39b and the surface of the mount part 36. The two angles q illustrated in FIG. 10 are the same angle as each other.

Figure 11:
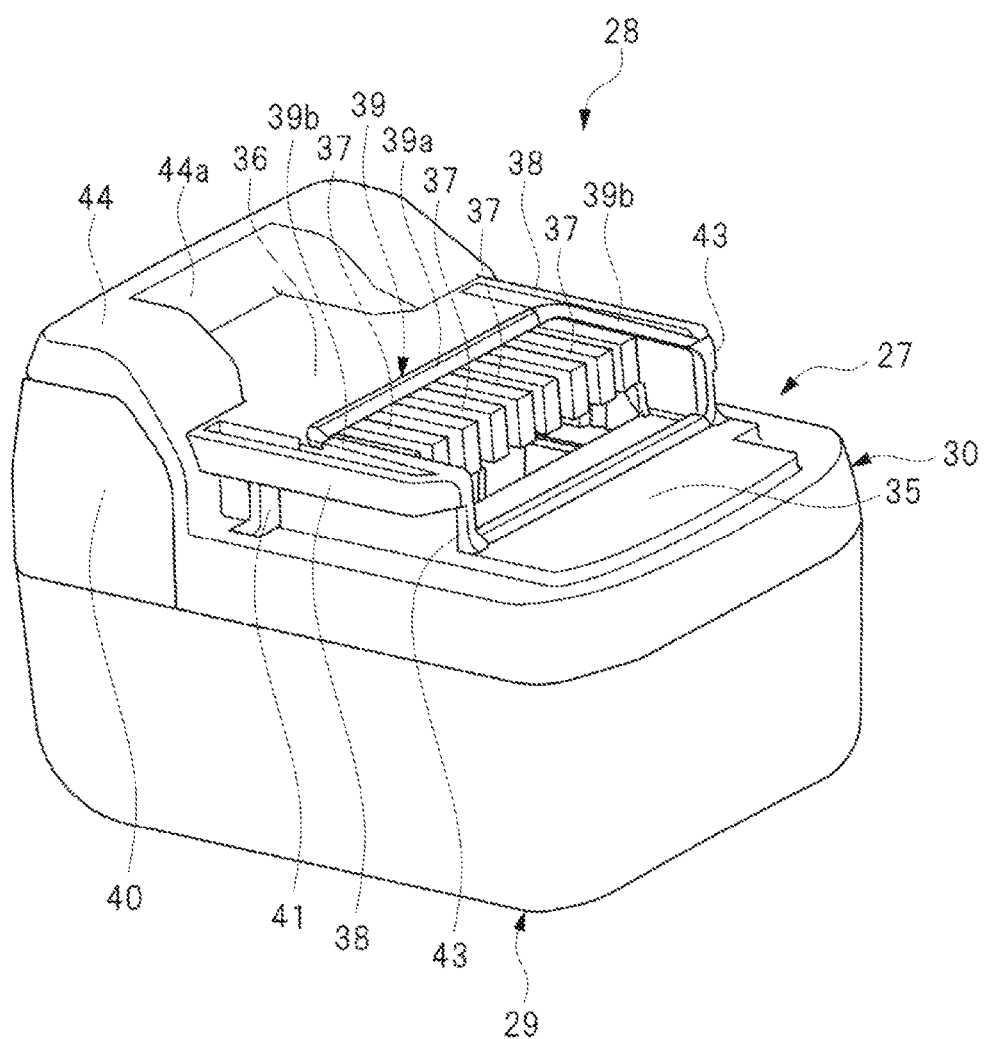
FIG. 11 is a perspective view of a battery pack to be attached to the electric power tool of FIG. 1.
Figure 12:
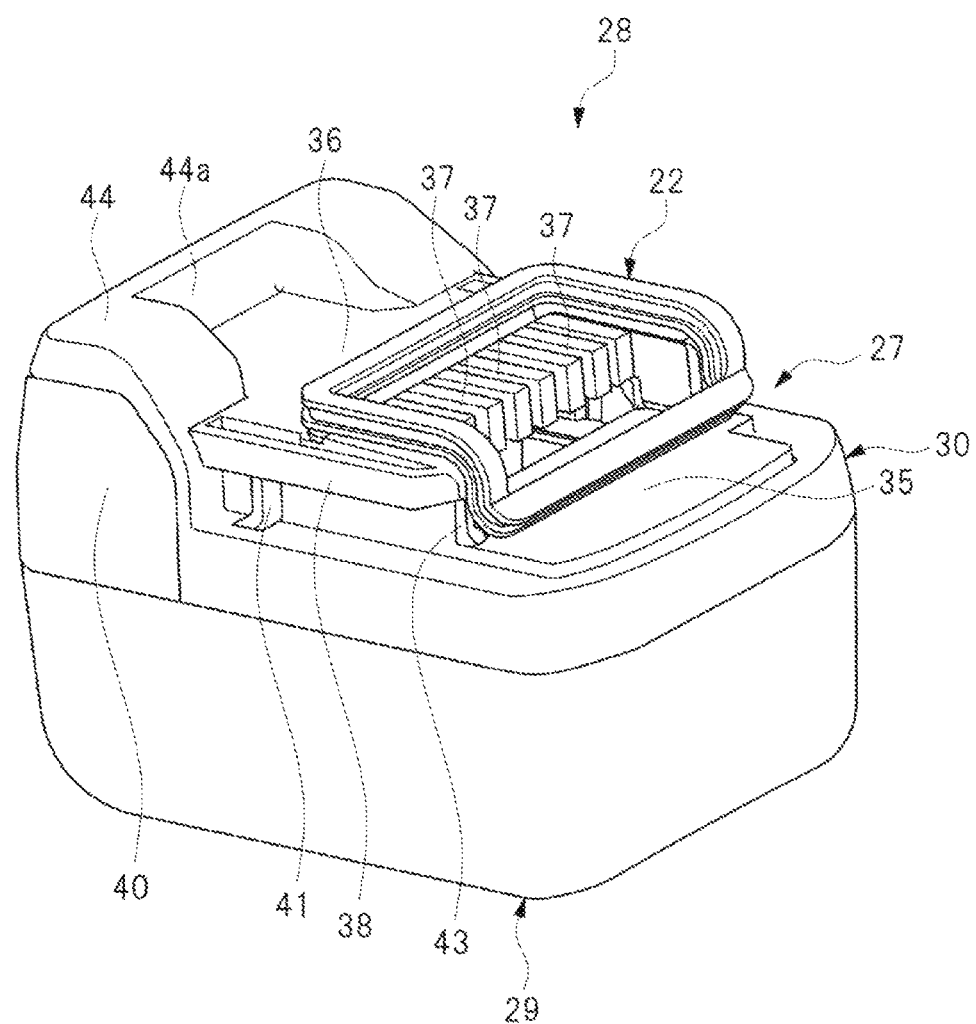
FIG. 12 is a perspective view illustrating a state in which the seal member is in contact with a cover of the battery pack of FIG. 11.
Figure 13:
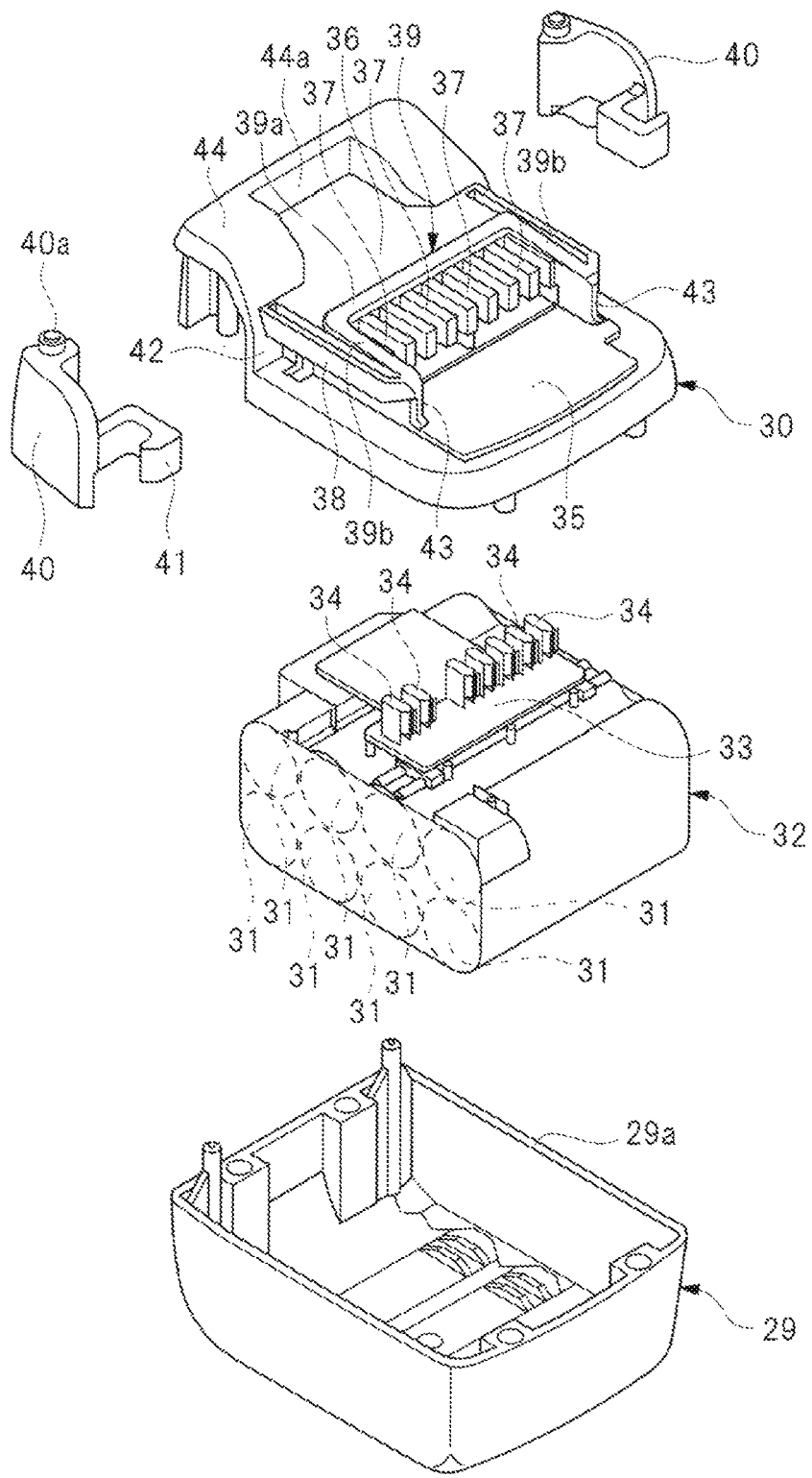
FIG. 13 is an exploded perspective view of the battery pack illustrated in FIG. 11.

Further, as illustrated in FIGS. 11 to 13, push buttons 40 are attached to both sides of the protruding part 44 of the housing case 28. Each of the push buttons 40 is attached to the housing case 28 so as to rotate around a supporting shaft 40a within a range of a predetermined angle. The push button 40 is provided with a latch hook 41, and the latch hook 41 is inserted into a hole 42 provided in the cover 30. A tip of the latch hook 41 is exposed from the hole 42 to the outside. Note that the push button 40 is pushed toward the outside of the housing case 28 by an elastic member.

Figure 2:
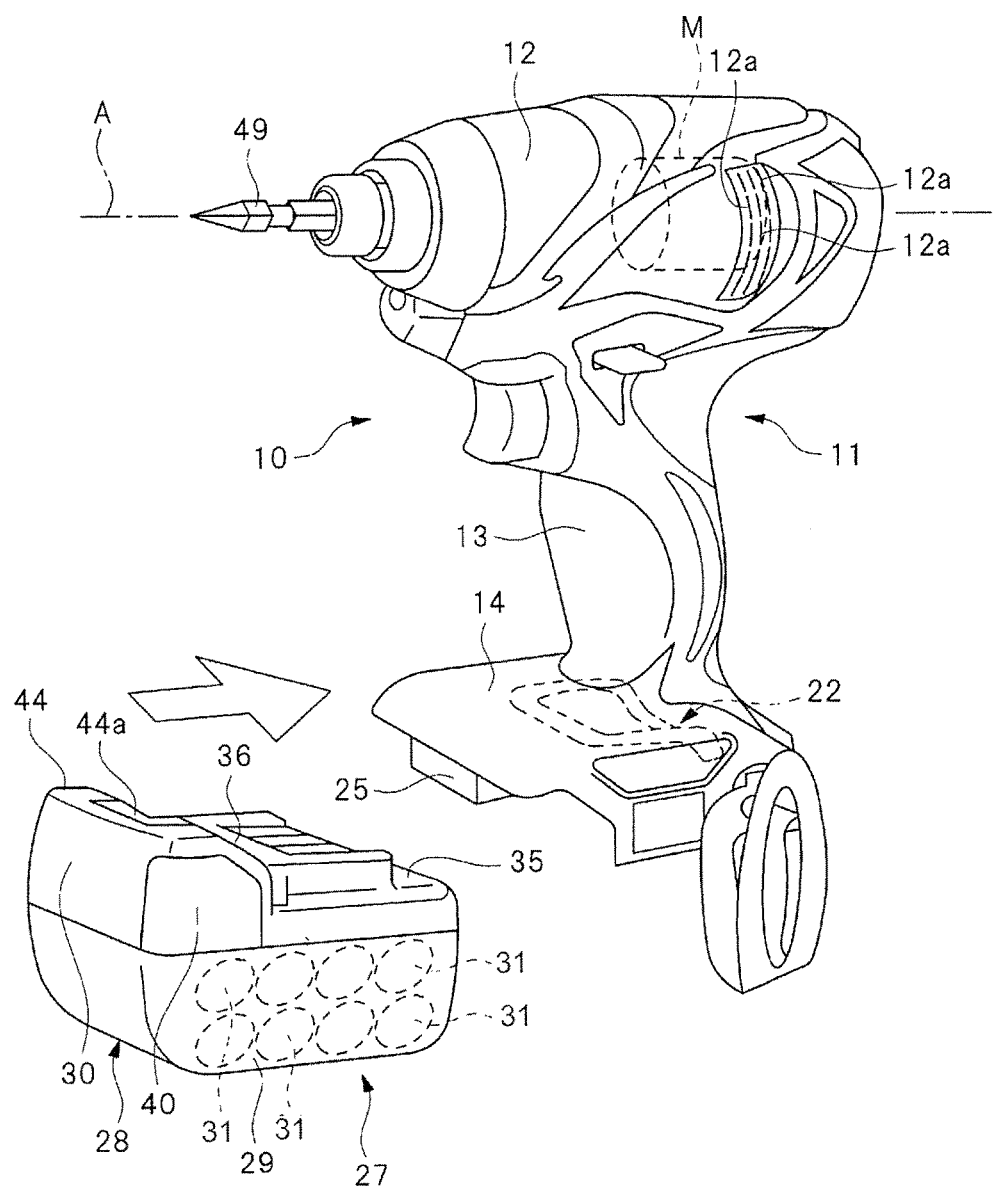
FIG. 2 is a perspective view obtained prior to the assembly of the electric power tool.

Next, an operation of attaching the battery pack 27 to the attachment part 14 of the electric power tool 10 will be explained. First, the electric power tool 10 and the battery pack 27 are arranged so that the two guide rails 38 and the two guide grooves 24 are substantially coaxial with each other. At this time, the electric power tool 10 and the battery pack 27 are almost in a state as illustrated in FIG. 2. Then, the electric power tool 10 and the battery pack 27 are caused to approach each other to move the guide rails 38 into the guide grooves 24. That is, by the guide rails 38 and the guide grooves 24, the direction of the relative movement of the attachment part 14 with respect to the battery pack 27 is substantially linearly defined. Accordingly, the device-side terminals 23 provided on the attachment part 14 are moved from the connecting surface 43 side into the terminal insertion holes 37, the device-side terminals 23 and the battery-side terminals 34 are connected to each other, the convex part 25 is moved into the concave part 44a, and besides, the latch hook 41 is moved into the latch groove 26. As a result, as illustrated in FIG. 1, the attachment of the battery pack 27 with respect to the electric power tool 10 is completed.

As illustrated in FIG. 12, when the battery pack 27 is attached to the attachment part 14, the seal member 22 is in contact with the cover 30 of the battery pack 27 to form a seal surface. More specifically, in the seal member 22, the part of the seal lip 22c which is attached to the long side of the flat plate 20a is in contact with the first protruding part 39a of the rib 39 to form the seal surface. Moreover, in the seal member 22, the part of the seal lip 22c which is attached to the short side of the flat plate 20a is in contact with the second protruding part 39b of the rib 39 to form the seal surface. Further, in the seal member 22, the part of the seal lip 22c which is attached to the short side of the connecting plate 20c is in contact with the connecting surface 43 to form the seal surface. Still further, in the seal member 22, the part of the seal lip 22c which is attached to the long side of the connecting plate 20c is in contact with the surface of the plate part 35 to form the seal surface.

In this manner, the seal lip 22c of the annular seal member 22 is in contact with the cover 30 over the entire periphery thereof to form the annular seal surface. The annular seal surface surrounds connecting parts between the device-side terminals 23 and the battery-side terminals 34 in a space formed between the cover 30 and the attachment part 14. Therefore, even if foreign substances from the outside enter the space through a gap between the cover 30 and the attachment part 14, the foreign substances can be prevented from entering the connecting parts between the device-side terminals 23 and the battery-side terminals 34.

Also, as illustrated in FIG. 10, the height of the second protruding part 39b is lower as being farther from the first protruding part 39a. Further, the part of the seal lip 22c corresponding to the short side of the flat plate 20a of the seal member 22 is tilted with respect to the center line C by the angle q. Therefore, the part of the seal lip 22c which is attached to the short side of the flat plate 20a does not friction with the second protruding part 39b during the relative movement of the battery pack 27 with respect to the attachment part 14. At a moment when the insertion of the guide rails 38 into the guide grooves 24 is started, the seal lip 22c of the seal member 22 is not in contact with the cover 30. Therefore, abrasion of the seal lip 22c is suppressed. That is, in the state in which the battery pack 27 is attached to the attachment part 14, the sealing property of the seal member 22 is improved. Moreover, in the electric power tool 10, increase in an operating force required for attaching the battery pack 27 to the attachment part 14 can be suppressed.

Further, as illustrated in FIG. 9, a width of the cross-sectional shape of the seal lip 22c in the width direction is narrower as being closer to the tip thereof. Therefore, even if a part of the seal lip 22c is in contact with the second protruding part 39b in the course of the attachment of the battery pack 27 to the attachment part 14, increase in sliding resistance can be suppressed. Therefore, in the electric power tool 10, the operating force required for attaching the battery pack 27 to the attachment part 14 can be reduced.

Further, as illustrated in FIGS. 3 to 5, the seal member 22 is interposed between the attachment part 14 and the terminal holder 20. That is, the seal member 22 has a function of sealing the part between the attachment part 14 and the terminal holder 20. Therefore, in the electric power tool 10, even if the foreign substances outside the casing 12 enter the inside of the casing 12 via the vent hole 12a and the foreign substances enter the attachment part 14 via the inside B of the grip 13, the foreign substances can be prevented from entering the connecting parts between the device-side terminals 23 and the battery-side terminals 34. Further, the seal member 22 is not in contact with the latch pieces 20d and the latch holes 18. Therefore, when the two constituent pieces 11a are coupled and fixed to each other by interposing the terminal holder 20 and the seal member 22 between the two constituent pieces 11a, damage and abrasion of the seal member 22 can be avoided. Note that, when the battery pack 27 is attached to the electric power tool 10, by pushing the push button to release the latch hook 41 from the latch groove 26 and moving the battery pack 27 in the direction along the axis line A which is reverse to the above-described direction, the battery pack 27 can be detached from the attachment part 14.

Next, the battery pack of the present invention will be explained based on FIGS. 14 and 15. The cover 30 of the battery pack 27 has an attachment hole 45, which is formed over the plate part 35 and the mount part 36. And, an annular seal member 46 is fitted into the attachment hole 45. The seal member 46 is fixed to a block 47. The plurality of terminal insertion holes 37 are formed in the block 47, and besides, the seal member 46 is attached along an outer peripheral surface of the block 47. In this manner, the annular seal member 46 is attached to the peripheries of the terminal insertion holes 37.

The seal member 46 has: a first linear part 46a which is linearly extended so as to be orthogonal to the guide rails 38; and a second linear part 46b which is formed continuously from both ends of the first linear part 46a and which is linearly extended in parallel to the guide rails 38. Also, the seal member 46 has two connecting parts 46c which are formed continuously from the respective two second linear parts 46b and which are extended along the connecting surface 43. Further, the seal member 46 has a third linear part 46d which connects between both ends of the two connecting parts 46c. The third linear part 46d is parallel to the first linear part 46a.

Figure 16:
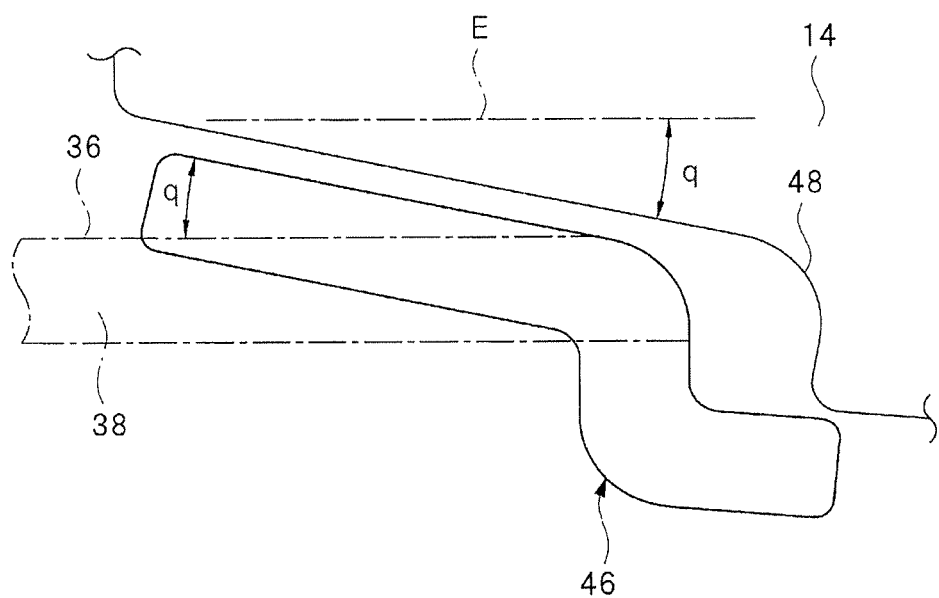
FIG. 16 is a schematic view obtained prior to the contact of the seal member of the battery pack illustrated in FIG. 14 with the attachment part.

In the seal member 46 having the above-described configuration, the first linear part 46a is fixed to a part of the inner peripheral surface of the attachment hole 45 which is at a right angle to the guide rails 38. The second linear part 46*b* is fixed to a part of the inner peripheral surface of the attachment hole 45 which is parallel to the guide rails 38. The two connecting parts 46*c* are in contact with the two connecting surfaces 43, respectively. The third linear part 46*d* is fixed to a part of the inner peripheral surface of the attachment hole 45 which is along the plate part 35. As described above, in the state in which the seal member 46 is fitted into the attachment hole 45 so as to be fixed to the cover 30, the seal member 46 is in contact with the cover 30 to form the annular seal surface. And, as illustrated in FIG. 16, in the state in which the seal member 46 is attached to the cover, an angle q is set between each tip of the second linear parts 46*b* and the surface of the mount part 36. That is, each tip of the second linear parts 46*b* is tilted so that a height thereof is lower as being closer to the connecting part 46*c*.

The block 47 is integrally molded by using a non electrically-conductive material such as a resin material, and the block 47 and the seal member 46 are integrated by an adhesive agent. Note that the block 47 and the seal member 46 can be integrated with each other by two-layer molding. The seal member 46 is integrally molded by using a rubber-like elastic body, and a part of the seal member 46 is protruded from the surface of the mount part 36. A part of a seal lip of the seal member 46 along the guide rails 38 is tilted so that the protruding amount from the surface of the mount part 36 is less as being closer to the connecting surface 43. Therefore, the angle q is set between the surface of the mount part 36 and the tip of the seal lip of the seal member 46 in the direction along the guide rails 38. Note that a battery cell is housed inside the housing case 28 as similar to the battery pack 27 illustrated in FIG. 13.

Figure 14:
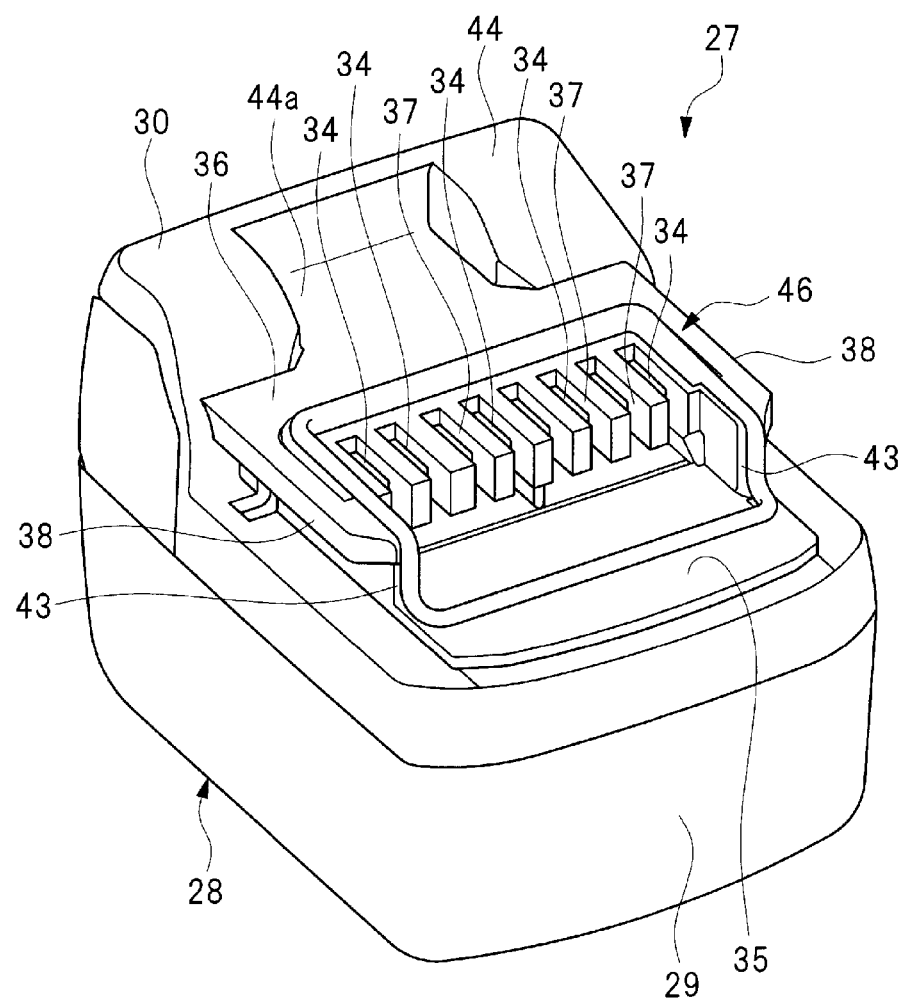
FIG. 14 is a perspective view illustrating a battery pack of the present invention.
Figure 15:
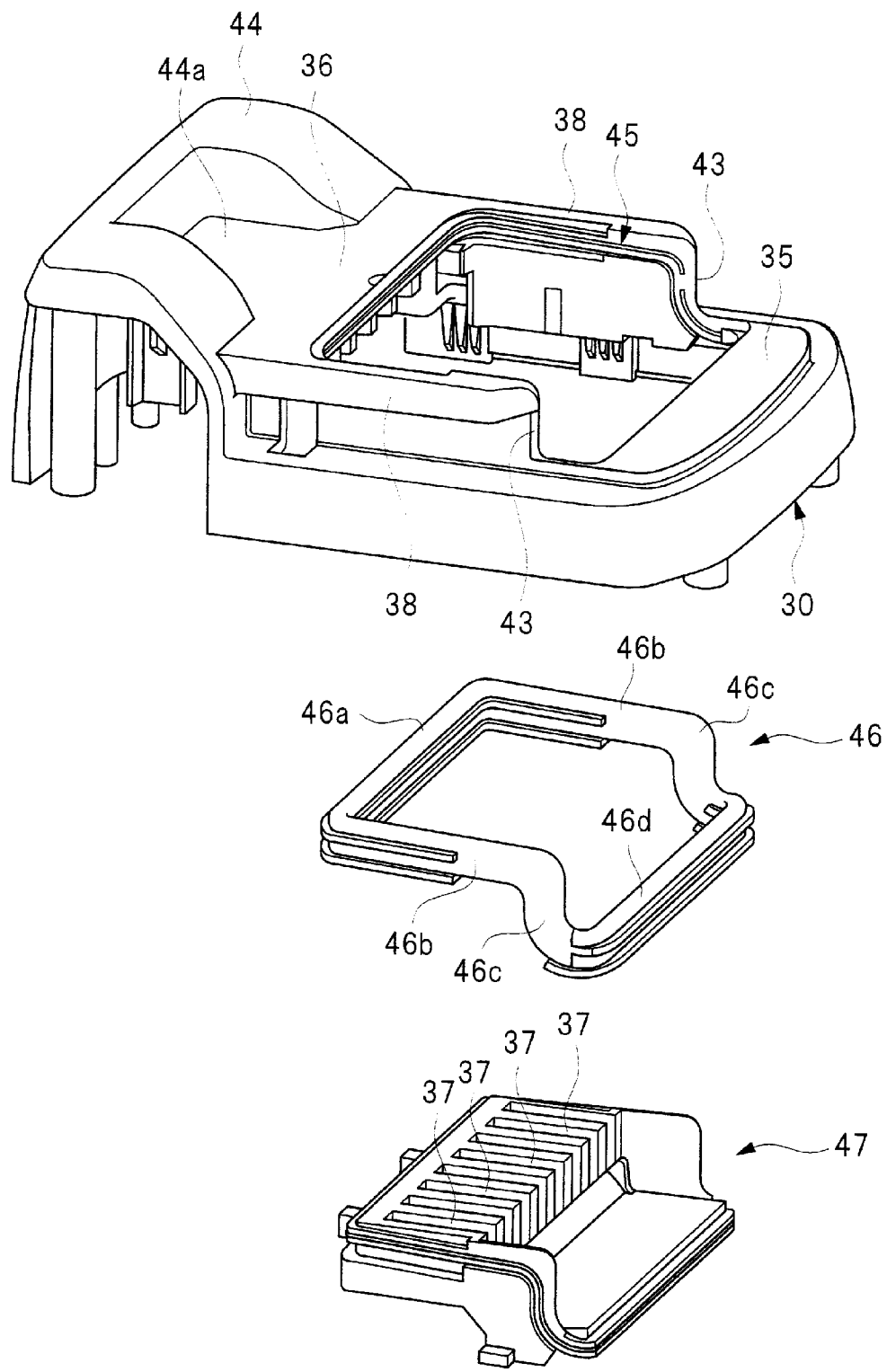
FIG. 15 is an exploded perspective view of the battery pack illustrated in FIG. 14.

The attachment part 14 of the electric power tool to which the battery pack 27 illustrated in FIG. 14 is attached is configured as illustrated in FIG. 16. A contact part 48 in which the seal lip of the annular seal member 46 is in contact is provided. The contact part 48 is annularly formed so as to surround the peripheries of the device-side terminals. The part of the contact part 48 which is parallel to the axis line of the tip tool is tilted with respect to the axis line. That is, the angle q is set between a straight line E which is parallel to the axis line and a surface of the contact part 48. Note that the attachment part 14 to which the battery pack 27 illustrated in FIG. 14 is attached is not provided with the seal member 22 in the above-described configuration. The other configurations of the electric power tool to which the battery pack 27 illustrated in FIG. 14 is attached are the same as those of the electric power tool illustrated in FIGS. 1 and 2, and therefore, illustration and explanation thereof will be omitted.

When the battery pack 27 is attached to the attachment part 14 by moving the battery pack 27 illustrated in FIG. 14 and the attachment part 14 of the electric power tool as similar to the example of FIG. 2, the device-side terminals and the battery-side terminals are connected to each other, and besides, the seal lip of the seal member 46 is in contact with the contact part 48 so as to form an annular seal surface. The seal member 46 is attached to the cover 30 of the battery pack 27 so as to surround the connecting parts between the device-side terminals and the battery-side terminals. Therefore, effects similar to those described above can be obtained. Also, the seal lip of the seal member 46 is tilted so that the angle q is formed between the tip of the seal lip and the surface of the mount part 36. Further, the angle q is set between the surface of the contact part 48 and the straight line E. The two angles q illustrated in FIG. 16 are the same angle as each other. Therefore, during the attachment of the battery pack 27 to the attachment part 14, the seal lip of the seal member 46 is not in contact with the contact part 48. Then, at a moment when the operation of attaching the battery pack 27 to the attachment part 14 is completed, the seal lip of the seal member 46 is in contact with the contact part 48 over the entire periphery thereof to form the annular seal surface. Therefore, in the battery pack 27 illustrated in FIGS. 14 to 16, effects similar to those of the electric power tool 10 and the battery pack 27 explained with reference to FIGS. 1 to 13 can be obtained.

According to another aspect of the present invention, the seal member is in contact with the plate part, the mount part, and the contact surface to form the seal surface so as to surround the connecting parts between the battery-side terminals and the device-side terminals.

According to still another aspect of the present invention, the contact between the seal lip and the battery pack resulting in the friction therebetween can be prevented during the attachment of the battery pack to the attachment part. Therefore, the abrasion of the seal lip can be suppressed, so that the sealing property is improved.

According to still another aspect of the present invention, the contact resistance between the seal lip and the battery pack can be further reduced.

According to still another aspect of the present invention, the foreign substances inside the attachment part can be prevented from entering the space between the device-side terminals and the battery-side terminals.

According to the electric device of the present invention, the seal member can prevent the entering of the foreign substances inside the attachment part into the space between the device-side terminals and the battery-side terminals.

According to an aspect of the present invention, upon the attachment of the battery pack, the seal member is in contact with the battery pack to form the seal surface, and therefore, the sealing property is further improved.

According to another aspect of the present invention, upon the fixing of the terminal holder to the attachment part, contact of the seal member with a fixing element can be prevented, and reduction in the sealing property of the seal member can be suppressed.

According to the battery pack of the present invention, upon the attachment of the battery pack to the electric device, the seal member is in contact with the electric device in the peripheries of the terminal insertion holes to form the seal surface. Therefore, the entering of the foreign substances into the connecting parts between the battery-side terminals and the device-side terminals can be suppressed.

According to an aspect of the present invention, the terminal insertion holes formed over the mount part and the plate part having the different heights from each other can be sealed.

According to the electric apparatus of the present invention, upon the attachment of the battery pack retaining the battery cells to the attachment part of the electric device, the connecting parts between the battery-side terminals and the device-side terminals can be sealed by the seal member.

According to the electric apparatus of the present invention, upon the attachment of the battery pack retaining the battery cells to the attachment part of the electric device, the seal member provided in the housing case of the battery pack is in contact with the electric device to seal the connecting parts between the battery-side terminals and the device-side terminals.

A correspondence relation between the configuration explained in present embodiment and the configuration of the present invention will be explained as follows. The electric power tool 10 corresponds to the electric device of the present invention, the center line C corresponds to the straight line of the present invention, the grip 13 and the attachment part 14 correspond to the protruding part of the present invention, the latch holes 18 and the latch pieces 20*d* correspond to the fixing element of the present invention, the guide grooves 24 correspond to the guide part of the present invention, and the tool main body 11 corresponds to the device main body of the present invention. Further, the electric power tool 10 and the battery pack 27 are combined with each other to configure the electric apparatus of the present invention.

The "endless shape" in the present invention includes a structure in which the seal member is an annularly-integrated molding object as a whole or a structure in which the seal member has an endless shape without cut in the state of the fixing of the seal member to a target object even if there is a cut at least at one location of the seal member in the longitudinal direction. In the present invention, the direction intersecting with the direction of attaching the battery pack to the tool main body includes a configuration in which the direction of attaching the battery pack to the tool main body and the direction having the angle are not on the same plane. Also, the directions having the angle include two dimension and three dimension. Further, the fixing element of the present invention includes a configuration in which the latch hook provided at the attachment part is inserted into the latch hole provided at the terminal holder in addition to the latch pieces 20*d* and the latch holes 18. In the present invention, the configuration in which the width of the seal lip is narrower as being closer to the tip side includes the cross-sectional shape of the seal lip in the width direction having an arc shape or a wedge shape. Still further, the housing case of the present invention includes a configuration capable of housing having the number of the battery cells less than four or the number thereof equal to or larger than nine.

Still further, the electric power tool of the first embodiment includes a structure in which the electric motor is provided inside the casing or a structure in which the electric motor is provided inside the grip. In the first embodiment, the rubber-like elastic body configuring the seal member has the rigidity, the shape, and the dimension with the elastic deformation rate of 20% or larger. Also, the seal member includes a solid member and a porous sponge. Further, in the first embodiment, the guide mechanism which defines the direction of attaching/detaching the battery pack 27 to/from the attachment part 14 includes not only the configuration with the guide grooves 24 provided in the attachment part 14 and the guide rails 38 provided in the cover 30 but also a configuration with guide rails provided in the attachment part 14 and guide grooves provided in the cover 30.

Second Embodiment

Conventionally, an electric device provided with an electric motor therein and a battery pack configured to be attachable/detachable to/from the electric device have been known, and an example of the electric device and the battery pack is described in the Patent Literature 1. The electric device described in the Patent Literature 1 has: a hollow tool main body; a hammer case fixed to an open end of the tool main body; and a grip provided continuously from the tool main body as an attachment part. Also, a preferred aim of the electric device described in the Patent Literature 1 is to ensure a sealing property, and the Patent Literature 1 describes providing elastic rubber at an abutting part between the grip and the battery pack by two-layer molding process.

Incidentally, there is a configuration in which the battery pack and the grip are moved in the longitudinal direction of the grip upon the attachment/detachment of the battery pack to/from the grip of the electric device. However, in the configuration described in the Patent Literature 1 for ensuring the sealing property, the directions of the movements of the battery pack and the grip are not described therein, and there has been a room for improvement.

A preferred aim of the present invention is to improve the sealing property of the electric device to which the battery pack is attached, to improve the sealing property of the battery pack attached to the electric device, and besides, to improve the sealing property of the electric apparatus.

Hereinafter, an embodiment of the electric apparatus, the electric device, and the battery pack of the present invention will be explained in detail with reference to drawings. In the following embodiment, an electric power tool included in the electric device will be explained as an example.

A configuration of the battery pack of the present invention will be explained based on FIG. 16. An electric power tool 110 illustrated in FIG. 16 has a casing 111, and a tip tool 112 is attachable/detachable to/from the casing 111. An electric motor 113 is provided inside the casing 111, and a motive-power transmitting mechanism which transmits the motive power of the electric motor 113 to the tip tool 112 is provided inside the casing 111. The motive-power transmitting mechanism has at least one of structures in which the rotary motion of the electric motor 113 is converted into the rotary motion of the tip tool 112 and in which the rotary motion of the electric motor 113 is converted into the reciprocating motion of the tip tool 112. That is, as the electric power tool 110, a drill, a driver, a hammer, a hammer drill, a hammer driver, and others are included.

Figure 17:
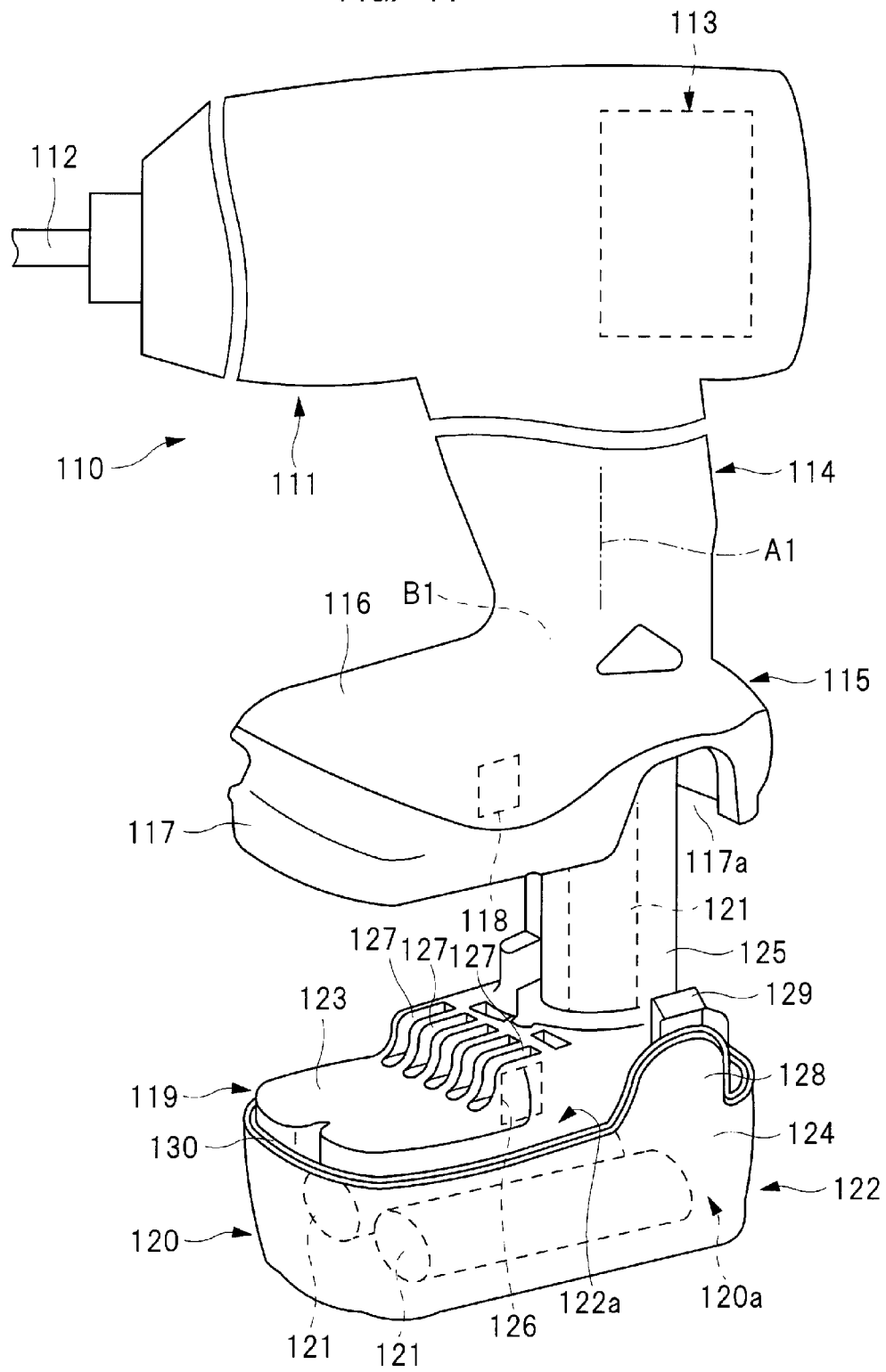
FIG. 17 is a schematic perspective view of an electric power tool and a battery pack according to a second embodiment of the present invention.

Also, the casing 111 has a grip 114. The grip 114 is protruded in a direction in which the tip tool 112 intersects with a center line in the rotary motion or the reciprocating motion thereof. The grip 114 is a part held by an operator with his/her hand, and is configured to have a tubular shape. An end of the grip 114 in a longitudinal direction thereof, more specifically, an end thereof opposite to the casing 111 is provided with an attachment part 115. The longitudinal direction of the grip 114 is expressed by a direction along a center line A1 of FIG. 17. The attachment part 115 has a board 116 and a side plate 117. The board 116 is extended along a planar direction intersecting with the longitudinal direction of the grip 114 by a predetermined angle. The board 116 is not always a flat plate. The side plate 117 is formed continuously from an outer periphery of the board 116 and is extended along the longitudinal direction of the grip 114. The side plate 117 is extended in a direction getting away from the grip 114. The attachment part 115 is integrally molded by using a non-electrically-conductive material such as a polymer resin such as plastic. A space B1 is formed from the inside of the grip 114 to the inside of the attachment part 115, and an electric circuit for supplying electric power to the electric motor 113 is provided in the space B1. A plurality of device-side terminals 118 are electrically connected to the electric circuit. FIG. 17 illustrates only one of the device-side terminals 118 for the sake of convenience. The plurality of device-side terminals 118 are provided inside the attachment part 115.

Further, the electric power tool 110 has a configuration in which a battery pack 119 for supplying electric power to the electric motor 113 is removable, that is, attachable/detachable. The battery pack 119 has a housing case 120, and the housing case 120 has a case main body 122 which houses battery cells 121 and a cover 123 which is attached to the case main body 122. The case main body 122 has an opening 122a, and the opening 122a is covered with the cover 123. The cover 123 is attachable/detachable to/from the case main body 122. The case main body 122 and the cover 123 are separately integrally molded by using a non electrically-conductive material such as a polymer resin such as plastic. The case main body 122 has a bottom plate and a side plate 124 which is formed continuously from an outer periphery of the bottom plate. The side plate 124 is provided over the entire periphery of the bottom plate, and the side plate 124 is extended in a thickness direction of the bottom plate. Inside a housing chamber 120a which is formed of the case main body 122 and the cover 123, two columnar battery cells 121 are aligned and housed.

On the other hand, the cover 123 is provided with a tower part 125 which is protruded in a direction getting away from the bottom plate. This tower part 125 is formed in a cylindrical shape whose inside is hollow, and one battery cell 121 is housed inside the tower part 125. The three battery cells 121 are secondary batteries, and charge and discharge in the battery cells 121 can be performed a plurality of times. Each of the battery cells 121 includes a lithium-ion battery, a nickel-cadmium battery, a nickel-hydrogen battery, and others.

Also, in the housing chamber 120a, connecting plates which are individually connected to a cathode and an anode of the battery cell 121 are provided, respectively. A plurality of battery-side terminals 126 are connected to the connecting plates via a circuit board. FIG. 17 illustrates only one battery-side terminal 126 for the sake of convenience. Also, a plurality of openings 127 are formed in the cover 123, and the housing chamber 120a is communicated with the outside of the housing case 120 via the openings 127. And, in the housing chamber 120a, the battery-side terminal 126 is arranged in the vicinities of the opening 127.

The above-described battery pack 119 is attachable/detachable to/from the attachment part 115. A configuration for attaching/detaching the battery pack 119 to/from the attachment part 115 is as follows. First, when the center line A1 of the grip 114 and the tower part 125 are set in a substantially coaxial state with each other, an outer peripheral shape of the side plate 117 and an outer peripheral shape of the side plate 124 are substantially the same as each other on a plane intersecting with the center line A1. Also, operating pieces 128 extended in the protruding direction of the tower part 125 are provided at two locations of the side plate 124 in an entire peripheral direction. The two operating pieces 128 are elastically deformable at parts connected to the side plate 124 as supporting points. Also, latch hooks 129 are provided at tips of the two operating pieces 128, respectively. Further, two latch pieces are provided on an inner surface of the attachment part 115. Still further, in the side plate 117, cut-out parts 117a are formed at locations corresponding to the two operating pieces 128.

In this manner, the side plate 117 and the side plate 124 have substantially the same shape as each other inside the plane perpendicular to the center line A1 of the grip 114. The shapes of edge parts of the operating pieces 128 and the shapes of edge parts of the cut-out parts 117a are substantially the same as each other inside the plane perpendicular to the center line A1 of the grip 114. Further, a seal member 130 which is in contact with the edge part of the side plate 117 and the edge parts of the cut-out parts 117a is provided on the entire periphery of the edge part of the side plate 124 and the edge parts of the two operating pieces 128. The seal member 130 is annularly formed along a plane which intersects with the protruding direction of the tower part 125. That is, the seal member 130 is provided in an endless shape over the entire periphery of the side plate 124. As a material which forms the seal member 130, a rubber-like elastic body and an elastomer are included. Also, a structure of the seal member 130 may be any of a solid structure, a porous structure, and a sponge. The seal member 130 has a characteristic that the seal member is elastically deformed when a pressure is applied thereto and that is recovered to an original shape when the pressure is reduced. In the case of the seal member 130 having the solid structure, the seal member can be fixed to the side plate by two-layer molding. Also, in the case of the seal member 130 having the porous structure, the seal member can be fixed to the side plate 124 by an adhesive agent.

Next, an operation of attaching the battery pack 119 to the attachment part 115 will be explained. First, in a state that the tower part 125 is directed to the attachment part 115, the center line A1 of the grip 114 and the tower part 125 are substantially coaxially positioned with each other. And, the battery pack 119 and the attachment part 115 are relatively moved to each other along the center line A1 so that the battery pack 119 and the attachment part 115 approach each other. Accordingly, the tower part 125 moves into the space B1, and then, the two latch hooks 129 are in contact with the attachment part 115 so that the elastic deformation starts.

Also, the seal member 130 is in contact with the edge of the side plate 117, and is compressed in the direction of the attachment of the battery pack 119. Further, the latch hooks 129 are latched with the latch pieces, the attachment of the battery pack 119 with respect to the attachment part 115 is completed, and the elastic deformation of the seal member 130 is finished. When the latch hooks 129 are latched with the latch pieces, the battery pack 119 does not detach from the attachment part 115. Also, when the attachment of the battery pack 119 with respect to the attachment part 115 is completed, the device-side terminals 118 are inserted into the openings 127, and the device-side terminals 118 are connected to the battery-side terminals 126.

Further, the seal member 130 has a rigidity, a shape, and a dimension with an elastic deformation rate of 20% or larger in a range from the start of the elastic deformation to the finish of the elastic deformation. Note that the elastic deformation rate is a value indicating how much the height after the deformation is reduced with respect to the height before the deformation. Here, the height means the height in the direction along the center line of the tower part 125.

When the attachment of the battery pack 119 with respect to the attachment part 115 is completed, a closed space is formed between the case main body 122 and the attachment part 115. Strictly speaking, the closed space is different from the above-described space B1. However, in the present embodiment, the closed space is treated as the space B1 for the sake of convenience. The connecting locations between the device-side terminals 118 and the battery-side terminals 126 are positioned in the space B1. Further, when the battery pack 119 is attached to the attachment part 115, the seal member 130 is in contact with the entire periphery of the side plate 117 of the attachment part 115 to form an annular seal surface. Therefore, the space B1 is partitioned from the outside of the space B1 by the seal member 130, and the foreign substances from outside such as water, dust, and mud can be prevented from entering the space B1.

More particularly, the seal member 130 is annularly formed along the plane intersecting with the direction of the attachment of the battery pack 119 to the attachment part 115. More specifically, the seal member 130 is annularly formed so as to surround the connecting locations between the battery-side terminals 126 and the device-side terminals 118 inside the plane intersecting with the center line A1 of the grip 114. Therefore, the foreign substances from the outside can be prevented from entering the space B1 through a gap between the side plate 124 of the case main body 122 and the side plate 117 of the attachment part 115.

Also, the seal member 130 is formed in an endless shape so as to surround the connecting locations between the battery-side terminals 126 and the device-side terminals 118 inside the plane intersecting with the center line A1 of the grip 114. Therefore, when the battery pack 119 and the attachment part 115 are relatively moved in the longitudinal direction of the grip 114 so as to approach each other, the contact of the seal member 130 with the attachment part 115 resulting in the friction therebetween can be prevented inside the plane along the longitudinal direction of the grip 114. Therefore, the abrasion of the seal member 130 can be suppressed, and therefore, reduction in the durability of the seal member 130 can be suppressed, and besides, reduction in the sealing property can be suppressed.

Note that, when the two operating pieces 128 are elastically deformed by pressing them with fingers, the engagement between the latch hooks 129 and the latch pieces is released, and therefore, the battery pack 119 can be detached from the attachment part 115 by relatively moving the battery pack 119 and the attachment part 115 to each other in the longitudinal direction of the grip 114 to be separated from each other.

Figure 18A:
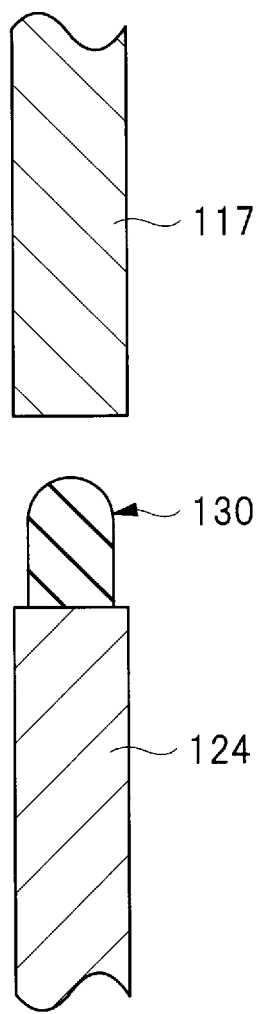
FIG. 18A is a cross-sectional view of a seal member used in the present invention in a width direction.
Figure 18B:
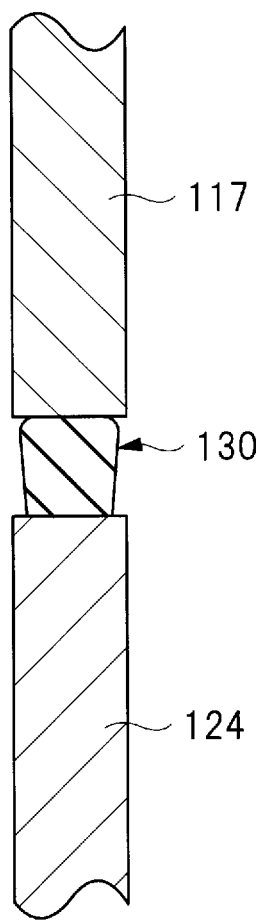
FIG. 18B is a cross-sectional view of a seal member used in the present invention in a width direction.

Here, a specific example of a cross-sectional shape of the seal member 130 in the width direction will be explained based on FIGS. 18A to 20. In the seal member 130 illustrated in FIGS. 18A and 18B, a tip shape thereof before the seal member 130 is in contact with the side plate 117 arcs as illustrated in FIG. 18A. And, when the operation of attaching the battery pack 119 to the attachment part 115 is completed, the seal member 130 is in contact with the side plate 117 and is elastically deformed so that the tip shape of the seal member 130 is flattened as illustrated in FIG. 18B.

Figure 19A:
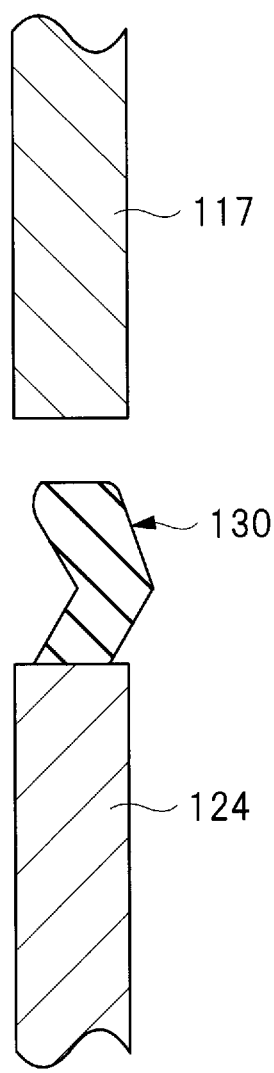
FIG. 19A is a cross-sectional view of a seal member used in the present invention in a width direction.
Figure 19B:
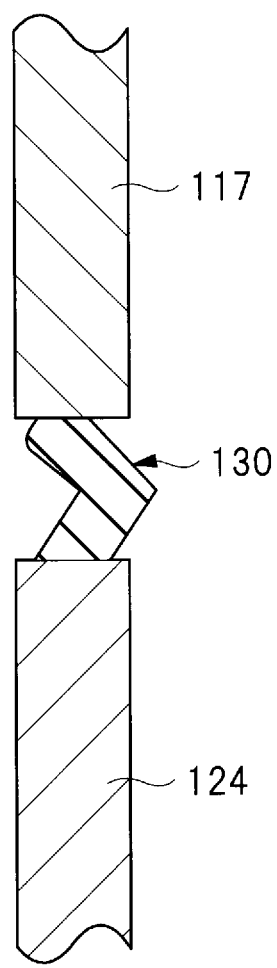
FIG. 19B is a cross-sectional view of a seal member used in the present invention in a width direction.

The seal member 130 illustrated in FIGS. 19A and 19B is bent in a "V" shape in a cross section thereof in the width direction. FIG. 19A illustrates a state before the seal member 130 is in contact with the side plate 117. And, when the operation of attaching the battery pack 119 to the attachment part 115 is completed, the seal member 130 is in contact with the side plate 117 and is elastically deformed as illustrated in FIG. 19B.

Figure 20:
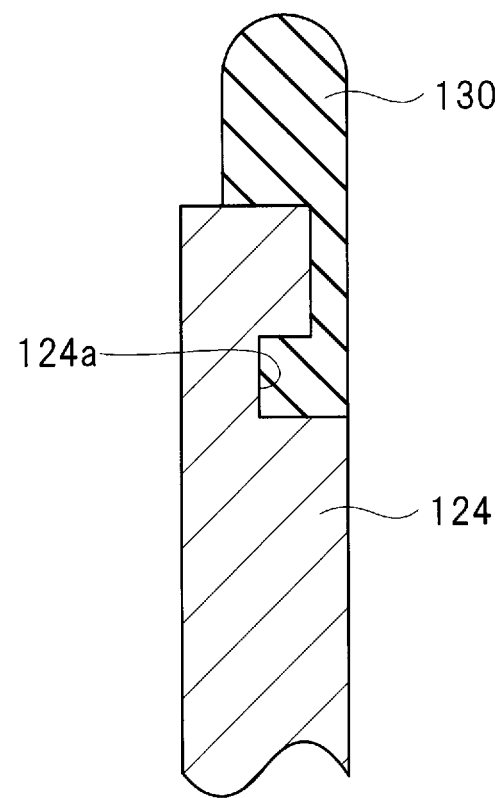
FIG. 20 is a cross-sectional view of a seal member used in the present invention in a width direction.

In the seal member 130 illustrated in FIG. 20, a tip shape thereof before the contact with the side plate 117 arcs. Also, an attachment groove 124a is formed over the entire periphery of an inner peripheral surface of the side plate 124. And, a part of the seal member 130 which is fixed to the side plate 124 is partially arranged inside the attachment groove 124a. By preparing such a configuration, the fixing force of the seal member 130 with respect to the side plate 124 is increased.

Third Embodiment

An example of the battery pack of the present invention will be explained based on FIG. 21. In the electric power tool 110 illustrated in FIG. 21, an attachment part 135 is provided continuously from a tip of the grip 114. The attachment part 135 is formed in a tubular shape. There is no strict boundary between the grip 114 and the attachment part 135, and the space B1 includes the inside of the grip 114 and the inside of the attachment part 135.

On the other hand, a battery pack 131 has a housing case 132, and the housing case 132 has a case main body 133 and a cover 134. The battery pack 131 is configured to be moved in the longitudinal direction of the grip 114 so that the battery pack 131 is attached/detached to/from the attachment part 135. The battery pack 131 is moved in a top-bottom direction of FIG. 21 so as to be attached/detached to/from the attachment part 135. The case main body 133 and the cover 134 are mainly made of a resin material. The case main body 133 is formed in a tubular shape, and three battery cells 121 are housed in a housing chamber 133a of the case main body 133.

Moreover, in the housing chamber of the case main body 133, a connecting plate electrically connected to cathodes and anodes of the battery cells 121 is provided. To the connecting plate, battery-side terminals 136 are connected via a circuit board. Further, the case main body 133 has an opening, and the opening is covered with the cover 134. The cover 134 is fixed to the case main body 133. A wall 137 is provided at an end of the case main body 133 opposite to a part thereof where the opening is formed. Also, the wall 137 is provided with a mount part 137a, and the mount part 137a is provided with openings 138 which communicate between the housing chamber 133a of the case main body 133 and the outside of the housing case 132. The battery-side terminals 136 are arranged at positions facing the openings 138.

The cover 134 has a bottom plate and a side plate 139 which is provided in the entire periphery of the bottom plate. The side plate 139 is extended in a direction perpendicular to the bottom plate. In a state in which the opening of the case main body 133 is covered with the cover 134, the side plate 139 surrounds the periphery of the case main body 133. A part of the side plate 139 is provided with two operating pieces 141 with a cut-out part 140 therebetween. FIG. 21 illustrates only one operating piece 141 for the sake of convenience. The operating piece 141 can be elastically deformed in a thickness direction of the side plate 139 while taking a part continued from the side plate 139 as a supporting point. That is, movement of the operating piece 141 is allowed by the cut-out parts 140. The operating piece 141 is provided with a latch hook 142.

On the other hand, device-side terminals 143 are provided inside the attachment part 135. When the grip 114 and the case main body 133 are arranged to be coaxial with each other, a shape of an edge part of the attachment part 135 and shapes of edge parts of the side plate 139 and the operating piece 141 are substantially the same as each other inside a plane perpendicular to the center line of the grip 114 in the longitudinal direction. Further, the seal member 130 is fixed over the edge part of the side plate 139 and the edge part of the operating pieces 141. The seal member 130 covers the cut-out part 140. In other words, the seal member 130 is buried inside the cut-out part 140. The seal member 130 is made of a material similar to that of the seal member 130 of second embodiment. When the seal member 130 has a solid structure, the seal member 130 and the cover 134 are integrated by two-layer molding. The seal member 130 may have any of the configurations illustrated in FIGS. 18A to 20. Note that a latch piece is provided on an inner surface of the attachment part 135.

Next, an operation of attaching the battery pack 131 to the attachment part 135 will be explained. In a state that the wall 137 of the case main body 133 is directed to the attachment part 135, the battery pack 131 and the attachment part 135 are relatively moved to each other along the longitudinal direction of the grip 114, so that the battery pack 131 and the attachment part 135 approach each other. Accordingly, the case main body 133 enters the space B1, and the latch hook 142 is in contact with the attachment part 135 so as to be elastically deformed. Then, the latch hook 142 and the latch piece are latched with each other, so that the attachment and the fixation of the battery pack 131 with respect to the attachment part 135 are completed.

During the above-described operation, before the engagement of the latch hook 142 with the latch piece, the seal member 130 is in contact with the attachment part 135 so as to start the elastic deformation. Then, at the moment of the completion of the attachment of the battery pack 131 with respect to the attachment part 135, the elastic deformation of the seal member 130 is finished, and besides, the device-side terminals 143 and the battery-side terminals 136 are connected to each other. In this manner, the seal member 130 is in contact with the attachment part 135 to form the annular seal surface, and partitions the closed space formed between the cover 134 and the attachment part 135 from the outside. Strictly speaking, the closed space is different from the space B1. However, the closed space is treated as the space B1 here for the sake of convenience. And, along the direction intersecting with the center line A1 of the grip 114, the seal member 130 is annularly formed so as to surround the connecting locations between the device-side terminals 143 and the battery-side terminals 136. Therefore, in the battery pack 131 of the third embodiment, the entering of the foreign substances from the outside into the space B1 through gaps among the side plate 139, the operating pieces 141, and the attachment part 135 can be prevented.

Figure 21:
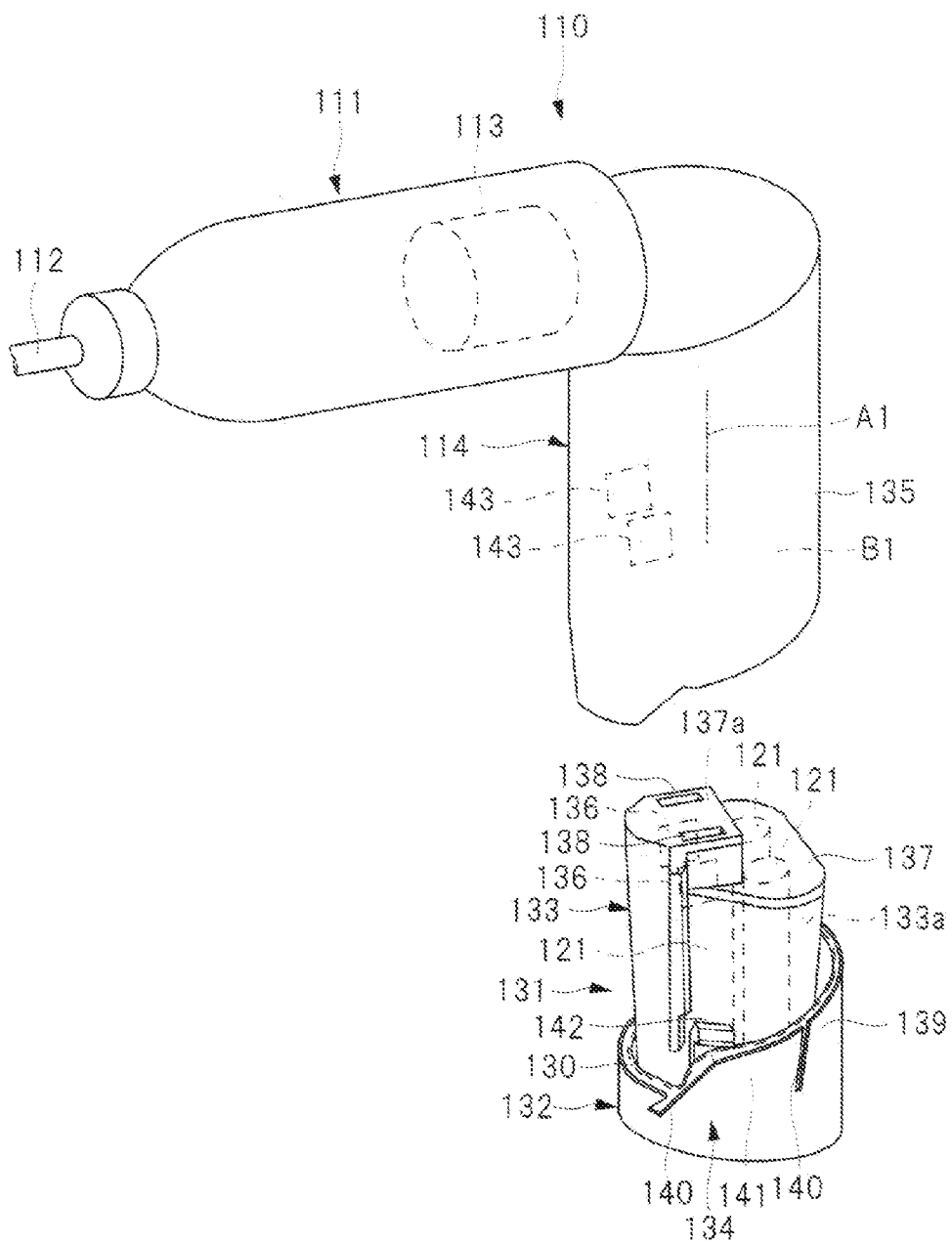
FIG. 21 is a schematic perspective view of an electric power tool and a battery pack according to a third embodiment of the present invention.

Also, when the battery pack 131 is attached to the attachment part 135, the seal member 130 illustrated in FIG. 21 is annularly formed so as to surround the connecting locations between the device-side terminals 143 and the battery-side terminals 136 along a plane intersecting with the center line A1 of the grip 114. Therefore, during the attachment of the battery pack 131 to the attachment part 135, the friction of the seal member 130 with the attachment part 135 can be prevented. Further, the cut-out parts 140 are filled with the seal member 130. Therefore, in the state that the battery pack 131 is attached to the attachment part 135, the entering of the foreign substances from the outside into the space B1 through the cut-out parts 140 can be prevented. Note that, when the operating pieces 141 are elastically deformed by holding them with fingers, the engagement of the latch hooks 142 with the latch pieces is released, and therefore, the battery pack 131 can be detached from the attachment part 135. As the cross-sectional shape of the seal member 130 illustrated in FIG. 21, the cross-sectional shapes of the seal members 130 illustrated in FIGS. 18A to 20 are included.

Fourth Embodiment

Figure 22:
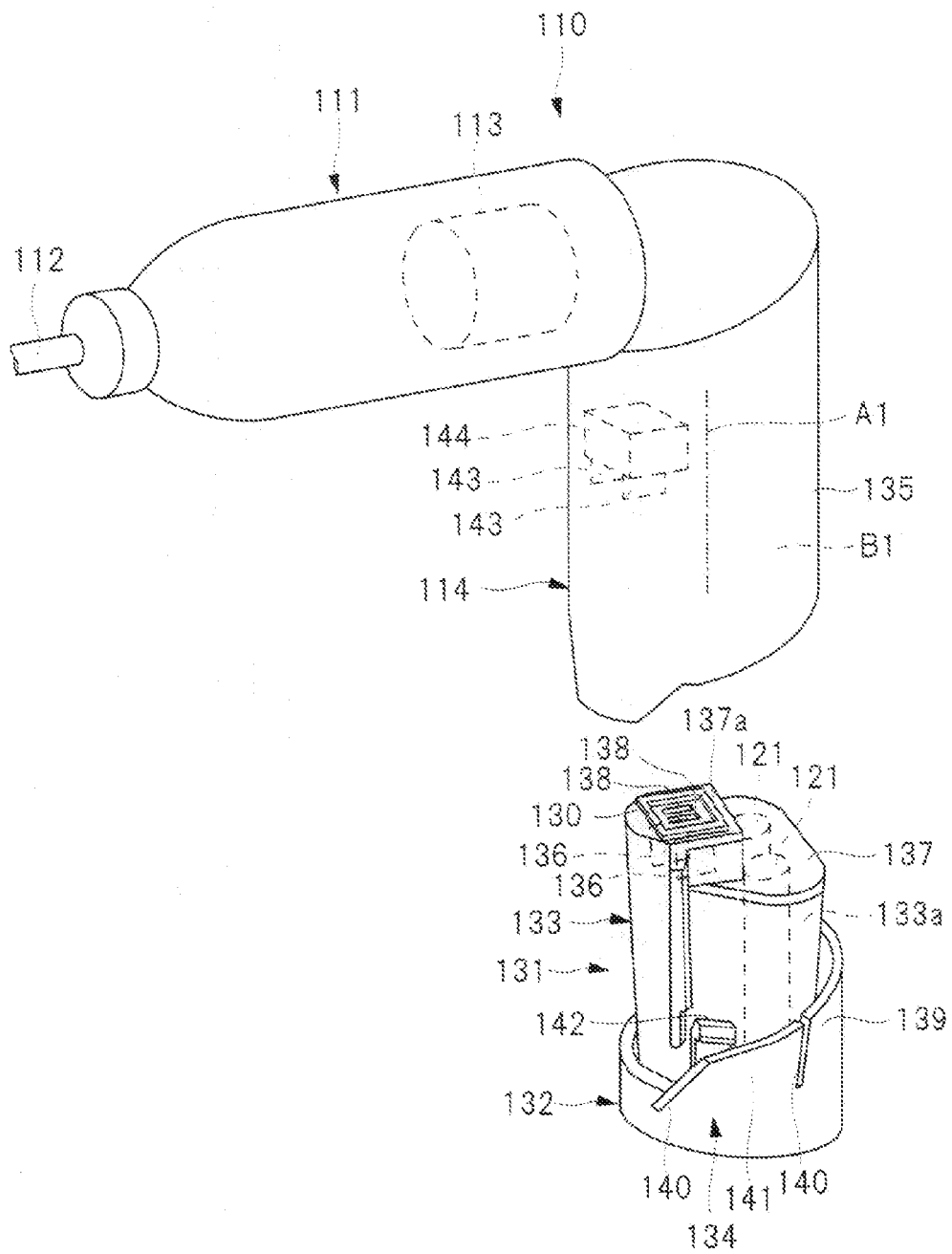
FIG. 22 is a schematic perspective view of an electric power tool and a battery pack according to a fourth embodiment of the present invention.

A configuration of the battery pack of the present invention will be explained based on FIG. 22. The configuration of the electric power tool 110 and the configuration of the battery pack 131 illustrated in FIG. 22 are common with the configuration of the electric power tool 110 and the configuration of the battery pack 131 illustrated in FIG. 21. When the configuration illustrated in FIG. 21 and the configuration illustrated in FIG. 22 are compared with each other, a part of the battery pack 131 at which the seal member 130 is attached is different from each other. In the battery pack 131 of FIG. 21, the surface of the part of the mount part 137a where the openings 138 are formed is flattened. And, the seal member 130 is annularly provided on the surface of the mount part 137a so as to surround the openings 138. A planar shape of the seal member 130 is substantially rectangular. That is, the seal member 130 is not attached to the side plate 139 and the operating pieces 141. The seal member 130 is made of the same material and is fixed by the same method as those of the seal member 130 of the second embodiment. Also, a contact part 144 which is to be in contact with the seal member 130 to form a seal surface is provided inside the attachment part 135. The contact part 144 is provided with the device-side terminals 143. As the cross-sectional shape of the seal member 130 in FIG. 22, the cross-sectional shapes of the seal members 130 of FIGS. 18A to 19B are included. In a fourth embodiment, the other configurations are the same as those of the second embodiment.

In FIG. 22, an operation of attaching the battery pack 131 to the attachment part 135 is substantially the same as the operation explained with reference to FIG. 21. In the fourth embodiment, before the side plate 139 and the operating pieces 141 are in contact with an outer peripheral edge of the attachment part 135, the two latch hooks 142 are in contact with the attachment part 135 to be elastically deformed. Then, the latch hooks 142 and the latch pieces are latched with each other, so that the attachment of the battery pack 131 with respect to the attachment part 135 is completed. When the attachment of the battery pack 131 with respect to the attachment part 135 is completed, the battery pack 131 does not detach from the attachment part 135 since the latch hooks 142 and the latch pieces are latched with each other.

On the other hand, when the attachment of the battery pack 131 with respect to the attachment part 135 is completed, the battery-side terminals 136 and the device-side terminals 143 are connected to each other. Also, the seal member 130 is in contact with the contact part 144 to form a seal surface. And, when the battery pack 131 of FIG. 22 is attached to the attachment part 135 of the electric power tool 110, the connecting parts between the battery-side terminals 136 and the device-side terminals 143 are sealed by the seal member 130. Therefore, the entering of the foreign substances into the connecting parts between the battery-side terminals 136 and the device-side terminals 143 can be prevented.

Also, when the battery pack 131 is attached to the attachment part 135 of the electric power tool 110, the seal member 130 illustrated in FIG. 22 is annularly formed along a plane intersecting with the center line A1 of the grip 114. Therefore, when the battery pack 131 and the attachment part 135 are relatively moved in the longitudinal direction of the grip 114 so as to approach each other, the contact of the seal member 130 with the attachment part 135 resulting in the friction with the battery pack can be prevented. Note that the operation of detaching the battery pack 131 of FIG. 22 from the attachment part 135 is the same as the operation of detaching the battery pack 131 of FIG. 21.

Fifth Embodiment

Figure 23:
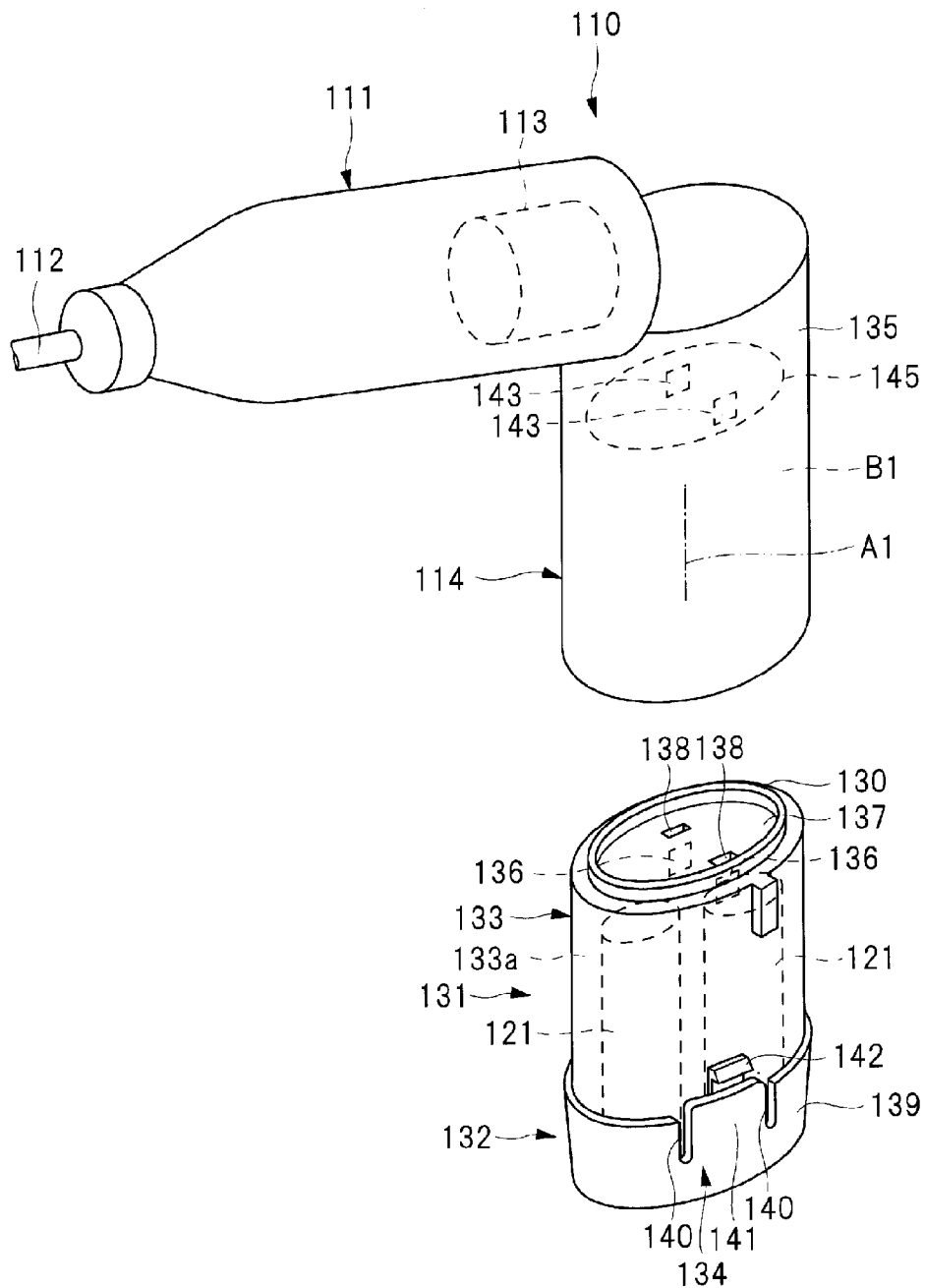
FIG. 23 is a schematic perspective view of an electric power tool and a battery pack according to a fifth embodiment of the present invention.

Another configuration of the battery pack of the present invention is illustrated in FIG. 23. In the battery pack 131 of FIG. 23, two battery cells 121 can be aligned and housed in the housing chamber 133a of the case main body 133. The opening of the case main body 133 is closed by the cover 134. In the housing chamber 133a, connecting plates which are connected to anodes and cathodes of the battery cells 121 and the battery-side terminals 136 which are electrically connected to the connecting plates via a circuit board are provided. The wall 137 is formed at an end of the case main body 133 opposite to the cover 134. A planar shape of the wall 137 is an elliptical shape or a track shape, and the openings 138 which penetrate through the wall 137 in a thickness direction thereof are provided. The battery-side terminals 136 are arranged at locations corresponding to the openings 138 inside the case main body 133. A surface of the wall 137 is flattened, and the seal member 130 is attached to the surface of the wall 137. The seal member 130 is annularly formed so as to surround the two openings 138. That is, the planar shape of the seal member 130 is the elliptical shape or the track shape. Meanwhile, in the space B1, a contact part 145 with which the seal member 130 is in contact to form a seal surface is provided.

The contact part 145 is a flat surface which is formed in an elliptical shape or a track shape inside a plane substantially perpendicular to the center line of the grip 114. The contact part 145 includes a bottom surface of a concave part and a top surface of a convex part. Note that the other configurations of the battery pack 131 and the electric power tool 110 illustrated in FIG. 23 are the same as the configurations of the battery pack 131 and the electric power tool 110 illustrated in FIG. 22.

The operation of attaching the battery pack 131 of FIG. 23 to the attachment part 135 is the same as the operation of attaching the battery pack 131 of FIG. 22 to the attachment part 135. When the battery pack 131 of FIG. 23 is attached to the attachment part 135, the seal member 130 is in contact with the contact part 145 to form an annular seal surface. Therefore, the connecting parts between the battery-side terminals 136 and the device-side terminals 143 are sealed by the seal member 130, so that effects similar to those of the battery pack 131 of FIG. 22 are obtained. In the battery pack 131 of FIG. 23, note that similar effects can be obtained in the same components as those of the battery pack 131 of FIG. 22. Further, the seal member 130 of FIG. 23 is annularly formed inside a plane perpendicular to the center line A1 of the grip 114. Therefore, when the battery pack 131 and the attachment part 135 are relatively moved in the longitudinal direction of the grip 114 so as to approach each other, the contact of the seal member 130 with the attachment part 135 resulting in the friction therebetween can be prevented.

Sixth Embodiment

Figure 24:
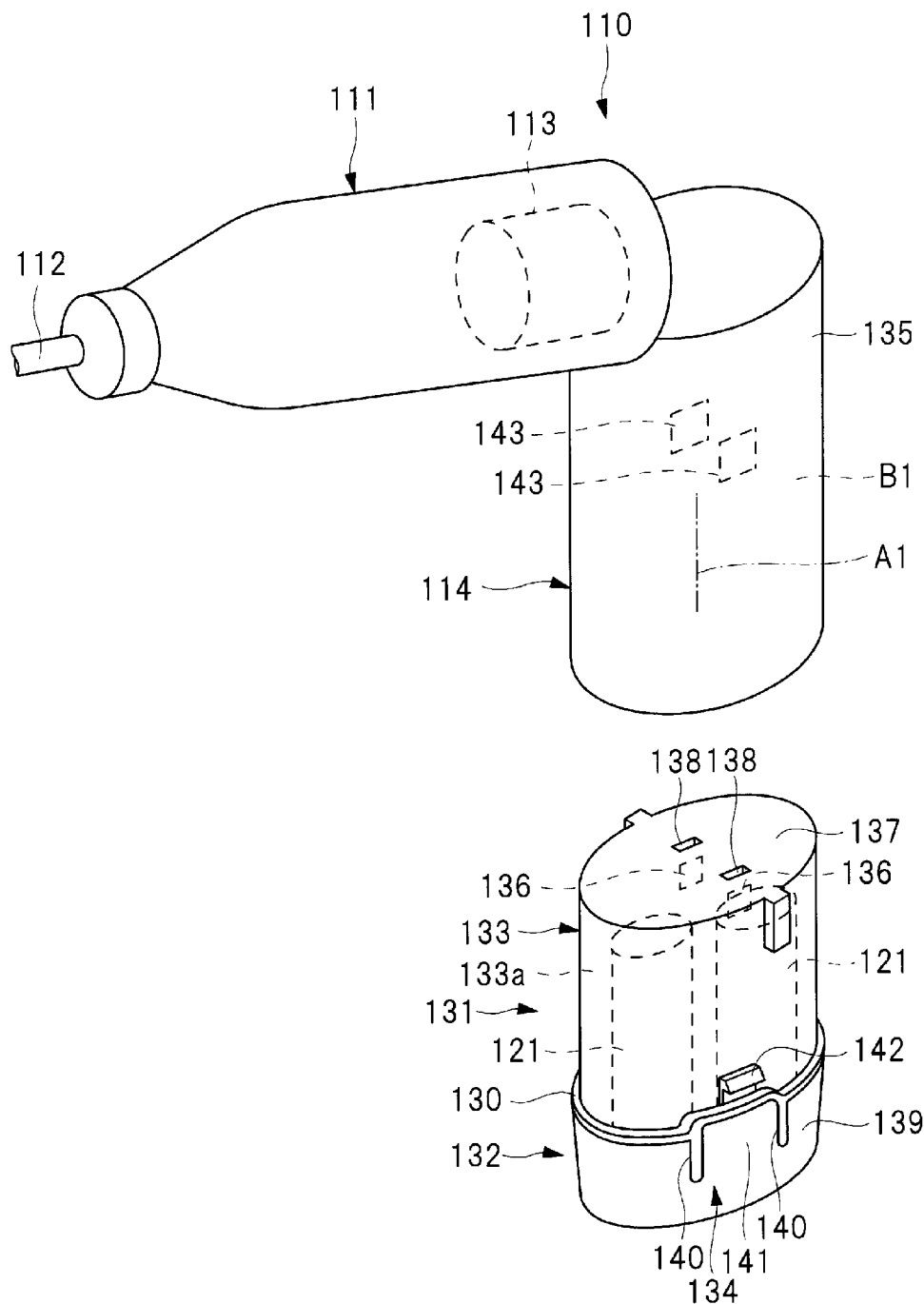
FIG. 24 is a schematic perspective view of an electric power tool and a battery pack according to a sixth embodiment of the present invention.

Another configuration of the battery pack 131 of the present invention will be explained based on FIG. 24. The shape and structure of the battery pack 131 of FIG. 24 are substantially the same as the shape and structure of the battery pack 131 of FIG. 24. When the battery pack 131 of FIG. 24 and the battery pack 131 of FIG. 23 are compared with each other, a part thereof at which the seal member 130 is attached is different from each other. In the battery pack 131 of FIG. 24, as similar to the battery pack 131 of FIG. 21, the seal member 130 is attached over the edge part of the side plate 139, the edge parts of the operating pieces 141, and besides, the cut-out parts 140. That is, the seal member 130 of FIG. 24 is annularly formed so as to surround the periphery of the case main body 133. Note that the electric power tool 110 of FIG. 24 does not have the contact part 145 of FIG. 23. The other configurations of the electric power tool 110 and the battery pack 131 of FIG. 24 are the same as the configurations of the electric power tool 110 and the battery pack 131 of FIG. 23. Further, as the cross-sectional shape of the seal member 130 of FIG. 24, the cross-sectional shapes of the seal members 130 illustrated in FIGS. 18A to 20 are included.

The action and the operation performed when the battery pack 131 of FIG. 24 is attached to the attachment part 135 are substantially the same as those performed when the battery pack 131 of FIG. 21 is attached to the attachment part 135. The seal member 130 of FIG. 24 is in contact with the outer peripheral edge of the attachment part 135 and is elastically deformed to form a seal surface. Therefore, the foreign substances outside the space B1 do not enter the space B1, so that the same effects as those of the battery pack 131 and the electric power tool 110 of FIG. 21 can be obtained. Further, the seal member 130 of FIG. 24 is annularly formed along a plane intersecting with the center line A1 of the grip 114. Therefore, when the battery pack 131 and the attachment part 135 are relatively moved in the longitudinal direction of the grip 114 so as to approach each other, the contact of the seal member 130 with the attachment part 135 resulting in the friction therebetween can be prevented. Further, since the cut-out parts 140 are sealed by the seal member 130 in the state that the battery pack 131 of FIG. 24 is attached to the attachment part 135, the entering of the foreign substances from the outside into the space B1 through the cut-out parts 140 can be prevented.

Seventh Embodiment

Figure 25:
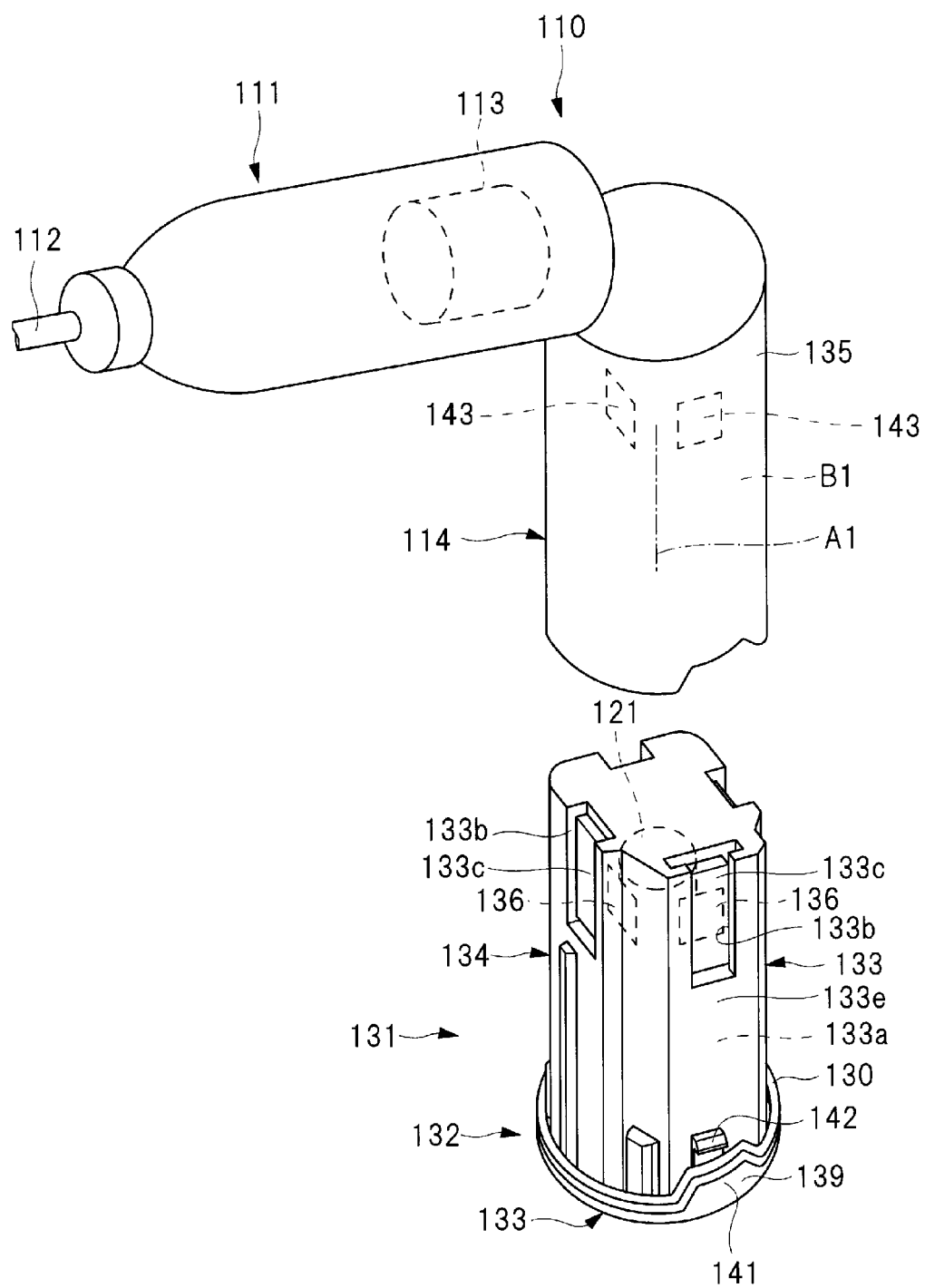
FIG. 25 is a schematic perspective view of an electric power tool and a battery pack according to a seventh embodiment of the present invention.

Another configuration of the battery pack 131 of the present invention will be explained based on FIG. 25. In the battery pack 131 of FIG. 25, the seal member 130 is attached over the edge part of the side plate 139 of the cover 134 and the edge parts of the operating pieces 141. That is, the seal member 130 has an annular shape that surrounds the periphery of the case main body 133. Also, one battery cell 121 is vertically housed in the housing chamber 133a of the case main body 133. In the housing chamber 133a, connecting plates which are connected to an anode and a cathode of the battery cell 121 are provided. The connecting plates are connected to the battery-side terminals 136 via a circuit board. In a side wall 133e of the case main body 133, openings 133b are provided, and shutters 133c which open/close the openings 133b are provided. The shutters 133c are slidable in the longitudinal direction of the case main body 133. In the housing chamber 133a, an elastic member is provided so as to close the openings 133b by the shutters 133c. Further, the operating pieces 141 are provided continuously from the side plate 139. The operating pieces 141 are provided with the latch hooks 142. Further, at an edge part of the side plate 139 and edge parts of the operating pieces 141, the seal member 130 is attached over the entire periphery thereof. The seal member 130 is made of a material similar to that of the second embodiment. When the seal member 130 has a solid structure, the seal member 130 and the cover 134 can be integrated by two-layer molding. As the cross-sectional shape of the seal member 130 of FIG. 25, the cross-sectional shapes of the seal members 130 of FIGS. 18A to 20 are included.

Meanwhile, in the space B1 of the electric power tool 110, convex parts in contact with the shutters 133c are provided. Also, inside the space B1 of the electric power tool 110, the device-side terminals 143 are provided. Further, in the space B1 of the electric power tool 110, latch pieces to be engaged with the latch hooks 142 are provided. The other configurations of the battery pack 131 and the electric power tool 110 of FIG. 25 are the same as the configurations of the battery pack 131 and the electric power tool 10 of FIG. 24.

Next, an operation of attaching the battery pack 131 of FIG. 25 to the attachment part 135 will be explained. As similar to the above description, the case main body 133 is moved into the space B1. Accordingly, the convex parts are in contact with and move the shutters 133c, so that the openings 133b are opened. Then, the device-side terminals 143 and the battery-side terminals 136 are connected to each other. Also, the seal member 130 is in contact with the outer peripheral edge of the attachment part 135 and is elastically deformed to form an annular seal surface. Further, the latch hooks 142 are latched with the latch pieces, so that the battery pack 131 is fixed to the attachment part 135. The seal member 130 of FIG. 25 is in contact with the outer peripheral edge of the attachment part 135 to form an annular seal surface. Therefore, the entering of the foreign substances from the outside into the space B1, that is, the entering thereof into the connecting parts between the device-side terminals 143 and the battery-side terminals 136 can be prevented.

Further, the seal member 130 is annularly formed along a plane intersecting with the center line A1 of the grip 114. Therefore, when the battery pack 131 and the attachment part 135 are relatively moved in the longitudinal direction of the grip 114 so as to approach each other, the contact of the seal member 130 with the outer peripheral edge of the attachment part 135 resulting in the friction therebetween can be prevented.

Eighth Embodiment

Figure 26:
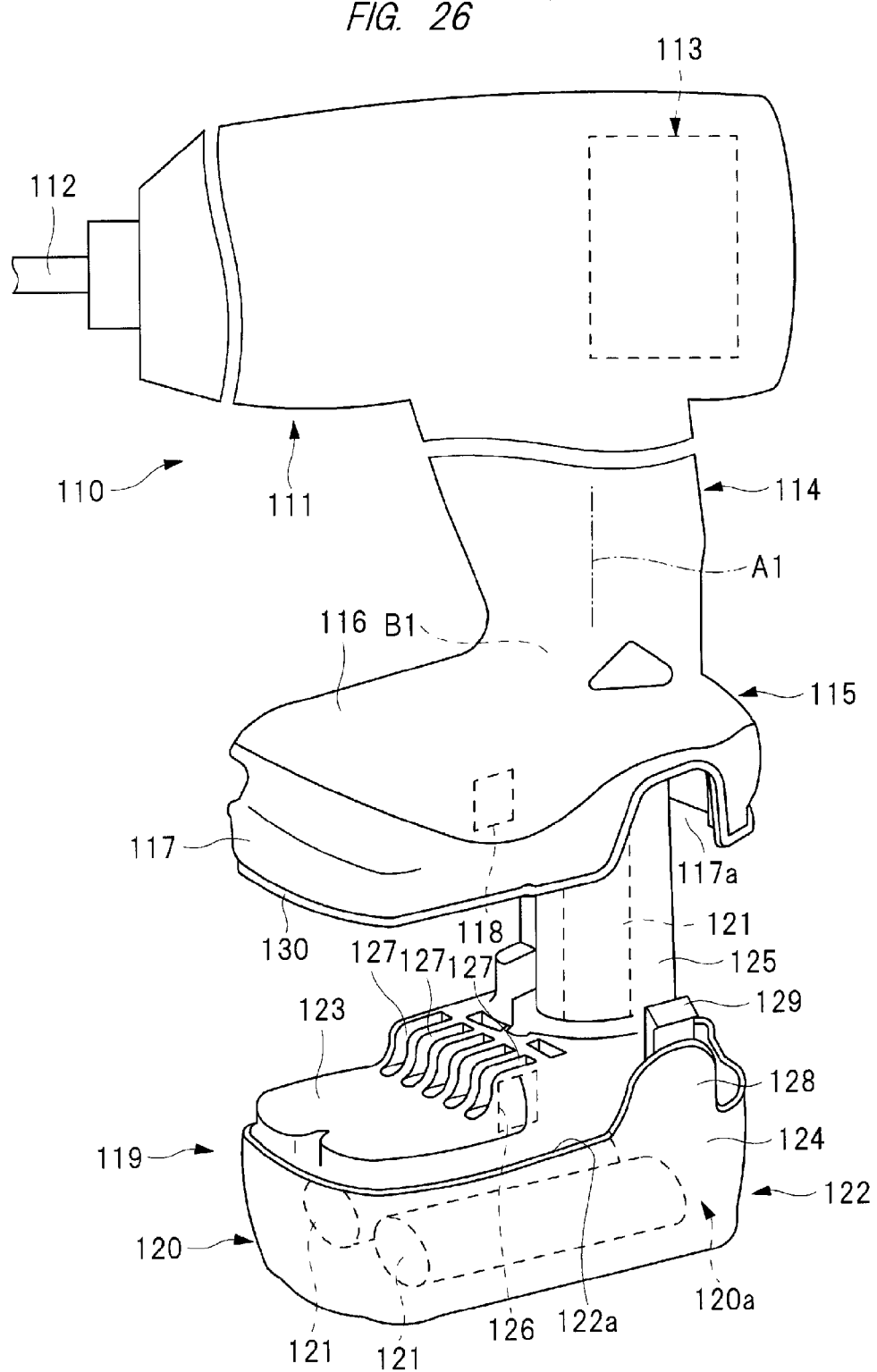
FIG. 26 is a schematic perspective view of an electric power tool and a battery pack according to an eighth embodiment of the present invention.

An Embodiment of the electric power tool 110 of the present invention will be explained based on FIG. 26. In the electric power tool 110 illustrated in FIG. 26, the seal member 130 is attached over the edge part of the side plate 117 and the edge parts of the cut-out parts 117a. The seal member 130 has an annular shape, and the seal member 130 is integrated with the attachment part 115 by two-layer molding. As the cross-sectional shape of the seal member 130 in the width direction, the cross-sectional shapes illustrated in FIGS. 18A to 20 are included. The battery pack 119 illustrated in FIG. 26 is not provided with the seal member 130. The other configurations of the electric power tool 110 and the battery pack 119 illustrated in FIG. 26 are the same as the configurations of the electric power tool 110 and the battery pack 119 illustrated in FIG. 17.

The operation of attaching the battery pack 119 to the electric power tool 110 of FIG. 26 is substantially the same as that of the electric power tool 110 of FIG. 17. When the battery pack 119 is attached to the attachment part 115 in the electric power tool 110 of FIG. 26, the seal member 130 is in contact with the edge part of the side plate 124 of the case main body 122 and the edge parts of the operating pieces 128 and is elastically deformed to form an annular seal surface. That is, the seal member 130 is compressed in the direction of the attachment of the battery pack 119. Therefore, the entering of the foreign substances from the outside to the inside can be prevented. The other effects obtained when the battery pack 119 is attached to the electric power tool 110 in FIG. 26 are the same as the effects obtained when the battery pack 119 is attached to the electric power tool 110 in FIG. 17.

Ninth Embodiment

Figure 27:
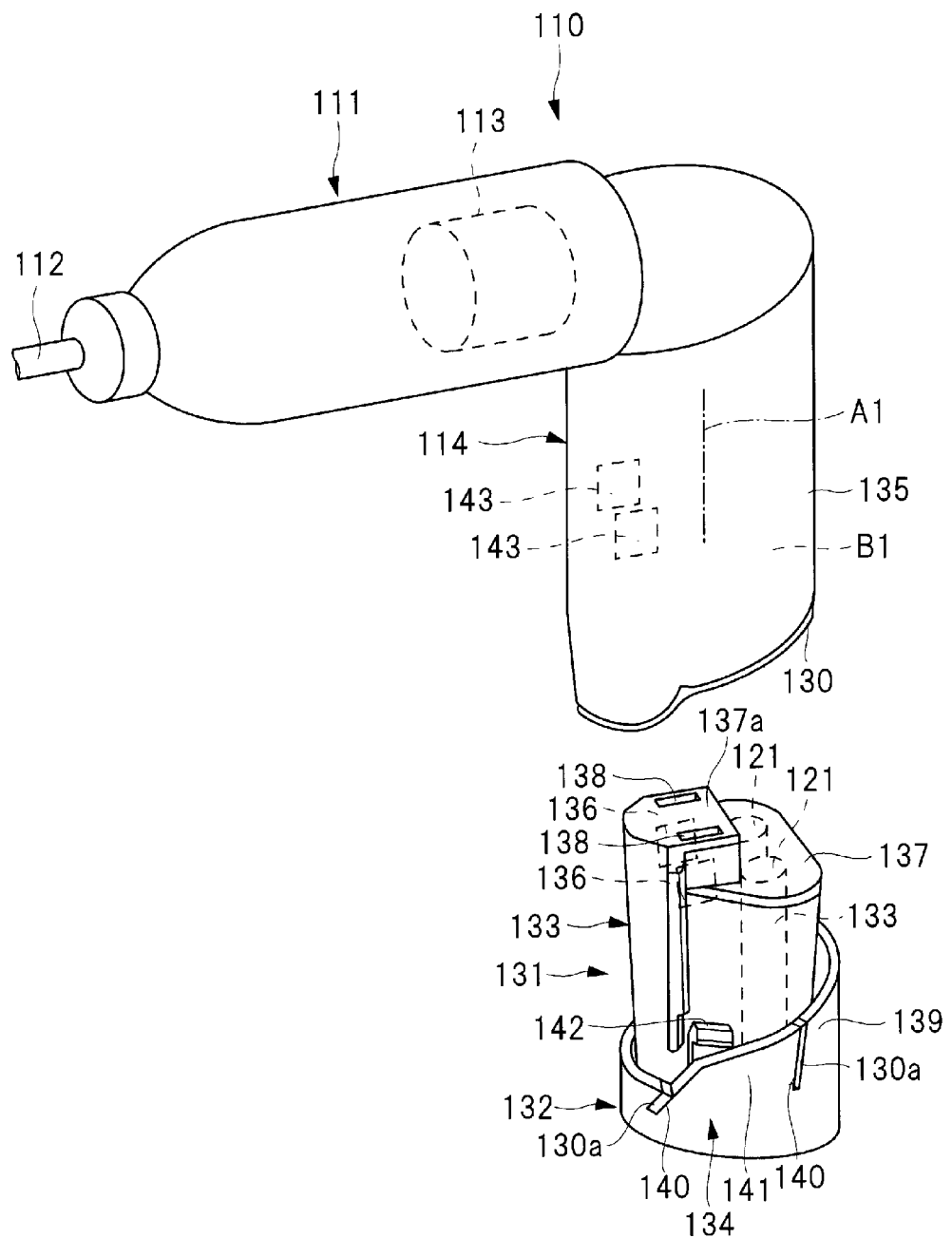
FIG. 27 is a schematic perspective view of an electric power tool and a battery pack according to a ninth embodiment of the present invention.

Another embodiment of the electric power tool 110 of the present invention will be explained based on FIG. 27. In the electric power tool 110 illustrated in FIG. 27, the seal member 130 is attached over the entire periphery of the edge part of the attachment part 135. The seal member 130 has an annular shape, and the seal member 130 is integrated with the attachment part 135 by two-layer molding. As the cross-sectional shape of the seal member 130 in the width direction, the cross-sectional shapes illustrated in FIGS. 18A to 20 are included. The battery pack 131 illustrated in FIG. 27 is not provided with the above-described seal member 130. Meanwhile, in the battery pack 131 illustrated in FIG. 27, the cut-out parts 140 are filled with a seal member 130a. The seal member 130a is made of the same material as that of the seal member 130. The seal member 130a is integrated with the cover 134 by two-layer molding. The other configurations of the electric power tool 110 and the battery pack 131 illustrated in FIG. 27 are the same as the configurations of the electric power tool 110 and the battery pack 131 illustrated in FIG. 21.

The operation of attaching the battery pack 131 to the electric power tool 110 of FIG. 27 is substantially the same as that of the electric power tool 110 of FIG. 21. In the electric power tool 110 of FIG. 27, when the battery pack 131 is attached to the attachment part 135, the seal member 130 is in contact with the edge part of the side plate 139 of the cover 134 and the edge part of the operating pieces 141 to form an annular seal surface. Therefore, the entering of the foreign substances from the outside to the inside can be prevented. Also, other effects obtained when the battery pack 131 is attached to the electric power tool 110 in FIG. 27 are the same as the effects obtained when the battery pack 131 is attached to the electric power tool 110 in FIG. 21.

OTHER EMBODIMENTS

The electric power tool of the present invention also includes a configuration in which the seal member 130 attached to the battery pack 131 in FIGS. 22 to 25 is attached to the attachment part 135 but the seal member 130 is not attached to the battery pack 131. Illustration of the configuration in which the seal member 130 is attached to the attachment part 135 of the electric power tool 110 in FIGS. 22 to 25 is omitted for the sake of convenience.

A correspondence relation between the configurations explained in the second embodiment to the ninth embodiment and the configuration of the present invention will be explained. A device main body of the present invention includes the grip 114 and the attachment part 135, an abutting part of the present invention includes the attachment part 135 and the case main body 122, a retaining case of the present invention includes housing cases 120 and 132, and a movable piece of the present invention includes the operating pieces 141 and the latch hooks 142. Also, from a combination of the electric power tool 110 and the battery pack 119, the electric apparatus of the present invention is configured. Further, from a combination of the electric power tool 110 and the battery pack 131, the electric apparatus of the present invention is configured.

According to the electric device of the present invention, when the battery pack is attached to the device main body, the contact of the seal member with the battery pack resulting in the friction therebetween can be prevented. Therefore, reduction in the sealing property of the seal member can be suppressed.

According to an aspect of the present invention, the connecting locations between the battery-side terminals and the device-side terminals can be reliably sealed by the seal member.

According to another aspect of the present invention, since the seal member is integrated with the device main body by two-layer molding, the detachment of the seal member from the device main body can be prevented, so that the sealing property is improved.

According to the battery pack of the present invention, when the battery pack is attached to the electric device, the contact of the seal member with the electric device resulting in the friction therebetween can be prevented. Therefore, reduction in the sealing property of the seal member can be suppressed.

According to an aspect of the present invention, the connecting location between the battery-side terminal and the device-side terminal can be reliably sealed by the seal member.

According to another aspect of the present invention, since the seal member is integrated with the retaining case by two-layer molding, the detachment of the seal member from the retaining case can be prevented, so that the sealing property is improved.

According to another aspect of the present invention, the movable piece is moved when the retaining case is attached to the electric device and when detached from the electric device.

According to further another aspect of the present invention, since the cut-out part which allows the movement of the movable piece is covered with the seal member, the cut-out part can be sealed in a state that the battery pack is attached to the electric device.

According to the electric apparatus of the present invention, when the device main body of the electric device is attached to the battery pack, the contact of the seal member with the battery pack resulting in the friction therebetween can be prevented. Therefore, reduction in the sealing property of the seal member can be suppressed.

According to the electric apparatus of the present invention, when the battery pack is attached to the device main body of the electric device, the contact of the seal member with the device main body of the electric device resulting in the friction therebetween can be prevented. Therefore, reduction in the sealing property of the seal member can be suppressed.

The "endless shape" in the present invention includes a structure in which the seal member is an integrally molded annular object as a whole and a structure in which the seal member has an endless shape without any cut in a state that the seal member is fixed to a target object even if there is a cut at least at one location of the seal member in the longitudinal direction. The "abutting part" in the electric device of the present invention includes structures of contact thereof with and non contact thereof with the battery pack in a state that the battery pack is attached to the device main body. The "abutting part" in the battery pack of the present invention includes structures of contact thereof with and non contact thereof with the electric device in a state that the retaining case is attached to the electric device.

The seal member which is attached to the electric device or the battery pack of the present invention is configured so as not to cause the friction with a counterpart member before the seal surface is formed when the battery pack and the grip are relatively moved in the longitudinal direction of the grip. Here, the counterpart member includes the attachment part of the electric device and the housing case. That is, the seal member is only required to be arranged in the endless shape inside the plane intersecting with the longitudinal direction of the grip. This means that the plane intersecting with the longitudinal direction of the grip is not required to be perpendicular to the longitudinal direction of the grip. The electric device and the battery pack of the present invention have a structure which is a so-called insertion structure in which the battery pack is moved in the longitudinal direction of the grip so that a part of the battery pack is inserted into the attachment part. Further, the housing case may be configured to be able to house four or more battery cells.

Tenth Embodiment

Conventionally, an electric device having a device main body and a battery pack which is attachable/detachable to/from the device main body has been known, and an example of the electric device is described in Patent Literature 1. The electric device described in Patent Literature 1 is provided with a device main body and a hammer case. The device main body is formed in a tubular shape, and the hammer case is fixed to an open end of the device main body. Also, the device main body has a grip, and a battery pack which is attachable/detachable to/from the grip is provided. A motor is provided inside the device main body. An aim of the electric device described in Patent Literature 1 is to ensure a sealing property, and rubber is provided in a tubular part of the grip. This rubber plays a role of seal.

Incidentally, although not described in Patent Literature 1, the grip of the device main body is provided with device-side terminals, and the device-side terminals are electrically connected to the motor. Also, a battery cell(s) is housed inside the battery pack, and the battery pack has battery-side terminals connected to the battery cell. When the battery pack is attached to the grip, the device-side terminals and the battery-side terminals are connected to each other.

However, while the rubber described in Patent Literature 1 is provided inside the tubular part of the grip, it does not reach a sealing target space where the device-side terminals and the battery-side terminals are provided.

A preferred aim of the present invention is to provide an electric device capable of ensuring sealing property of a sealing target space where device-side terminals provided in a device main body and battery-side terminals provided in a battery pack are provided.

Hereinafter, an embodiment of the electric device of the present invention will be explained in detail by using drawings. The following embodiment will be explained by taking an electric power tool which is included in the electric device as an example.

Figure 28:
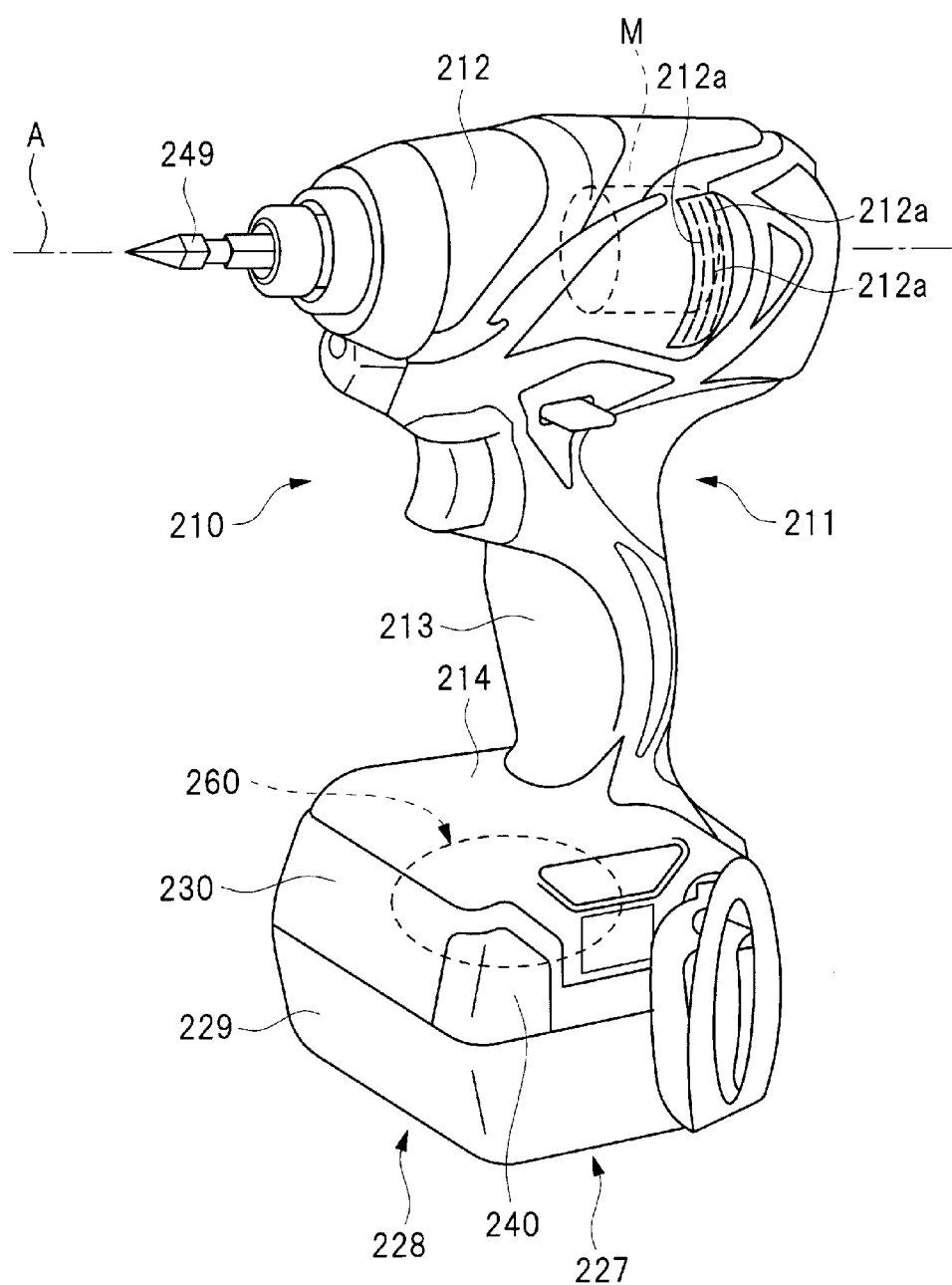
FIG. 28 is a perspective view illustrating a state in which an electric power tool according to a tenth or eleventh embodiment of the present invention has been assembled.
Figure 29:
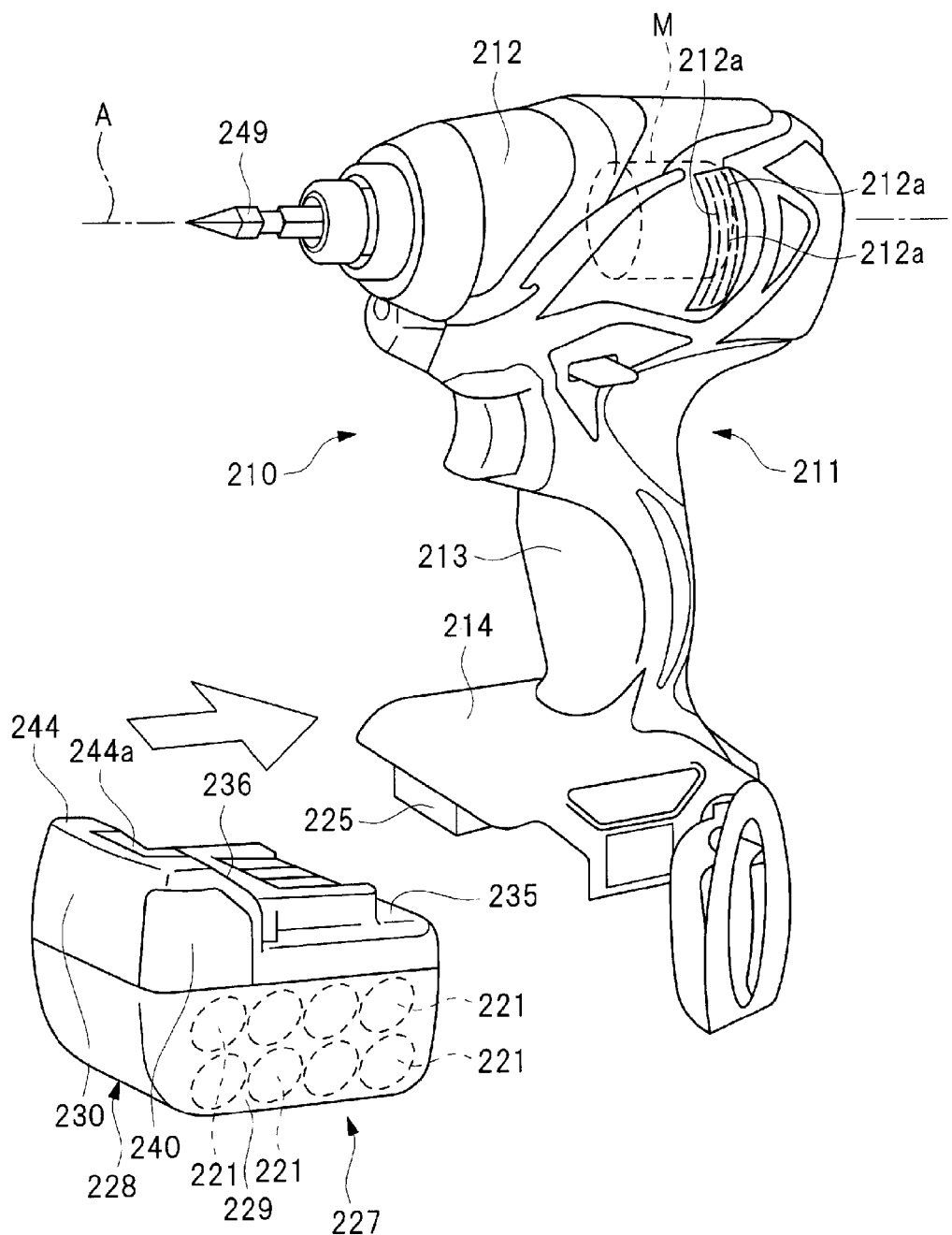
FIG. 29 is a perspective view obtained prior to the assembly of the electric power tool according to the tenth or eleventh embodiment of the present invention.

An electric power tool 210 illustrated in FIGS. 28 and 29 has a tool main body 211 made of a resin material. The tool main body 211 has a casing 212, a grip 213, and an attachment part 214. The casing 212 is formed in a tubular shape, and an electric motor M is provided inside the casing 212. The electric motor M has a rotation shaft which rotates around an axis line A. Also, a tip tool 249 is configured to be attachable/detachable to/from an end of the casing 212. Further, a motive-power transmitting mechanism which transmits the motive power of the electric motor M to the tip tool 249 is provided inside the casing 212. The motive-power transmitting mechanism has at least one of structures among a structure in which the rotary motion of the rotation shaft of the electric motor M is converted into rotary motion of the tip tool 249, a structure in which the rotary motion is converted into striking motion while rotating the tip tool 249, and a structure in which the rotary motion of the electric motor M is converted into reciprocating motion of the tip tool 249. Tip tool 249 rotates around the axis line A, rotationally strikes, or reciprocates. That is, as the electric power tool 210, an impact driver, a drill, a driver, a hammer, a hammer drill, a hammer driver, and others are include.

Figure 30:
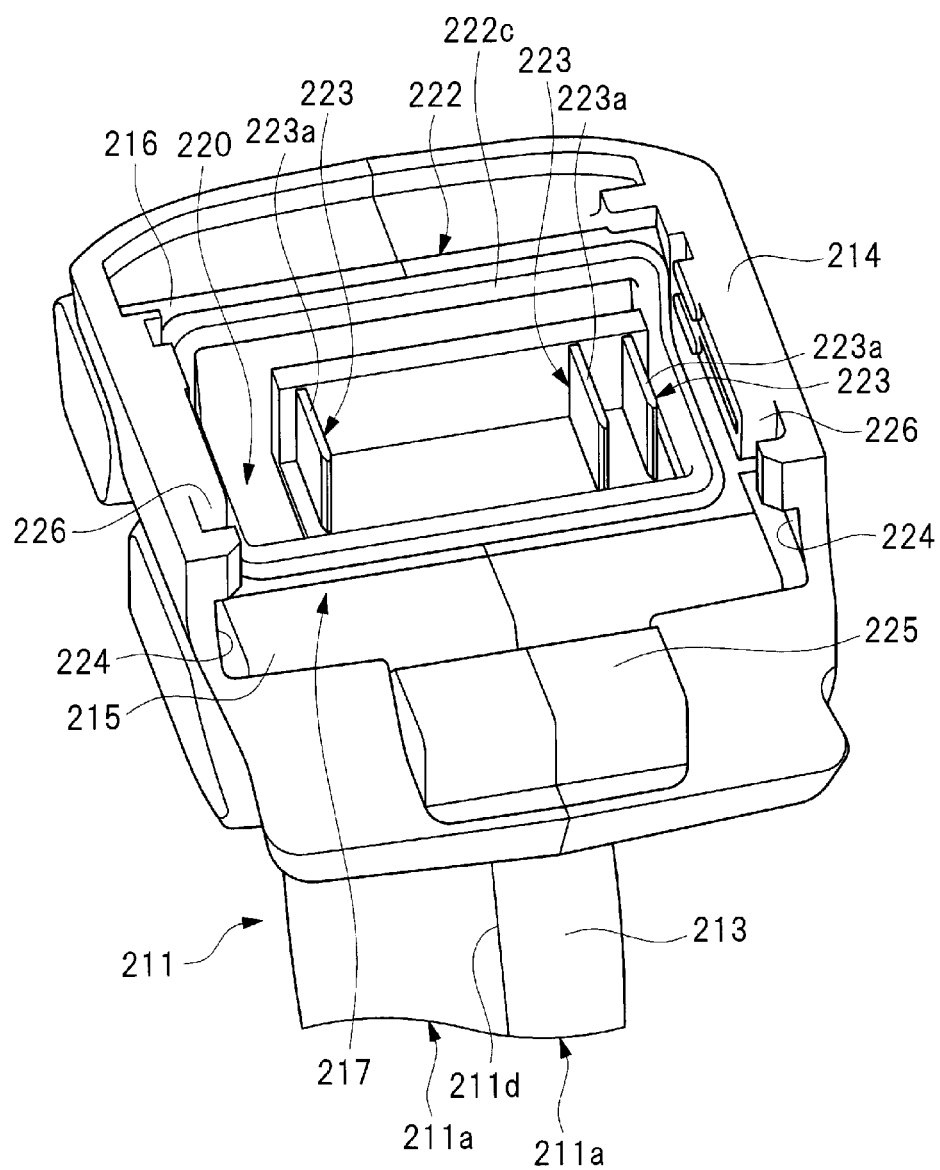
FIG. 30 is a perspective view illustrating an attachment part of the electric power tool according to the tenth embodiment of the present invention.

Also, the grip 213 is formed continuously from the casing 212, and is protruded from the casing 212 in a predetermined direction. The protruding direction of the grip 213 is a direction intersecting with the axis line A on a plane including the axis line A. A circuit board electrically connected to the electric motor M is provided, and the circuit board is arranged in the grip 213. The attachment part 214 is provided at an end of the grip 213 in the protruding direction thereof. The casing 212, the grip 213, and the attachment part 214 are integrally molded by using, for example, a resin material. Also, as illustrated in FIG. 30, the tool main body 211 has two constituent pieces 211a, which are divided along a dividing surface 211d, and the two constituent pieces 211a are coupled and fixed to each other so as to assemble the tool main body 211. The axis line A is positioned inside the dividing surface 211d, and the dividing surface 211d is positioned over the casing 212, the grip 213, and the attachment part 214. Also, the two constituent pieces 211a have shapes and configurations which are substantially bilaterally symmetrical to each other across the dividing surface 211d. That is, the casing 212, the grip 213, and the attachment part 214 have shapes and configurations which are substantially bilaterally symmetrical to each other across the dividing surface 211d.

Figure 31:
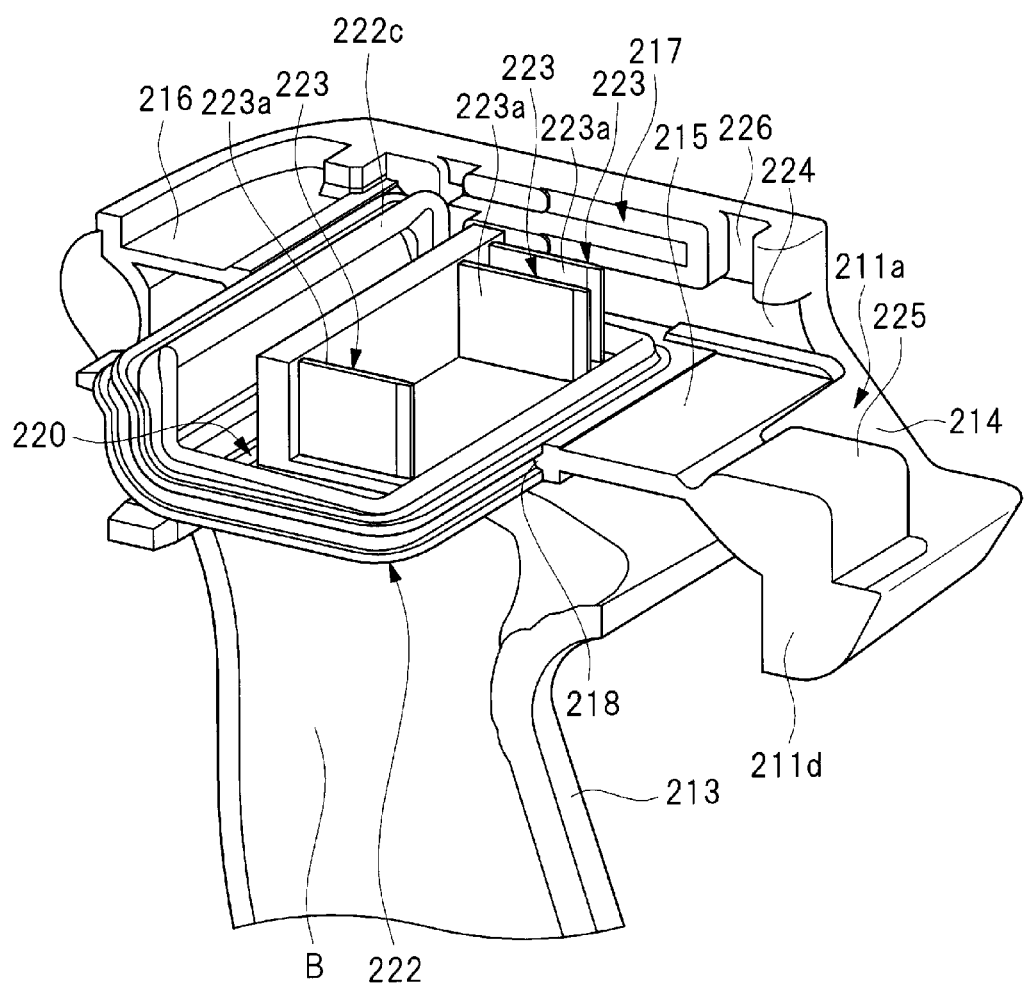
FIG. 31 is a perspective view illustrating a state in which a tool main body of the electric power tool according to the tenth embodiment of the present invention is divided.

A vent hole 212a is formed in the casing 212, and the inside and the outside of the casing 212 are communicated to each other by the vent hole 212a. The vent hole 212a is a passage of air which cools the electric motor M. Also, as illustrated in FIGS. 30 and 31, the attachment part 214 is provided with a first partition wall 215 and a second partition wall 216. The first partition wall 215 and the second partition wall 216 are extended so as to be substantially perpendicular to the dividing surface 211d. That is, the first partition wall 215 and the second partition wall 216 are extended so as to be substantially parallel to the axis line A. Also, the attachment part 214 is provided with an opening 217. The inside B extended from the attachment part 214 to the grip 213 is formed. The first partition wall 215 and the second partition wall 216 partition the inside B from the opening 217.

An attachment hole is provided between the first partition wall 215 and the second partition wall 216 of the attachment part 214. The attachment hole is formed by the two constituent pieces 211a. The attachment hole is provided for attaching a terminal holder 220, which serves as a device-side retaining member.

On the other hand, a rib 218 is formed on inner peripheral edges of the first partition wall 215 and the second partition wall 216 which form the attachment hole. The rib 218 is annularly formed over the two constituent pieces 211a. The terminal holder 220 is indirectly supported by the rib 218. The terminal holder 220 is integrally molded by using a resin material. A seal member 222 is attached to an outer periphery of the terminal holder 220. The seal member 222 is integrally molded by using a rubber-like elastic body. An annular outer groove 222b is formed on an outer periphery of the seal member 222. An annular seal lip 222c is formed over the entire periphery of the seal member 222. The terminal holder 220 and the seal member 222 are integrated by using an adhesive agent. Note that the terminal holder 220 and the seal member 222 can be integrated by two-layer molding.

Also, the rib 218 is fitted into the outer groove 222b of the seal member 222 so as to fix the seal member 222 to the attachment part 214. In this manner, the terminal holder 220 is clamped via the seal member 222 by the rib 218 which is provided in the two constituent pieces 211a so as to be fixed. In a state that the terminal holder 220 is fixed to the attachment part 214, the seal lip 222c of the seal member 222 is positioned at the opening 217.

As illustrated in FIGS. 30 and 31, a plurality of device-side terminals 223 are embedded in the terminal holder 220. The plurality of device-side terminals 223 are made of an electrically-conductive metal material. Also, in the state that the terminal holder 220 is fixed to the attachment part 214, one ends 223b of the plurality of device-side terminals 223 are positioned inside the space B side, and the other ends 223a of the plurality of device-side terminals 223 are positioned in the opening 217. The one ends 223b of the device-side terminals 223 are electrically connected to a circuit board inside the grip 213. The other ends 223a of the plurality of device-side terminals 223 have plate shapes, and the other ends 223a of the plurality of device-side terminals 223 are extended in a direction along the dividing surface 211d between the two constituent pieces 211a.

As illustrated in FIGS. 30 and 31, the attachment part 214 has two guide grooves 224 provided on both sides of the opening 217. The guide grooves 224 are provided on the two constituent pieces 211a, respectively. The two guide grooves 224 are extended in the direction along the axis line A, and the two guide grooves 224 are parallel to each other. Further, the attachment part 214 is provided with a convex part 225. The convex part 225 is separately provided in the two constituent pieces 211a. Further, in the vicinities of the guide grooves 224 of the attachment part 214, latch grooves 226 are provided. The latch grooves 226 are provided on the two constituent pieces 211a, respectively. Note that the guide grooves 224 are provided to be orthogonal to the protruding direction of the device-side terminals 223 from the terminal holder 220.

Figure 33:
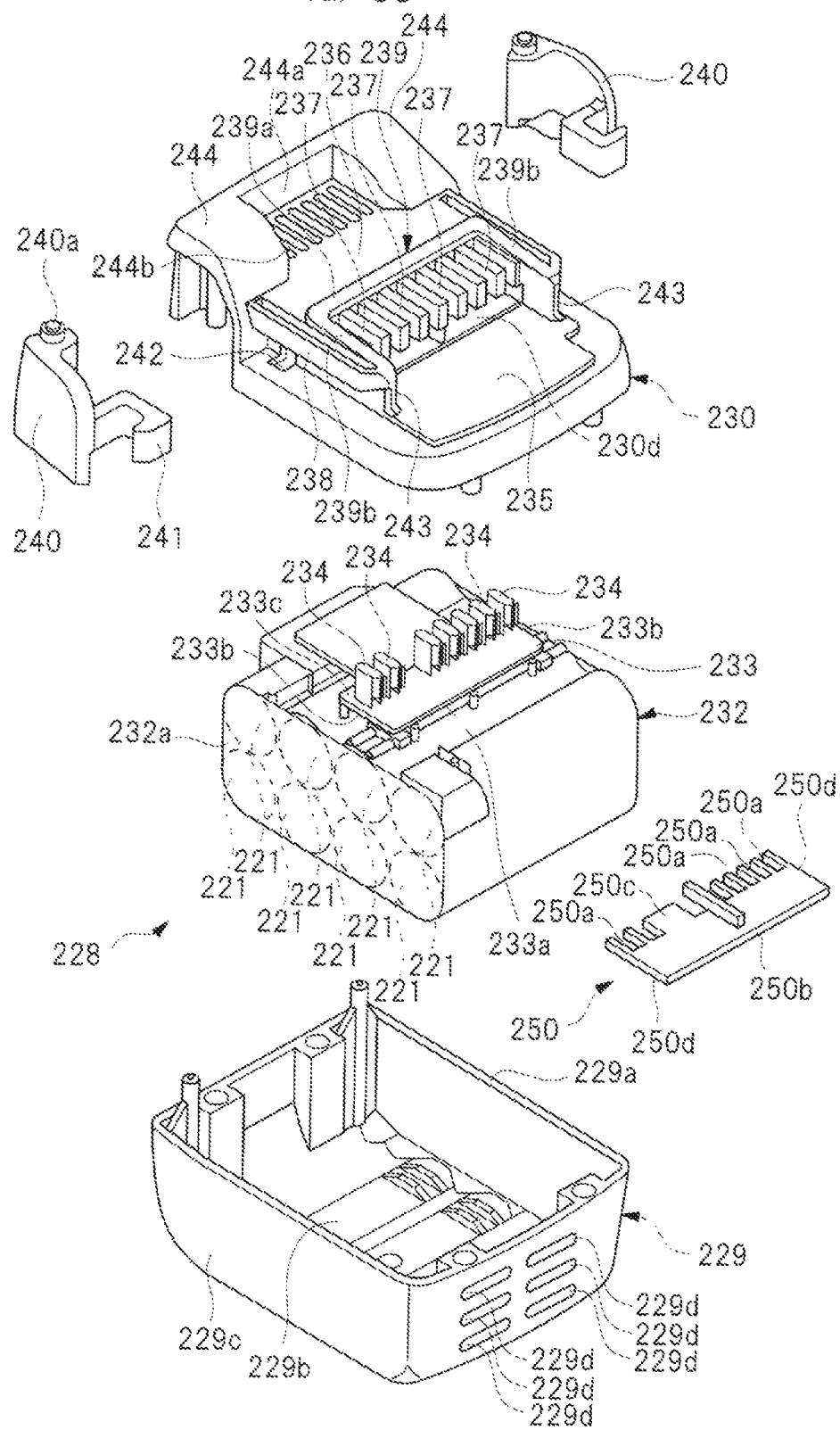
FIG. 33 is an exploded perspective view of a battery pack to be attached to the electric power tool according to the tenth embodiment of the present invention.

Next, a configuration of the battery pack 227 which is to be attached to the electric power tool 210 of FIG. 28 will be explained with reference to FIGS. 29 and 33. The battery pack 227 is attachable/detachable to/from the attachment part 214. More specifically, the battery pack 227 and the electric power tool 210 are relatively moved in the direction along the axis line A so as to attach or detach the battery pack 227 to/from the attachment part 214. The battery pack 227 has a plurality of battery cells 221, a holder 232, and a housing case 228. The battery cells 221 are secondary batteries which can be repeatedly charged and discharged. As the battery cells 221, a lithium-ion battery cell, a nickel-hydrogen battery cell, a lithium-ion polymer battery cell, a nickel-cadmium battery cell, and others are included. The battery cells 221 have cylindrical shapes, and two electrodes are provided on both ends of each of the battery cells 221 in a longitudinal direction thereof. One of the two electrodes is a cathode, and the other is an anode.

The holder 232 retains the plurality of battery cells 221 so as to be parallel to each other, and the holder 232 has a role of an insulator that covers the plurality of battery cells 221. In the present specification, the plurality of battery cells 221 are sometimes referred to as a group of the battery cells 221. The holder 232 has a tubular shape, and the group of the battery cells 221 is housed therein. The holder 232 may have either a structure with openings at both ends thereof or a structure with an opening at one end thereof.

The holder 232 of the present embodiment houses eight battery cells 221 so that four battery cells 221 aligned in parallel in one row are aligned in two rows. And, the two battery cells 221 are paired, and electrodes of four paired battery cells 221 are connected to each other by connecting members. The connecting members electrically connecting the electrodes to each other are made of a metal material having electrical conductivity. In addition to copper, aluminum, etc., a material which is a rolled steel plate whose surface is subjected to nickel plating is included in the metal material. Also, the connecting member is preferred to have a plate shape. And, a surface of each of the connecting members opposite to a part thereof in contact with the electrodes is covered with an insulating member 232a. As a material forming the insulating member 232a, an insulating tape or an insulating sheet mainly made of a resin film, a rubber-like elastic body, a metal plate having a surface on which an insulating layer made of a resin material is formed, and others are included. Note that an opening of the holder 232 or a space between the insulating member 232a and an opening edge of the holder 232 can be also covered with a sheet member, silicon, clay, etc. having a water-proof property.

Further, a circuit board 233 is attached to a body part of the holder 232. The circuit board 233 is made of a non-electrically-conductive resin material and is formed in a flat plate shape. The circuit board 233 has a linear first edge part 233a and linear second edge parts 233b which are formed continuously from both ends of the first edge part 233a. When the circuit board 233 is viewed in a plane, the two second edge parts 233b are arranged at a right angle to the first edge part 233a, and the two second edge parts 233b are parallel to each other. Also, the circuit board 233 is provided with third edge parts 233c which are formed continuously from the two second edge parts 233b, respectively. When the circuit board 233 is viewed in a plane, the two third edge parts 233c are parallel to the first edge part 233a. And, the circuit board 233 retains a plurality of battery-side terminals 234. That is, the plurality of battery-side terminals 234 are attached to the circuit board 233. The plurality of battery-side terminals 234 are arranged in a region surrounded by the first edge part 233a, the second edge parts 233b, and the third edge parts 233c. The plurality of battery-side terminals 234 are arranged in one row along the first edge part 233a. The circuit board 233 is provided with an electric circuit.

The plurality of battery-side terminals 234 are made of an electrically-conductive metal material. The plurality of battery-side terminals 234 include a charging positive terminal, a discharging positive terminal, a charging/discharging negative terminal, and four signal terminals. The connecting member which connects the two positive electrodes of the two battery cells 221 to each other is electrically connected to the charging positive terminal and the discharging positive terminal via a lead wire and an electric circuit. The connecting member which connects the two negative electrodes of the two battery cells 221 to each other is electrically connected to the charging/discharging negative terminal via a lead wire and an electric circuit.

Further, a board cover 250 which covers the surface of the circuit board 233 is provided. The board cover 250 is integrally molded by using an insulating material such as a resin material. The board cover 250 is an element which covers the region of the surface of the circuit board 233 surrounded by the first edge part 233a, the second edge parts 233b, and the third edge parts 233c. The board cover 250 is formed in a substantially rectangular shape in a planar view. That is, the board cover 250 has long sides 250b and 250c parallel to each other, and a plurality of slits 250a are provided along the long side 250c. Moreover, two short sides 250d, which connect both ends of the long sides 250b and 250c, are provided. And, in a state that the board cover 250 is attached to the circuit board 233, the plurality of battery-side terminals 234 are inserted into the slits 250a, respectively.

The housing case 228 is an element which houses the holder 232 retaining the plurality of battery cells 221. The housing case 228 has a case main body 229 and a cover 230 which closes an opening 229a of the case main body 229. All of the holder 232, the case main body 229, and the cover 230 are made of a non-electrically-conductive material, and are separately formed from each other. As the non-electrically-conductive material, a resin material is included. The case main body 229 has a bottom plate 229b and a side wall 229c which is formed continuously from an outer peripheral edge of the bottom plate 229b. The side wall 229c is provided with a vent hole 229d which communicates between the inside and the outside of the housing case 228.

The cover 230 is provided with a flat plate part 235 and a mount part 236 whose height is different from that of the plate part 235. The mount part 236 is provided with a plurality of terminal insertion holes 237. The plurality of terminal insertion holes 237 are formed in a slit shape. The plurality of terminal insertion holes 237 communicate between the housing chamber of the housing case 228 and outside. The plurality of battery-side terminals 234 are inserted into the plurality of terminal insertion holes 237, respectively. On both sides of the plurality of terminal insertion holes 237 in the mount part 236, two guide rails 238 are provided. The two guide rails 238 are parallel to each other, and are extended in a longitudinal direction of the plurality of terminal insertion holes 237.

Further, two connecting surfaces 243 which connect between a surface of the mount part 236 and a surface of the plate part 235 are formed. The two connecting surfaces 243 are provided at ends of the plate part 235 of the two guide rails 238. The surface of the mount part 236 and the surface of the plate part 235 are at different heights from each other, and extension lines of the two surfaces are parallel to each other. Here, the height is in a direction intersecting with the longitudinal direction of the guide rails 238. In the cover 230 of the present embodiment, the longitudinal direction of the guide rails 238 and the above-described height direction are substantially at a right angle to each other. The two connecting surfaces 243 are substantially at a right angle with respect to the surface of the plate part 235 and the surface of the mount part 236. And, the two connecting surfaces 243 are parallel to the height direction, and the plurality of terminal insertion holes 237 are opened from the surface of the mount part 236 to the connecting surfaces 243. Also, protruding parts 244 which are higher than the mount part 236 are provided at two locations of ends of the cover 230 opposite to the plate part 235. A concave part 244a is provided between the protruding parts 244 at the two locations. A vent hole 244b which penetrates through the concave part 244a is provided. The vent hole 244b connects between the inside and the outside of the housing case 228.

Further, a rib 239 is provided on the surface of the mount part 236 in the cover 230. The rib 239 is protruding from the surface of the mount part 236, and the rib 239 is provided between the two guide rails 238. When the surface of the mount part 236 is viewed in a plane, the rib 239 is provided in a U shape so as to surround the plurality of terminal insertion holes 237. The rib 239 has a first protruding part 239a which is linearly extended in the arranged direction of the plurality of terminal insertion holes 237 and two second protruding parts 239b which are linearly extended continuously from both ends of the first protruding part 239a. The first protruding part 239a is extended in a direction at a right angle to the two guide rails 238. The two second protruding parts 239*b* are extended to be parallel to the two guide rails 238 and are parallel to each other.

Further, operation buttons 240 are attached to both sides of the protruding part 244 of the housing case 228. The operation buttons 240 are attached to the housing case 228 so as to rotate around a supporting shaft 240*a* within a range of a predetermined angle. Also, the operation buttons 240 are provided with latches 241, and the latches 241 are inserted into holes 242 which are provided in the cover 230. Tips of the latches 241 are exposed from the holes 242 to the outside. Note that the operation buttons 240 are pushed toward the outside of the housing case 228 by an elastic member.

Further, a window 230*d* is provided at a boundary part between the mount part 236 and the plate part 235. When the cover 230 is viewed in a plane, the window 230*d* is linearly extended in a direction substantially at a right angle to the two guide rails 238. The window 230*d* is connected to the plurality of terminal insertion holes 237. Further, in a state that the cover 230 is attached to the case main body 229, the plurality of battery-side terminals 234 are inserted into the plurality of terminal insertion holes 237.

Figure 34:
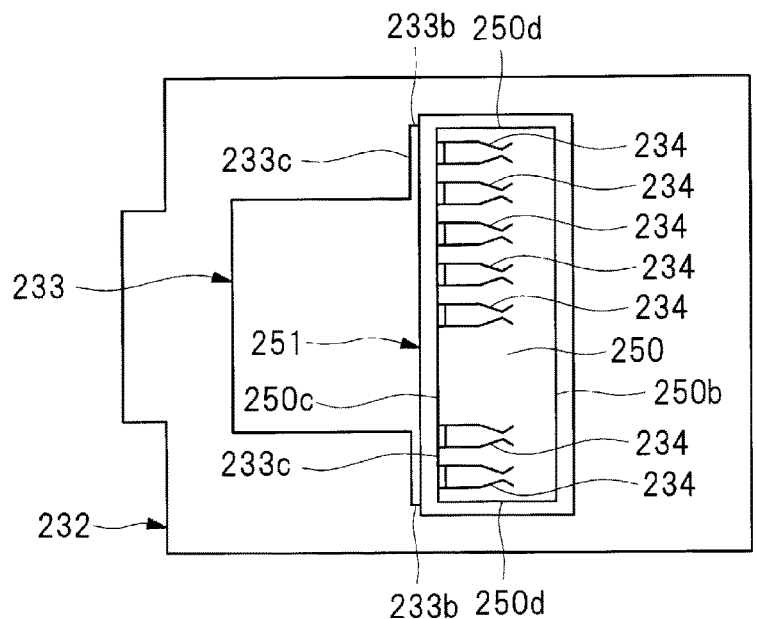
FIG. 34 is a plan view of a circuit board of the battery pack illustrated in FIG. 33.

Still further, a seal member 251 illustrated in FIG. 34 is provided inside the housing case 228. The seal member 251 is an element which seals a part between the circuit board 233 serving as a retaining member retaining the battery-side terminals 234 and the cover 230. The seal member 251 also serves as an element which seals a part between the board cover 250 and the cover 230. The seal member 251 is integrally molded by using a material such as a rubber-like elastic body or silicon. As illustrated in FIG. 34, when the circuit board 233 is viewed in a plane, the seal member 251 is formed in an endless shape surrounding the plurality of battery-side terminals 234. When the circuit board 233 is viewed in a plane, the seal member 251 is formed in a substantially rectangular shape. That is, the seal member 251 seals between an inner side and an outer side of the housing case 228 so as to prevent the attachment of the foreign substances from the inside of the housing case 228 to the battery-side terminals 234 and prevent the entering of the foreign substances from the peripheries of the battery-side terminals 234 into the housing case 228.

In a specific explanation, the seal member 251 is attached along the long side 250*b* and the short sides 250*d* of the board cover 250, and is attached along the first edge part 233*a* of the circuit board 233. Further, a part of the seal member 251 is linearly attached also to a part between the two third edge parts 233*c* of the surface of the circuit board 233. When the rubber-like elastic body is used as the seal member 251, the seal member 251 can be fixed to the circuit board 233 and the board cover 250 by an adhesive agent. When the silicon is used as the seal member 251, the seal member 251 is formed by applying silicon having fluidity over the circuit board 233 and the board cover 250, and then, fixedly attaching the silicon to the circuit board 233 and the board cover 250 during solidification. Note that the seal member 251 is omitted in FIG. 33 for the sake of convenience.

Figure 35:
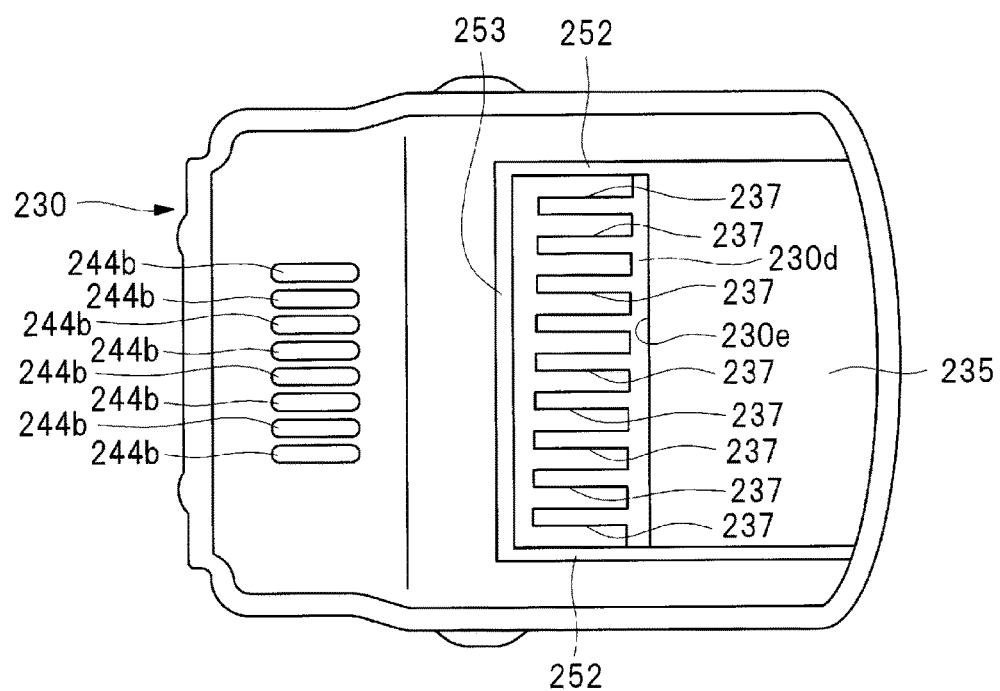
FIG. 35 is a base view of the battery pack illustrated in FIG. 33.

On the other hand, when the cover 230 is attached to the case main body 229, the seal member 251 is in contact with an inner surface of the cover 230. A structure of the inner surface of the cover 230 with which the seal member 251 is in contact will be explained with reference to FIG. 35. The structure of the inner surface of the cover 230 with which the seal member 251 is in contact includes: an edge part 230*e* which is along the window 230*d* in the plate part 235; two ribs 252 which are provided on both sides of the plurality of terminal insertion holes 237; and a rib 253 which is provided in parallel to the edge part 230*e*. The ribs 252 and 253 are protruded from the inner surface of the cover 230, more specifically, from the inner surface of the mount part 236 toward the case main body 229. That is, the ribs 252 and 253 are protruded downward toward the case main body 229.

In the present Example, a phrase "upward (above)" and the phrase "downward (below)" mean upper/lower directions in a state that the bottom plate 229*b* of the case main body 229 is positioned at the lowest. The ribs 252 and 253 are configured to correspond to protrusions of the present invention. In a planar view of the cover 230 viewed from the inner surface side, the two ribs 252 are substantially at a right angle to the edge part 230*e* and the rib 253. Also, in a planar view of the cover 230 viewed from the inner surface side, the edge part 230*e* and the ribs 252 and 253 are annularly provided in a rectangular shape so as to surround the plurality of terminal insertion holes 237. By this configuration, the board cover 250 covers the window 230*d*, and the seal member 251 seals a gap between the board cover 250 and the cover 230. Note that the seal structure will be described in detail later.

Next, an operation of attaching the battery pack 227 to the attachment part 214 of the electric power tool 210 will be explained. First, the electric power tool 210 and the battery pack 227 are arranged so that the two guide rails 238 and the two guide grooves 224 are coaxial with each other. At this time, the electric power tool 210 and the battery pack 227 are in a positional relation illustrated in FIG. 29. Then, by approaching the electric power tool 210 and the battery pack 227 each other, the guide rails 238 are moved into the guide grooves 224. That is, the attachment part 214 and the battery pack 227 are relatively moved along the guide rails 238. Accordingly, the device-side terminals 223 are moved into the terminal insertion holes 237, so that the device-side terminals 223 and the battery-side terminals 234 are connected to each other, and the convex part 225 is moved into the concave part 244*a*, and besides, the latches 241 are latched with the latch grooves 226. When the latches 241 are latched with the latch grooves 226, the attachment of the battery pack 227 with respect to the electric power tool 210 is completed. When the attachment of the battery pack 227 with respect to the electric power tool 210 is completed, a sealing target space 260 is formed between the cover 230 and the attachment part 214. The device-side terminals 223 and the battery-side terminals 234 are arranged in the sealing target space 260. The sealing target space 260 includes contact parts between the device-side terminals 223 and the battery-side terminals 234. Note that the sealing target space 260 is illustrated in FIG. 28.

Figure 36:
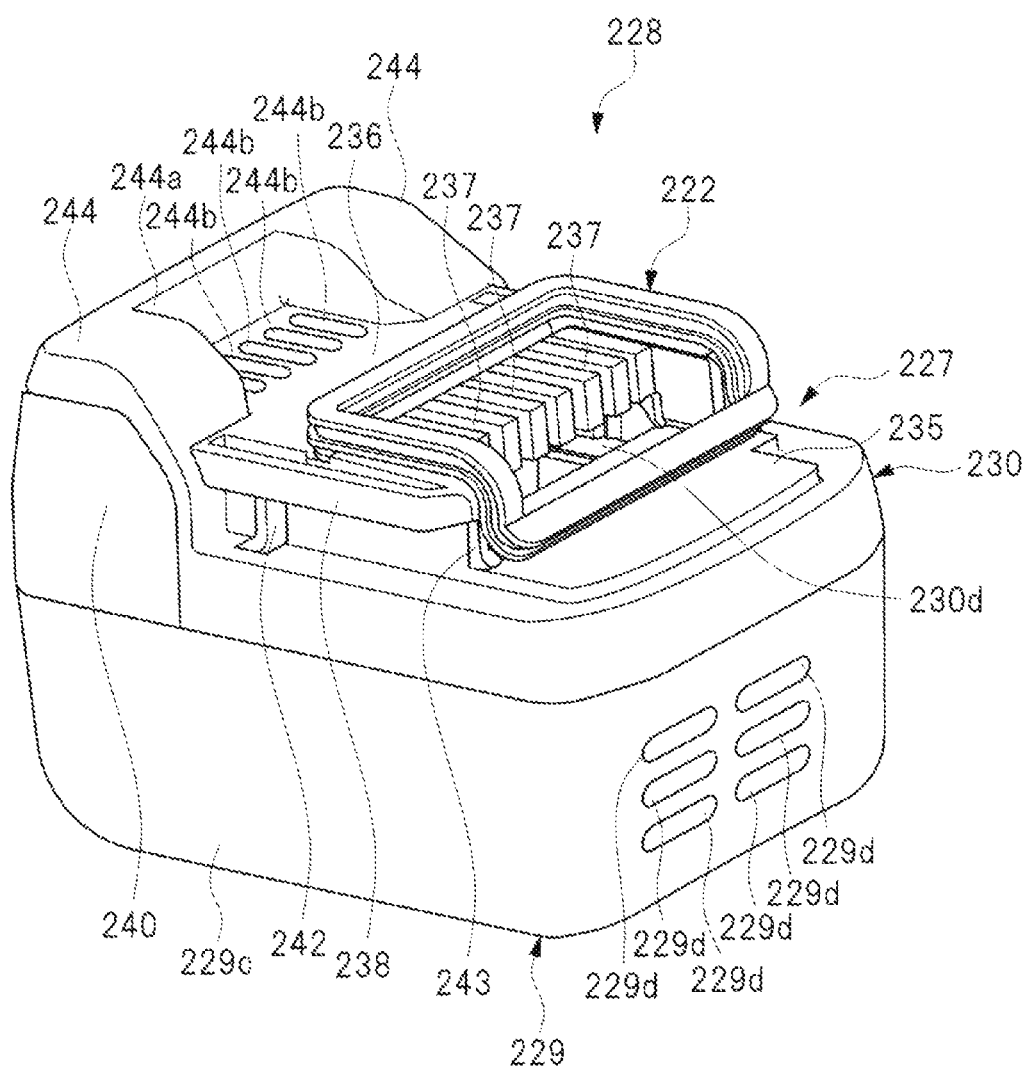
FIG. 36 is a perspective view illustrating a state in which a seal member is in contact with the battery pack of FIG. 29.

As illustrated in FIG. 36, when the battery pack 227 is attached to the attachment part 214, the seal member 222 is in contact with the cover 230 of the battery pack 227 to form a seal surface. In a specific explanation, the seal lip 222*c* is in contact with surfaces of the first protruding part 239*a* of the rib 239, the second protruding parts 239*b* of the rib 239, the connecting surfaces 243, and the plate part 235 to form the seal surface.

In this manner, the seal lip 222*c* of the seal member 222 is in contact with the cover 230 over the entire periphery thereof to form an annular seal surface. The annular seal surface surrounds the sealing target space 260. Therefore, even when foreign substances from the outside of the battery pack 227 enter a gap between the cover 230 and the attachment part 214, it can be prevented that the foreign substances reach the sealing target space 260. The above-described foreign substances contain water, and it can be prevented that the device-side terminals 223 and the battery-side terminals 234 are corroded by water.

Further, as illustrated in FIG. 36, a width of a cross-sectional shape of the seal lip 222c in a width direction is narrower as being closer to a tip thereof. Therefore, even when a part of the seal lip 222c is in contact with the second protruding part 239b in the process of the attachment of the battery pack 227 to the attachment part 214, increase in the sliding resistance thereof can be suppressed. Therefore, in the electric power tool 210, the operating force required for attaching the battery pack 227 to the attachment part 214 can be reduced.

Figure 32:
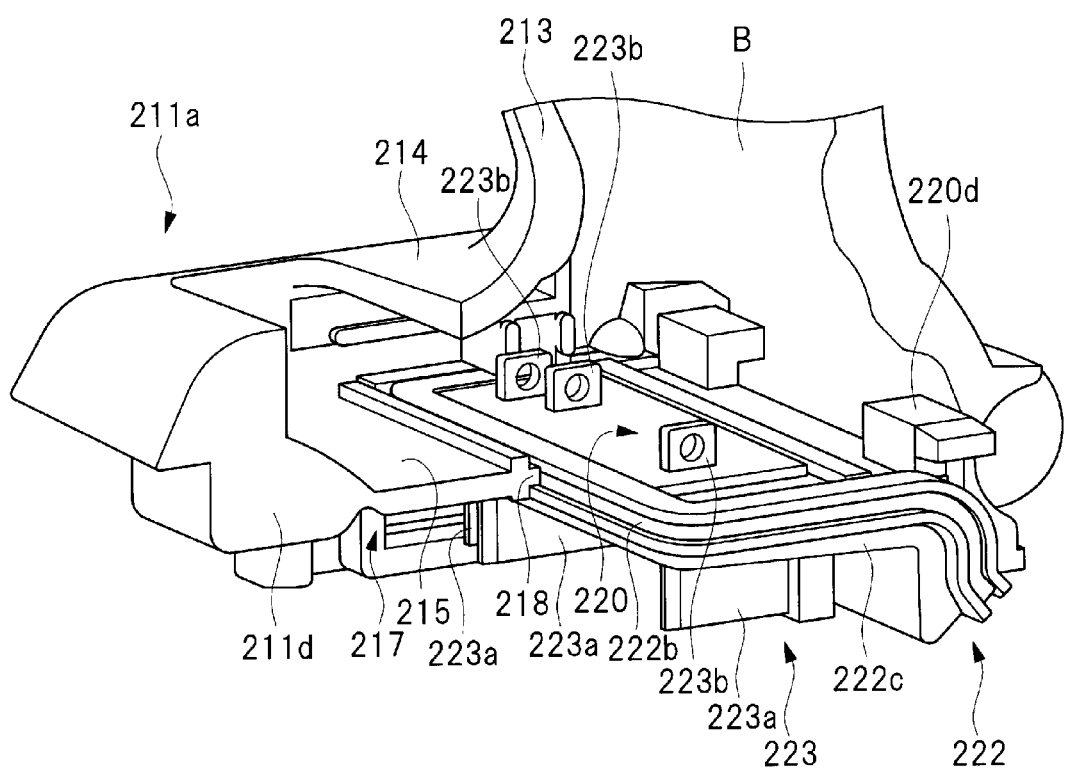
FIG. 32 is a perspective view illustrating another state in which the tool main body of the electric power tool according to the tenth embodiment of the present invention is divided.

Further, as illustrated in FIGS. 30 to 32, the seal member 222 is interposed between the attachment part 214 and the terminal holder 220. That is, the seal member 222 has a function of sealing a part between the attachment part 214 and the terminal holder 220. Therefore, in the electric power tool 210, it can be prevented that the foreign substances which exist in the inside B of the grip 213 reach the connecting parts between the device-side terminals 223 and the battery-side terminals 234. The foreign substances contain water, and it can be prevented that water reaches the connecting parts between the device-side terminals 223 and the battery-side terminals 234. Note that, when the operation buttons 240 are pushed in a state that the battery pack 227 is attached to the electric power tool 210, the latches 241 are unlatched from the latch grooves 226. Then, by moving the battery pack 227 reversely to that of the above description in the direction along the axis line A, the battery pack 227 can be detached from the attachment part 214. The terminal holder 220 is provided with a latch piece 220d.

On the other hand, in both of the state that the battery pack 227 is attached to the attachment part 214 of the tool main body 211 and the state that the battery pack 227 is detached from the tool main body 211, there is a possibility that the foreign substances from the outside of the housing case 228 enter the inside of the housing case 228 from at least one of a gap between the case main body 229 and the cover 230, gaps between the vent holes 229d, 244b, the cover 230, and the latches 241, gaps between the cover 230 and the operation buttons 240, and others. As the foreign substances, water, dust, mud, and others are included. Since the electric power tool 210 is a cordless type, the electric power tool 210 can be used regardless of place. Therefore, the electric power tool 210 is often used in a horrible poor environment such as an environment full of powder dust such as a building demolition work site, etc. and rainy weather.

When the foreign substances enter the space where the plurality of battery-side terminals 234 are provided from the outside of the housing case 228 through the terminal insertion holes 237 and the window 230d, the board cover 250 prevents the contact of the foreign substances with the circuit board 233. Also, as long as the battery pack 227 has a water-proof structure in which the opening of the holder 232 or the gap between the insulating member 219 and the opening edge of the holder 232 is covered with a sheet member, silicon, clay, or others having a water-proof property, short-circuiting between the battery cells 221, corrosion of the electrodes, etc. can be prevented even when water enters the inside of the housing case 228.

Figure 37:
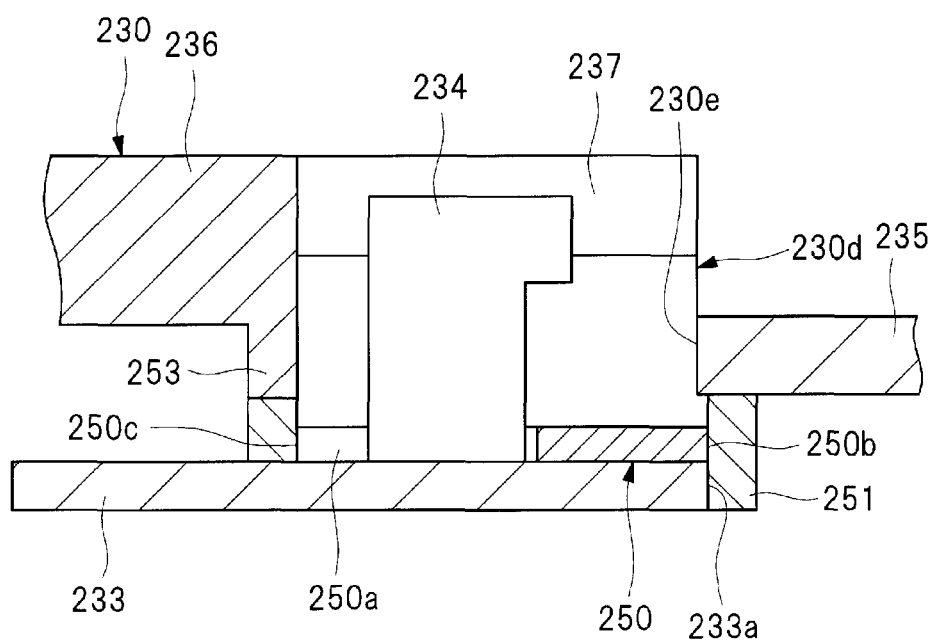
FIG. 37 is a partial front cross-sectional view of the battery pack illustrated in FIG. 28.

The battery pack 227 of the present embodiment is provided with the seal member 251 which seals the parts between the circuit board 233, the board cover 250, and the cover 230. And, when the cover 230 is fixed to the case main body 229, the seal member 251 is in contact with the inner surface of the cover 230 as illustrated in FIG. 37. In a specific explanation, the seal member 251 is arranged below the plate part 235 and below the mount part 236. The mount part 236 is provided with the ribs 252 and 253 protruding downward toward the seal member 251. Therefore, the seal member 251 is in contact with the ribs 252 and 253, and besides, with the inner surface of the plate part 235 along the edge part 230e. That is, the seal member 251 forms the seal surface having the substantially rectangular shape in the planar view of the circuit board 233.

Therefore, even when the cover 230 of the battery pack 227 which is not attached to the tool main body 211 is directed downward in the state that the foreign substances exist in the housing case 228, it can be prevented that the foreign substances inside the housing case 228 reach the sealing target space 260 through the gaps between the circuit board 233, the board cover 250, and the cover 230. Therefore, short-circuiting between the battery-side terminals 234 can be prevented. Also, when the foreign substances are water, the contact of the water with the battery-side terminals 234 which results in the corrosion of the battery-side terminals 234 can be prevented. In a state that the cover 230 is directed downward in the electric power tool 210 in which the battery pack 227 is attached to the tool main body 211, it can be prevented that the foreign substances inside the housing case 228 enter the sealing target space 260 through the gaps between the circuit board 233, the board cover 250, and the cover 230. The above-described foreign substances include water. Therefore, short-circuiting between the device-side terminals 223, short-circuiting between the battery-side terminals 234, short-circuiting between the device-side terminals 223 and the battery-side terminals 234, corrosion of the device-side terminals 223, and corrosion of the battery-side terminals 234 can be prevented.

The seal member 251 is arranged below the plate part 235 and the mount part 236. Therefore, when the battery pack 227 is to be attached to the attachment part 214 of the tool main body 211, the contact of the seal member 251 with the attachment part 214 can be prevented. Therefore, peel-off of the seal member 251 caused by the contact with the attachment part 214 can be suppressed. Further, the seal member 251 is not directly attached to the battery-side terminals 234. Therefore, when the battery pack 227 is to be attached to the tool main body 211, increase in the contact resistance between the battery-side terminals 234 and the device-side terminals 223 can be also prevented. Still further, the seal member 251 is in contact with the ribs 252 and 253 which are protruded downward from the mount part 236 and with the inner surface of the plate part 235 to form the seal surface. Therefore, the part between the circuit board 233 and the cover 230 and the part between the board cover 250 and the cover 230 are sealed. That is, in the battery pack 227, it can be prevented that the foreign substances from the outside of the housing case enter the housing case 228, and that the water reaches the sealing target space 260.

Further, the ribs 252 and 253 are protruded to the same position as that of the inner surface of the plate part 235, or the ribs 252 and 253 are protruded downward lower than the inner surface of the plate part 235. Therefore, a protruding amount of the seal member 251 in the upper/lower direction of the housing case 228 can be suppressed. The protruding amount of the seal member 251 is expressed by a length thereof in the upper/lower direction in FIG. 37. Therefore, in the battery pack 227, in the state that the seal member 251 is in contact with the inner surface of the cover 230, that is, with the ribs 252 and 253, buckle deformation of the seal member 251 can be suppressed, and a high sealing property can be maintained. Also, as illustrated in FIG. 33, the housing case 228 is configured to be dividable in the upper/lower direction. Therefore, when the cover 230 is to be attached to the case main body 229, friction between the seal member 251 and the device-side terminals 223 which results in peel-off of the seal member 251 can be suppressed. The length of the housing case 228 in the upper/lower direction can be configured to be longer than a distance from an upper surface of the circuit board 233 to tips of the ribs 252 and 253. Here, the cover 230 is assumed to be attached to the case main body 229. By such a configuration, when the cover 230 is attached to the case main body 229, the seal member 251 is in contact with the ribs 252 and 253 and is elastically deformed, so that a contact-surface pressure of the seal surface can be enhanced. Therefore, the sealing property of the seal member 251 can be ensured. In the battery pack 227 illustrated in FIG. 33, the board cover 250 may be not provided. Even in the battery pack in which the board cover 250 is not provided, the seal member 251 can be provided between the circuit board 233 and the cover 230.

As described above, the seal member 222 attached to the tool main body 211 plays a role of preventing the entering of the water existing in the inside B of the tool main body 211 into the sealing target space 260. Also, the seal member 222 plays a role of preventing the entering of the water which has entered the part between the attachment part 214 and the cover 230 into the sealing target space 260. Further, the seal member 251 plays a role of preventing the entering of the water which is inside the housing case 228 into the sealing target space 260 through the part between the cover 230 and the circuit board 233. That is, the seal member 222 plays both of the role of preventing the entering of the water in the inside B into the sealing target space 260 and the role of preventing the entering of the water which has entered the part between the attachment part 214 and the cover 230 into the sealing target space 260. Therefore, increase in the number of parts of the electric power tool 210 can be suppressed.

Eleventh Embodiment

Figure 38:
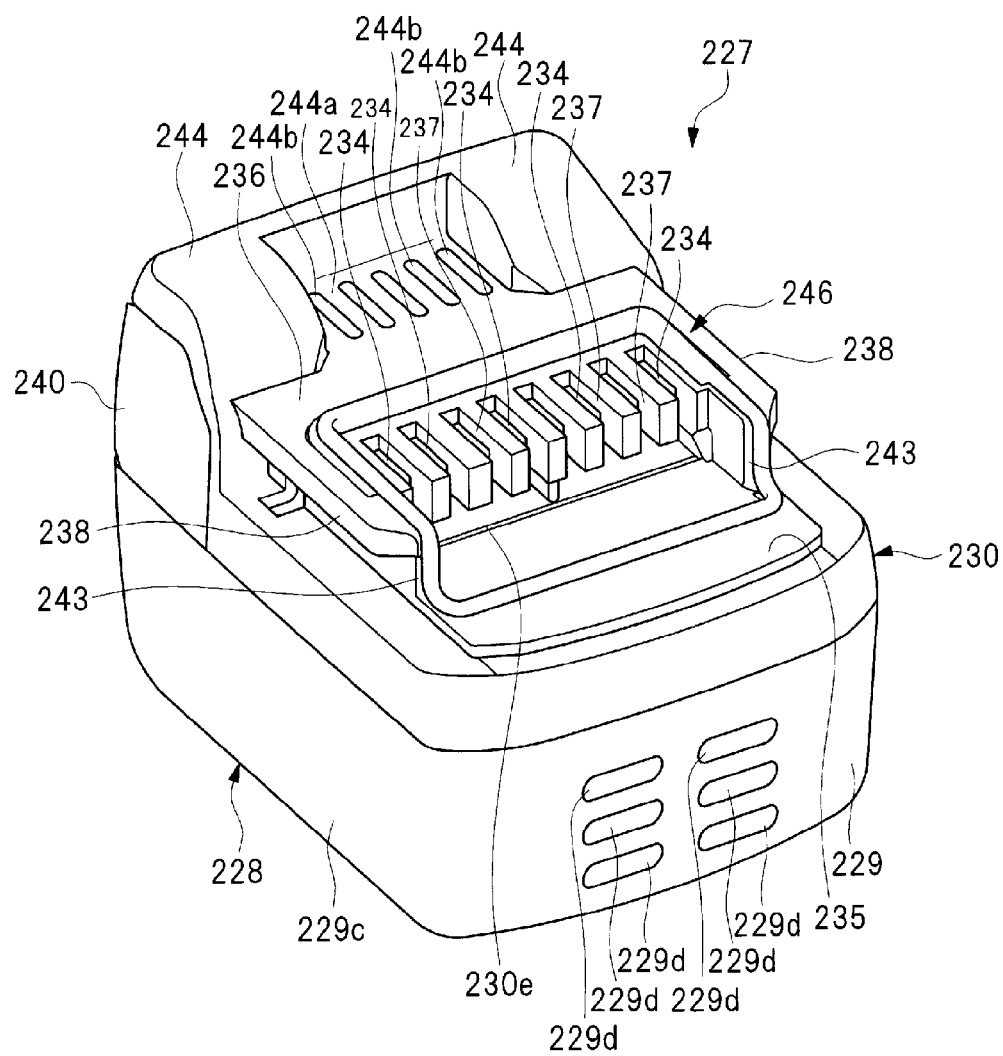
FIG. 38 is a perspective view of a battery pack to be attached to the electric power tool according to the eleventh embodiment of the present invention.
Figure 39:
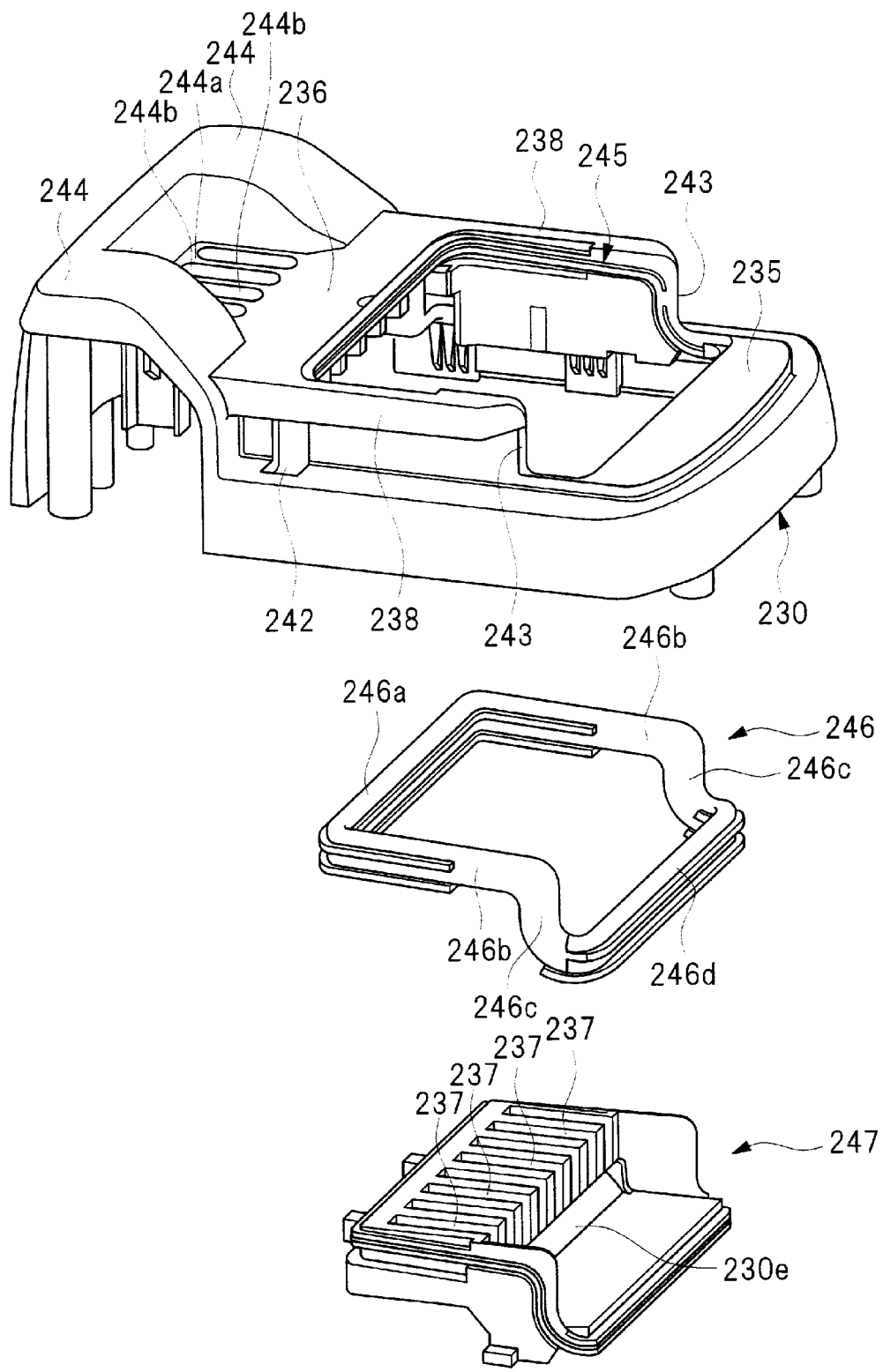
FIG. 39 is an exploded perspective view of the battery pack illustrated in FIG. 38.
Figure 40:
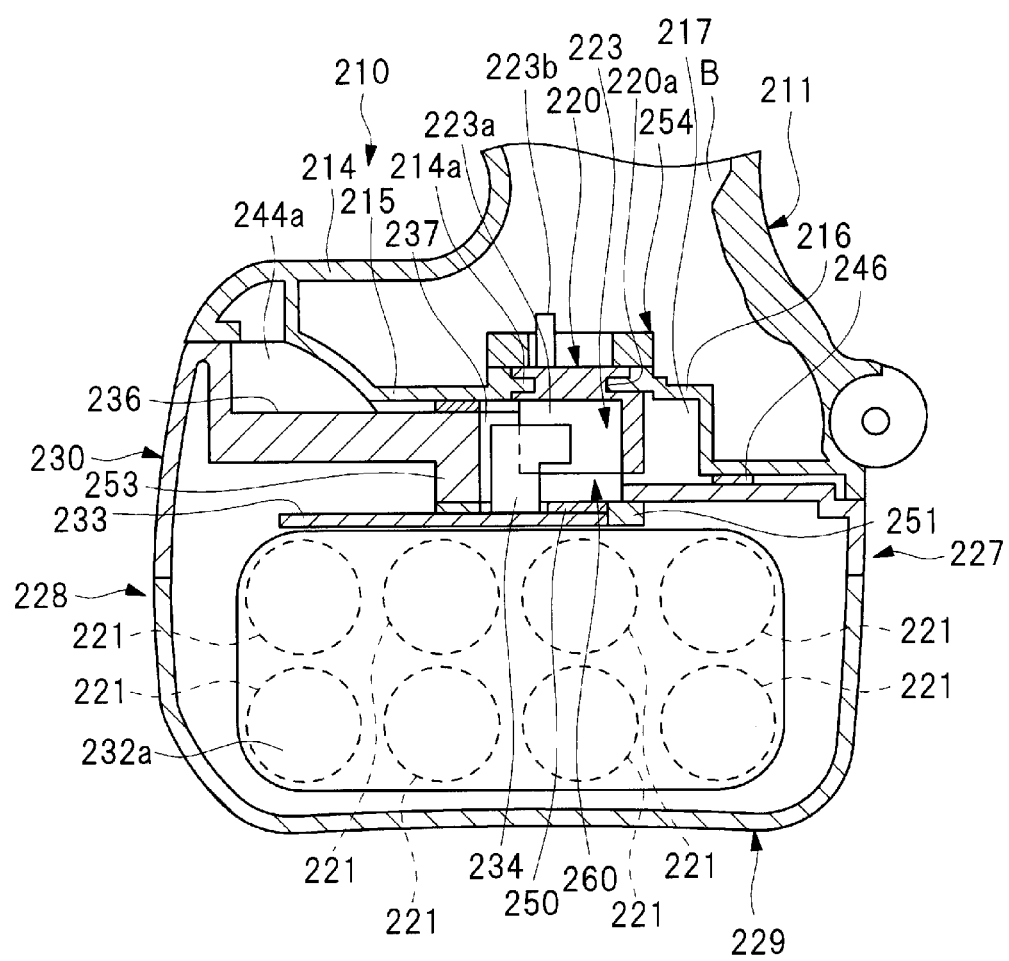
FIG. 40 is a partial cross-sectional view illustrating the electric power tool according to the eleventh embodiment of the present invention.

Next, the electric power tool 210 of the eleventh embodiment of the present invention will be explained based on FIGS. 28 and 29. A basic configuration of the electric power tool 210 of the eleventh embodiment is the same as the configuration of the electric power tool 210 of the tenth embodiment. The battery pack 227 illustrated in FIGS. 38 to 40 is attached to the attachment part 214 of the electric power tool 210 of the eleventh embodiment. First, another attachment structure of the seal member which seals the sealing target space 260 will be explained based on FIGS. 38 and 39. The cover 230 of the battery pack 227 has an attachment hole 245 which is formed over the plate part 235 and the mount part 236. And, an annular seal member 246 is fitted in the attachment hole 245. Also, a terminal block 247 which is a different member from the cover 230 is provided. The terminal block 247 is inserted into the attachment hole 245, and is fixed to the cover 230. The plurality of terminal insertion holes 237 are formed in the terminal block 247. The seal member 246 is attached along an outer peripheral surface of the terminal block 247. In this manner, an annular seal member 246 is attached to the periphery of the terminal insertion holes 237.

The seal member 246 has: a first linear part 246a which is linearly extended in orthogonal to the guide rails 238; and second linear parts 246b which are formed continuously from both ends of the first linear part 246a and which are linearly extended in parallel to the guide rails 238. Also, the seal member 246 has two connecting parts 246c which are formed continuously from the respective two second linear parts 246b and which are extended along the connecting surface 243. Further, the seal member 246 has a third linear part 246d which connects between both ends of the two connecting parts 246c. The third linear part 246d is parallel to the first linear part 246a.

In the seal member 246 having the above-described configuration, the first linear part 246a is fixed to a part of an inner peripheral surface of the attachment hole 245 which is at a right angle to the guide rails 238. The second linear parts 246b are fixed to parts of the inner peripheral surface of the attachment hole 245 which are parallel to the guide rails 238. The two connecting parts 246c are in contact with the two connecting surfaces 243, respectively. The third linear part 246d is fixed to a part of the inner peripheral surface of the attachment hole 245 which is along the plate part 235. As described above, in the state that the seal member 246 is fitted into the attachment hole 245 and is fixed to the cover 230, the seal member 246 is in contact with the cover 230 to form the annular seal surface.

The terminal block 247 is integrally molded by using a non-electrically-conductive material such as a resin material, and the terminal block 247 and the seal member 246 are integrated by an adhesive agent. Note that the terminal block 247 and the seal member 246 can be also integrated by two-layer molding. The seal member 246 is integrally molded by using a rubber-like elastic body, and a part of the seal member 246 is protruded from a surface of the mount part 236. Note that the attachment part 214 to which the battery pack 227 illustrated in FIG. 38 is attached is not provided with the above-described seal member 222. The battery pack 227 illustrated in FIG. 38 is attachable/detachable to/from the electric tool 210 illustrated in FIGS. 28 and 29.

When the battery pack 227 illustrated in FIG. 38 is attached to the attachment part 214 of the electric power tool 210 as illustrated in FIG. 29, the device-side terminals 223 and the battery-side terminals 234 are connected to each other. Also, the seal lip of the seal member 246 is in contact with the attachment part 214 to form an annular seal surface. The seal lip of the seal member 246 is the part which is protruded upward from the plate part 235 and the mount part 236. The seal member 246 is attached to the cover 230 of the battery pack 227 so as to surround the connecting parts between the device-side terminals 223 and the battery-side terminals 234. Therefore, in the battery pack 227 illustrated in FIGS. 38 and 39, effects similar to those of the electric power tool 210 and the battery pack 227 explained with reference to FIGS. 28 to 33 can be obtained.

Next, the structure of the seal member which seals the part between the attachment part 214 and the terminal holder 220 in the electric power tool 210 of the eleventh embodiment will be explained based on FIGS. 28, 29, 40, and 41. In the electric power tool 210 of the eleventh embodiment, a shape and an attachment structure of a seal member 254 are different from the shape and the attachment structure of the seal member 222 in the electric power tool 210 of the tenth embodiment. First, in the electric power tool 210 of the eleventh embodiment, the seal member 222 is not provided between the attachment part 214 and the terminal holder 220. Also, in the electric power tool 210 of the eleventh embodiment, the terminal holder 220 is directly attached to the inner periphery of the attachment hole of the attachment part 214. Further, the attachment part 214 is formed of the two constituent pieces 211a which are divided along the dividing surface 211d as similar to that of the attachment part 214 of FIG. 30.

Therefore, the terminal holder 220 is sandwiched by the two constituent pieces 211a, and is supported by the attachment part 214. That is, the attachment part 214 is provided with the attachment hole, and a convex part 214a is provided on an inner peripheral surface of the attachment hole. On the other hand, a concave part 220a is provided on an outer peripheral surface of the terminal holder 220. And, the convex part 214a is fitted into the convex part 220a, so that the terminal holder 220 is attached to the attachment part 214. When the convex part 214a and the concave part 220a are fitted with each other, the convex part 214a and the concave part 220a are not exposed from both of the inside B and the opening 217. That is, the seal member 254 is provided at a location except for locations where the concave part 220a and the convex part 214a are provided. Note that the structure of attaching the terminal holder 220 to the attachment part 214 includes the convex part which is provided on the outer peripheral surface of the terminal holder 220 and the concave part which is provided on the inner peripheral surface of the attachment hole of the attachment part 214.

A gap is provided between the convex part 214a of the attachment part 214 and the concave part 220a of the terminal holder 220 to such an extent that the terminal holder 220 does not fall from the attachment part 214. This gap is provided for allowing the terminal holder 220 and the attachment part 214 to relatively move within a predetermined range. As described above, the device-side terminals 223 are fixed to the attachment part 214, and the battery-side terminals 234 are fixed inside the battery pack 227. Also, the device-side terminals 223 and the battery-side terminals 234 are electrically and mechanically connected to each other. Here, when an operation is performed in the state that the battery pack 227 is attached to the electric power tool 210, relative movement between the attachment part 214 and the battery pack 227 due to vibration of the electric motor M or others is caused in some cases. When the relative movement is caused between the attachment part 214 and the battery pack 227, chattering is caused between the device-side terminals 223 and the battery-side terminals 234, and there is a risk that poor contact is caused between the device-side terminals 223 and the battery-side terminals 234.

On the other hand, in the electric power tool 210 of the present embodiment, the gap is formed between the convex part 214a of the attachment part 214 and the concave part 220a of the terminal holder 220. Therefore, the vibration of the attachment part 214 is absorbed by the gap, and transferring of the vibration of the attachment part 214 to the terminal holder 220 can be suppressed. Therefore, generation of the chattering between the device-side terminals 223 and the battery-side terminals 234 can be suppressed. Note that a volume of the gap formed between the convex part 214a of the attachment part 214 and the concave part 220a of the terminal holder 220 is determined by, for example, an experiment, a simulation, or others based on amplitude caused when the attachment part 214 is vibrated. Also, the above-described "predetermined range" is a range that exceeds the amplitude caused when the attachment part 214 is vibrated. Note that a structure for suppressing the generation of the chattering between the device-side terminals 223 and the battery-side terminals 234 includes a structure in which battery-side terminals 234 are movably attached to the battery pack 227.

Figure 41:
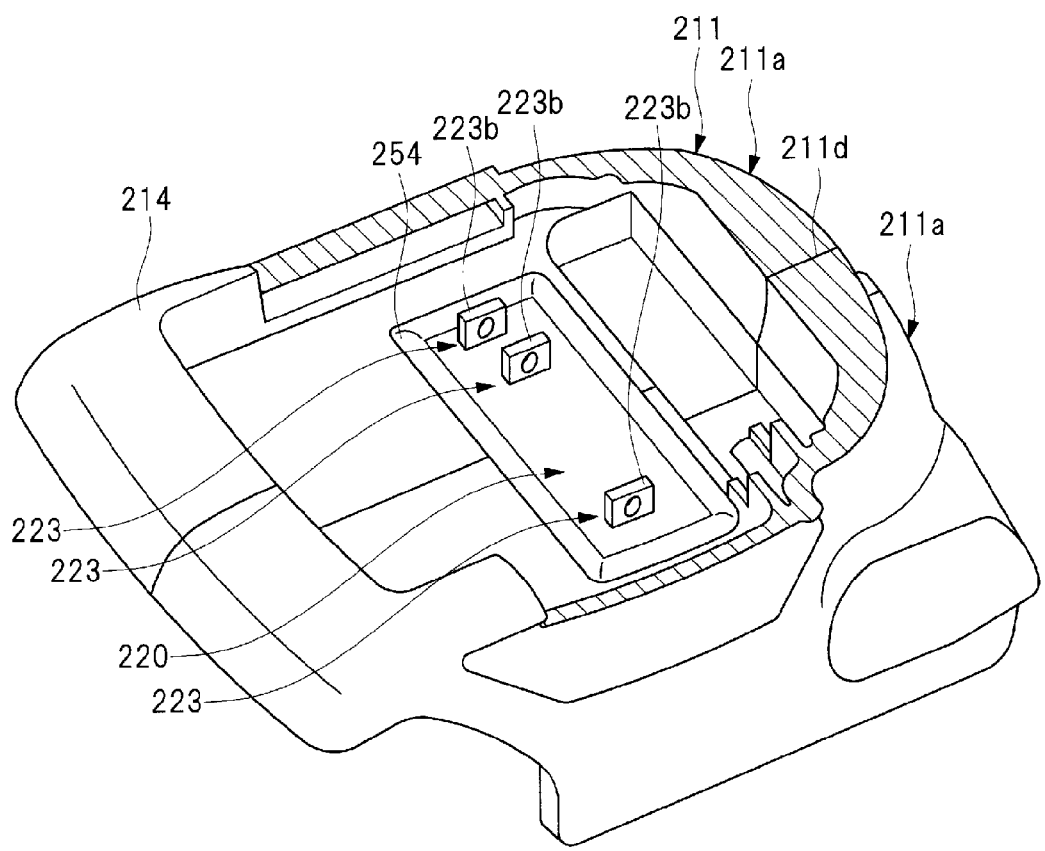
FIG. 41 is a cross-sectional view of an attachment part of the electric power tool illustrated in FIG. 40.

Further, as illustrated in FIG. 41, the seal member 254 is provided in an endless shape so as to cover the contact part between the attachment part 214 and the terminal holder 220. The seal member 254 is integrally molded by using a material similar to that of the seal member 222. The seal member 254 is arranged in the inside B. The seal member 254 plays a role of preventing the entering of the water existing in the inside B into the sealing target space 260 through the part between the terminal holder 220 and the attachment part 214. Therefore, in the electric power tool 210 of the eleventh embodiment, the effects similar to those of the electric power tool 210 of the tenth embodiment can be obtained.

In a specific explanation, as illustrated in FIG. 40, the seal member 254 is in contact with both of the attachment part 214 and the terminal holder 220. The seal member 254 is fixed to the inner surface of the attachment part 214 so as to cover the contact part between the attachment part 214 and the terminal holder 220 and the gap between the attachment part 214 and the terminal holder 220. A method of fixing the seal member 254 includes a method of fixing the seal member above the terminal holder 220 by an adhesive agent and a method of supporting the seal member by a rib formed on the inside-B side of the attachment part 214. The seal member 254 is pressed and fixed so as to be in contact with the attachment part 214 and the terminal holder 220.

That is, a location of the seal member 254 except for a location where the convex part 214a of the attachment part 214 and the concave part 220a of the terminal holder 220 are fitted with each other is in contact with the attachment part 214 and the terminal holder 220. In a state that an upper surface of the terminal holder 220 is in contact with the seal member 254, the terminal holder 220 can be relatively moved with respect to the attachment part 214 by the above-described gap volume. Therefore, even when the terminal holder 220 is moved due to the vibration or others within the range of the gap volume, the entering of the foreign substances such as the water in the inside B into the sealing target space 260 through the gap can be prevented.

Note that the seal member 254 may be not fixed to the attachment part 214 but fixed to the terminal holder 220. Also in this case, the seal member 254 is fixed to the terminal holder 220 so that the seal member is crossed over the gap between the terminal holder 220 and the attachment part 214, and besides, so that the seal member is always in contact with the terminal holder 220 and the attachment part 214. That is, the seal member 254 is arranged in the inside B on the upper surface of the terminal holder 220.

Also, the seal member 254 may be not provided in the inside B but provided below the terminal holder 220. That is, the seal member 254 may be attached to the terminal holder 220 or to the attachment part 214 between the attachment part 214 and the cover 230. Even when the seal member 254 is provided at this location, the entering of the foreign substances from the inside B into the sealing target space 260 can be prevented. However, in this configuration, when the battery pack 227 is to be attached to or detached from the attachment part 214, there is a possibility that the seal member 254 is in contact with the cover 230. Therefore, the seal member 254 is easily peeled off, which leads to increase in the slide resistance of the battery pack 227 against the attachment part 214, and there is a possibility that attachment performance of the battery pack 227 with respect to the attachment part 214 is reduced. Therefore, the seal member 254 is preferred to be provided in the inside B.

That is, the seal member 222 of the tenth embodiment is supported so as to be interposed between the attachment part 214 and the terminal holder 220. In this configuration, when the attachment part 214 and the battery pack 227 are relatively moved due to the vibration or others, the vibration is absorbed by stretching/shrinking the seal member 222. Therefore, the entering of the foreign substances from the inside B into the sealing target space 260 can be prevented, and besides, the generation of the chattering between the device-side terminals 223 and the battery-side terminals 234 can be prevented.

On the other hand, in the eleventh embodiment, the seal member 254 is fixed to the attachment part 214 or to the terminal holder 220, and besides, is configured to be always in contact with both of the attachment part 214 and the terminal holder 220. Therefore, even when the attachment part 214 and the terminal holder 220 are relatively moved, the sealing property of the seal member 254 is not reduced, and effects similar to those of the tenth embodiment can be obtained.

Further, also in the electric power tool 210 of the eleventh embodiment, as illustrated in FIG. 34, the seal member 251 is provided inside the battery pack 227. A shape and an attachment structure of the seal member 251 are the same as the shape and the attachment structure of the connecting surface 243 provided in the electric power tool 210 of the tenth embodiment. The effects of the seal member 251 provided in the electric power tool 210 of the eleventh embodiment are the same as the effects of the seal member 251 provided in the electric power tool 210 of the tenth embodiment. Also, when the battery pack 227 of the eleventh embodiment illustrated in FIG. 38 is attached to the electric power tool 210, the seal member 246 seals the gap between the housing case 228 and the attachment part 214, and therefore, further dust-proof and water-proof effects can be obtained. On the other hand, the seal member 222 is in contact with the housing case 228, and the seal member 246 is in contact with the attachment part 214, and therefore, the resistance caused when the battery pack 227 is attached to the electric power tool 210 is adversely increased.

According to the electric device of the present invention, when the battery pack is attached to the device main body, a first seal member seals the part between the device main body and the terminal holder. Also, a second seal member seals the part between the device main body and the battery pack. Further, a third seal member seals the part between the housing case and the retaining member.

A correspondence relation between the configurations explained in the tenth embodiment and the eleventh embodiment and a configuration of the present invention will be explained. The electric power tool 210 corresponds to the electric device of the present invention, and the tool main body 211 and the battery pack 227 are combined to configure the electric device of the present invention. Also, in the electric power tool 210 of the tenth embodiment, the seal members 222 and 254 correspond to a first seal member of the present invention, the seal member 251 corresponds to a first battery-side seal member and a second seal member of the present invention, and the seal member 246 corresponds to a third seal member and a second battery-side seal member of the present invention. Further, the seal member 222 corresponds to a device-side seal member of the present invention. Still further, in the electric power tools 210 of the tenth embodiment and the eleventh embodiment, the tool main body 211 corresponds to a device main body of the present invention, the circuit board 233 corresponds to a retaining member of the present invention, and the convex part 214a and the concave part 220a correspond to an engagement part of the present invention. Still further, the part of the attachment part 214 which forms the inside B corresponds to "opposite to the direction in which the device-side terminal is protruded from the device-side retaining member" of the present invention. Still further, the guide groove 224 corresponds to a guide part of the present invention.

An "endless shape" in the present invention includes a structure in which the seal member is an annularly-integrated molding object as a whole and a structure in which the seal member has an endless shape without cut in the state of the fixing of the seal member to a target object even if there is a cut at least at one location of the seal member in the longitudinal direction. Further, the battery pack of the present invention includes a structure capable of housing the number of battery cells less than four or a structure capable of housing the number thereof equal to or larger than nine.

Further, the electric power tool of the present invention includes a structure in which an electric motor is provided inside the casing and a structure in which an electric motor is provided inside the grip. In the present invention, the rubber-like elastic body configuring the seal member has a rigidity, a shape, and a dimension with an elastic deformation rate of 20% or larger. Also, as the seal member, a solid member and a porous sponge are included. Further, in the electric power tool of the tenth embodiment or the electric power tool of the eleventh embodiment, a guide mechanism which determines a direction of attaching/detaching the battery pack 227 to/from the attachment part 214 also includes a structure in which a guide rail is provided in the attachment part 214 and a guide groove is provided in the cover 230 in addition to the structure including the guide grooves 224 provided in the attachment part 214 and the guide rails 238 provided in the cover 230. Further, the seal member 251, which seals the part between the cover 230 and the circuit board 233, may be fixed to the inner surface of the cover 230.

Twelfth Embodiment

Conventionally, an electric device having an electric-device main body and a battery pack which is attachable and detachable to/from the electric-device main body has been known. An example of the electric device is described in Patent Literature 1. An electric device described in Patent Literature 1 is an electric power tool. The electric power tool has an electric-device main body, and an electric motor is provided inside the electric-device main body. Also, a tip tool is attached to the electric-device main body. The tip tool has a configuration which is rotated by the motive power of the electric motor. The electric-device main body is provided with a handle part, and an attachment part is provided at the handle part. Device-side terminals are provided at the attachment part, and the device-side terminals are connected to the electric motor. Moreover, a battery pack which is to be attached/detached to/from the attachment part is provided.

The battery pack has a housing case and a battery cell housed in the housing case. A board is provided inside the housing case, and battery-side terminals are attached to the board. The battery-side terminals are connected to an electrode of the battery cell. On the other hand, terminal insertion holes are provided in the housing case, and the battery-side terminals are inserted into the terminal insertion holes. Further, the housing case is provided with a guide rail, and the attachment part is provided with a protrusion which is to be engaged with the guide rail. When the battery pack is to be attached to the attachment part, the protrusion is engaged with the guide rail so that the attachment part and the battery pack are relatively moved. In the process of the attachment of the battery pack to the attachment part, the battery-side terminals and the device-side terminals are connected to each other.

On the other hand, a technique of preventing the entering of the foreign substances into the part between the attachment part and the battery pack of the electric power tool is described in Japanese Patent Application Laid-Open Publication No. 2002-254356 as Patent Literature 2. In the electric power tool described in Patent Literature 2, an attachment part is provided at a handle part of a device main body, and a battery pack is configured to be inserted into the attachment part. And, a seal member is attached to the attachment part. When the battery pack is attached to the battery pack, the seal member seals the part between the attachment part and the battery pack.

However, the electric power tool described in Patent Literature 1 has a structure in which the battery pack is attached to the attachment part by linearly moving the battery pack by a guide mechanism. Therefore, in a case that the seal member described in Patent Literature 2 is attached to the attachment part of the electric power tool described in Patent Literature 1, when the battery pack is linearly moved in order to attach the battery pack to the attachment part, there is a possibility that the seal member is in contact with the battery pack, the seal member is worn or peeled off, and the sealing property of the seal member is reduced.

A preferred aim of the present invention is to provide an electric device in which the reduction in the sealing property of the seal member provided between the electric-device main body and the battery pack is suppressed.

Figure 42:
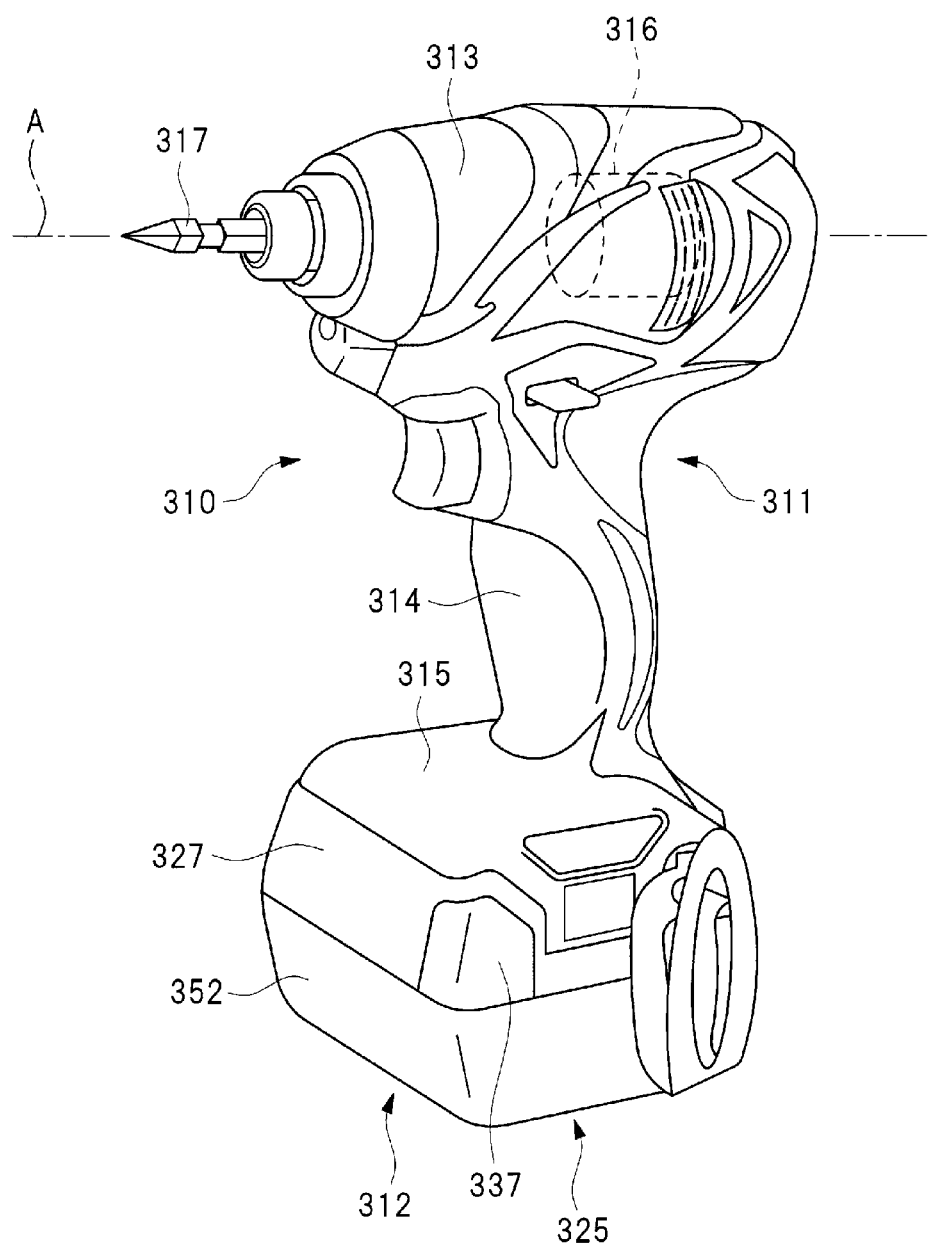
FIG. 42 is a perspective view illustrating an electric power tool according to a twelfth embodiment of the present invention.

An embodiment of the electric device of the present invention will be explained in detail by using drawings. FIG. 42 illustrates a schematic configuration of an electric power tool 310 which is according to a twelfth embodiment of the electric device. The electric power tool 310 has a tool main body 311 and a battery pack 312. The battery pack 312 is attachable/detachable to/from the tool main body 311. The tool main body 311 is molded by using a resin material. The tool main body 311 is provided with a casing 313, a grip 314, and an attachment part 315. An electric motor 316 is provided inside the casing 313. The electric power tool 310 is a cordless-type tool to which no cord for supplying electric power to the electric motor 316 is connected.

Also, a tip tool 317 is attachable/detachable to/from the casing 313. When motive power is transferred from the electric motor 316 to the tip tool 317, the tip tool rotationally moves or reciprocates across the axis line A. That is, the electric power tool 310 includes a drill, a driver, an impact driver, a hammer, a hammer drill, and a hammer driver.

Figure 43:
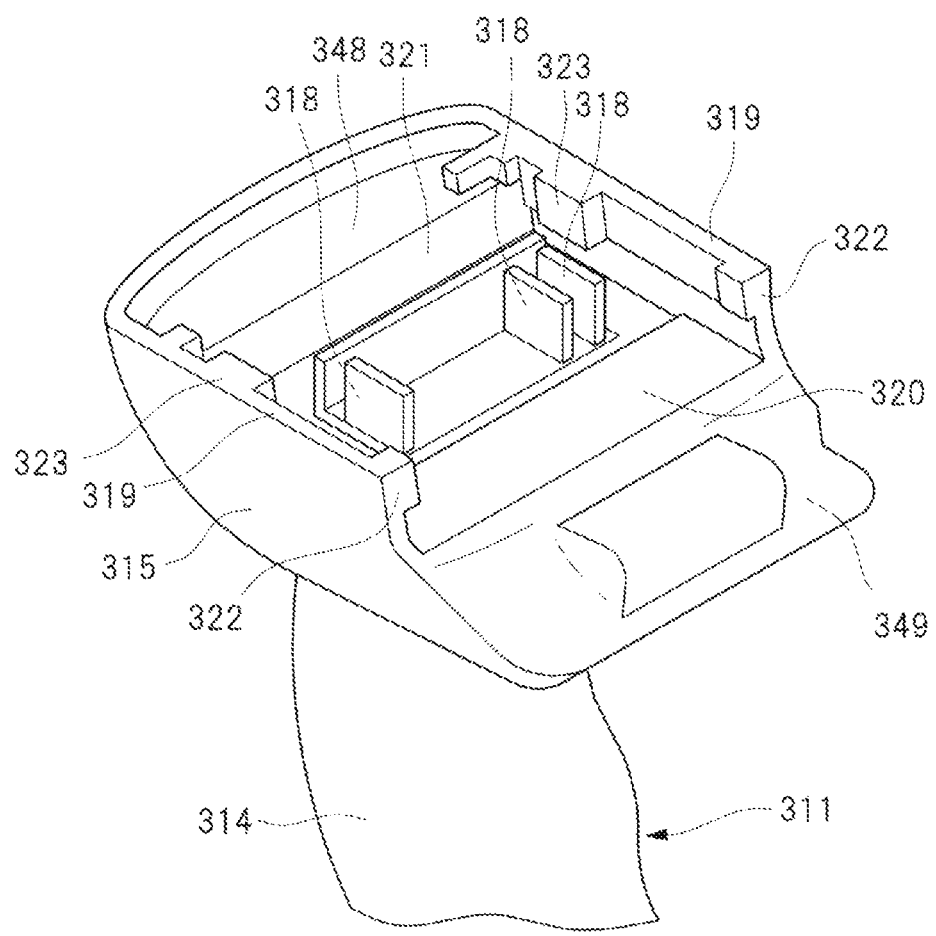
FIG. 43 is a partial perspective view of the electric power tool of FIG. 42.

The casing 313 is connected to one end of the grip 314, and the attachment part 315 is provided at the other end of the grip 314. The grip 314 is internally hollow, and a control board which controls the electric motor 316 is provided inside the grip 314. The control board is not illustrated for the sake of convenience. Also, as illustrated in FIG. 43, the attachment part 315 is provided with a plurality of, for example, three tool-side terminals 318. The plurality of tool-side terminals 318 are made of a metal material having electrical conductivity. The plurality of tool-side terminals 318 are shapes in a plate, and the plurality of tool-side terminals 318 are stood so as to be at a right angle to a flat surface 320 of the attachment part 315. The plurality of tool-side terminals 318 are parallel to each other. The plurality of tool-side terminals 318 are electrically connected to the control board via a cable not illustrated.

The attachment part 315 is provided with two side plates 319. The flat surface 320 is provided between the two side plates 319. A protruding direction of the two side plates 319 from the flat surface 320 is the same as a protruding direction of the plurality of tool-side terminals 318 from the flat surface 320 of the attachment part 315. When the attachment part 315 is viewed in a plane, the two side plates 319 are arranged substantially in parallel to each other. Further, the attachment part 315 is provided with a step part 321, which is at a right angle to the flat surface 320. Still further, the attachment part 315 is provided with a flat surface 348. The flat surface 348 and the flat surface 320 are connected to each other via the step part 321. The flat surface 320 and the flat surface 348 are arranged in different planes from each other but are parallel to each other. The flat surface 320 is provided at a position closer to the grip 314 than the flat surface 348.

Further, the attachment part 315 has an overhang part 349. The overhang part 349 is provided continuously from a side of the flat surface 320 opposite to a location thereof connected with the step part 321. The overhang part 349 is provided at a position closer to the grip 314 than the flat surface 320.

The plurality of tool-side terminals 318 are provided between the two side plates 319. Two protrusions 322 and 323 are provided on respective surfaces of the two side plates 319 on a side of the plurality of tool-side terminals 318. The two protrusions 322 and 323 provided on one side plates 319 are protruded toward the other side plate 319. The two protrusions 322 and 323 are provided with an interval therebetween in a direction along surfaces of the plurality of tool-side terminals 318. Further, a gap is provided between the flat surface 320 and the two protrusions 322 and 323.

Figure 44:
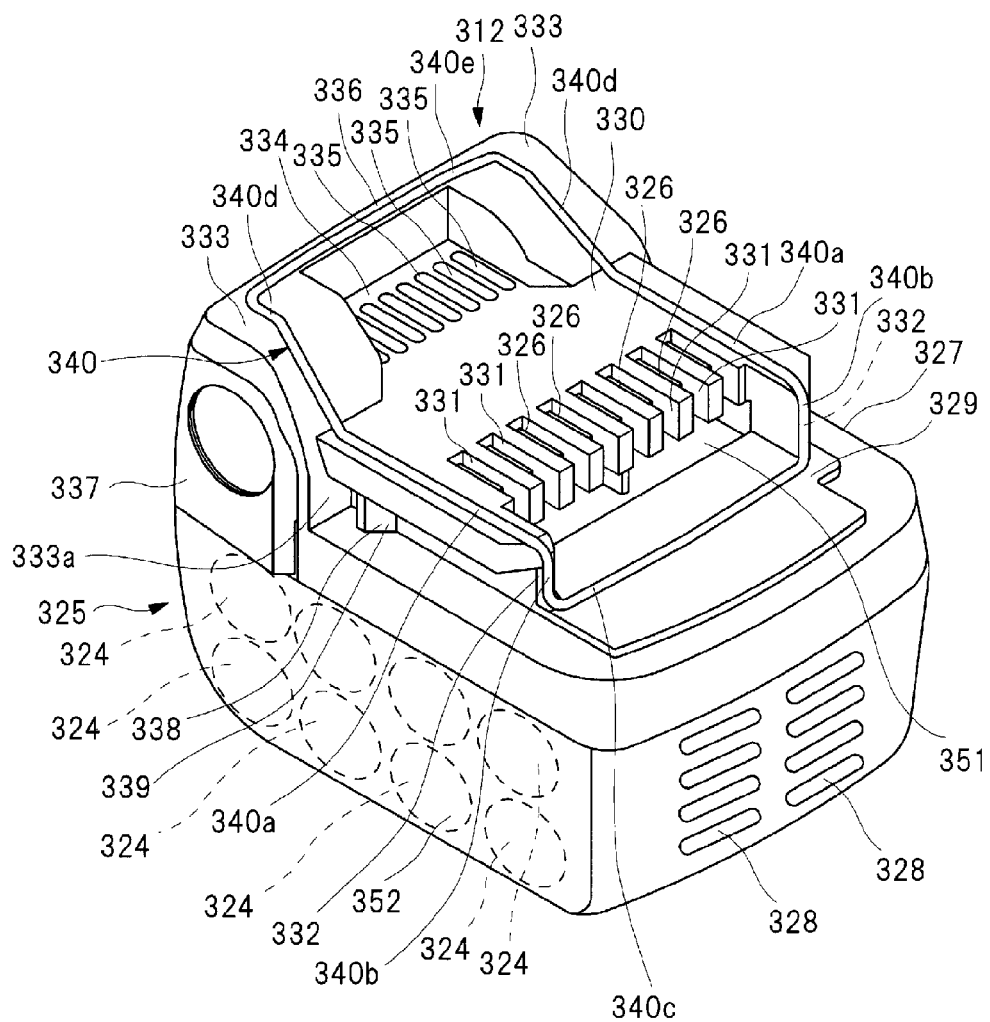
FIG. 44 is a perspective view of the battery pack illustrated in FIG. 42.

The battery pack 312 is attachable/detachable to/from, that is, removable from the attachment part 315. A configuration of the battery pack 312 will be explained based on FIGS. 44 and 45. The battery pack 312 has a plurality of battery cells 324 and a housing case 325 which houses the plurality of battery cells 324. The battery cells 324 are secondary batteries whose charge and discharge can be repeated. As the battery cells 324, a lithium-ion battery cell, a nickel-hydrogen battery cell, a lithium-ion polymer battery cell, a nickel-cadmium battery cell, and others are included. The electrodes of the plurality of battery cells 324 are connected to each other by a connecting plate not illustrated, and the electrodes of the battery cells which are positioned at ends in the connecting direction are connected to the battery-side terminal 326 via a circuit board not illustrated. The plurality of battery-side terminals 326 are provided.

The housing case 325 has a case main body 352 and a cover 327 which covers an opening of the case main body 352. Both of the case main body 352 and the cover 327 are separately made by using a non-electrically-conductive material. As the non-electrically-conductive material, a resin is included. The case main body 352 is provided with a plurality of vent holes 328. The plurality of vent holes 328 connect between the inside and the outside of the housing case 325.

The cover 327 is provided with a flat plate part 329 and a mount part 330 whose height is different from that of the plate part 329. The mount part 330 is provided with a plurality of terminal insertion holes 331. The plurality of terminal insertion holes 331 are formed in a slit shape. The plurality of terminal insertion holes 331 communicate between the inside and the outside of the housing case 325. The plurality of battery-side terminals 326 are separately inserted into the plurality of terminal insertion holes 331.

Further, an opening 351 is provided between the plurality of terminal insertion holes 331 and the plate part 329. The opening 351 is connected to the plurality of terminal insertion holes 331.

Further, two connecting parts 332 which connect between a surface of the mount part 330 and a surface of the plate part 329 are formed. The two connecting parts 332 are provided continuously from ends of the plate part 329. The surface of the mount part 330 and the surface of the plate part 329 are at different heights from each other, and besides, extension lines of the two surfaces are parallel to each other. The extension lines are not illustrated. Also, protruding parts 333 which are higher than the mount part 330 are provided at two locations at an end of the cover 327 opposite to the plate part 329. A concave part 334 is provided between the two protruding parts 333.

Further, vent holes 335 which penetrate through the concave part 334 are provided. The vent holes 335 connect between the inside and the outside of the housing case 325. The battery pack 312 is connected to a charger not illustrated, so that the battery cells 324 can be charged. When the battery cells 324 are charged, cooling air is sent to the inside of the housing case 325 through the vent holes 335, and the cooling wind is exhausted to the outside of the housing case 325 through the vent holes 328. Further, a connecting part 336 which connects between the protruding parts 333 is provided.

Further, operation buttons 337 are attached to both sides of the protruding parts 333 of the housing case 325. The operation buttons 337 are attached to the housing case 325 so as to rotate across a supporting shaft not illustrated within a range of a predetermined angle. Also, the operation buttons 337 are provided with latches 338, and the latches 338 are inserted into holes 339 which are provided in the cover 327. The tips of the latches 338 are exposed from the holes 339 to the outside. The operation buttons 337 are pushed toward the outside of the housing case 325 by an elastic member not illustrated.

A seal member 340 is attached to a surface of the cover 327. The seal member 340 is integrally molded by using a material having a water-proof property such as a rubber-like elastic body or silicon. The seal member 340 is attached across the plate part 329, the connecting parts 332, the mount part 330, the protruding parts 333, and the connecting part 336. The seal member 340 is fixed to the cover 327 by using an adhesive agent. Note that the seal member 340 may be integrated with the cover 327 by two-layer molding in a molding step of the cover 327. Also, parts 340a of the seal member 340 which are attached to the surface of the mount part 330 are linearly extended in a substantially horizontal direction. Further, parts 340b of the seal member 340 which are attached to the connecting parts 332 are extended substantially at a right angle to the plate part 329. Still further, a part 340c of the seal member 340 which is attached to the plate part 329 is extended substantially horizontally. When the cover 327 is viewed in a plane, the parts 340a and the part 340c of the seal member 340 are substantially at right angle to each other.

Further, when the cover 327 is viewed in a plane, parts 340d of the seal member 340 which are attached to the protruding parts 333 are substantially linearly extended. Further, when the cover 327 is viewed in a plane, a part 340e of the seal member 340 which is attached to the connecting part 336 is parallel to the part 340c. In this manner, the seal member 340 is configured to have an endless shape in the planar view of the cover 327. More specifically, the seal member 340 is provided so as to surround the plurality of terminal insertion holes 331, the opening 351, and the vent holes 335. Further, when the cover 327 is viewed in a plane, two guide grooves 341 are provided to be elongated in the same plane, and besides, the seal member 340 is provided to have an endless shape.

Figure 45:
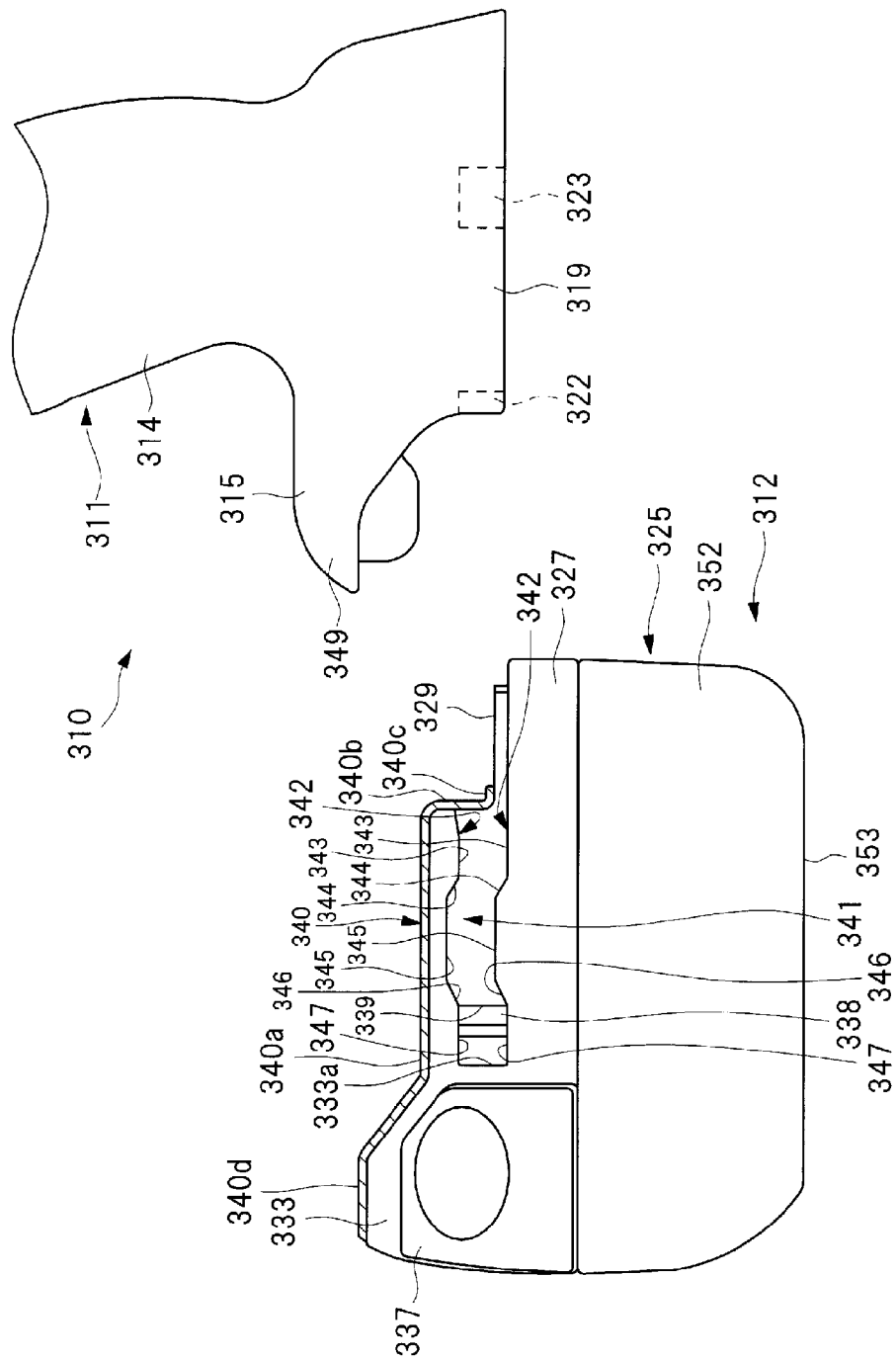
FIG. 45 is a side view of a state in which the battery pack is detached from a tool main body in the electric power tool illustrated in FIG. 42.

On the other hand, as illustrated in FIG. 45, the guide grooves 341 are provided on parallel side surfaces of the mount part 330, respectively. Note that FIG. 45 illustrates only one guide groove 341 for the sake of convenience. The two guide grooves 341 have a structure in which the direction of the relative movement between the battery pack 312 and the attachment part 315 is regulated during the attachment of the battery pack 312 to the attachment part 315 and during the detachment of the battery pack 312 from the attachment part 315. The two guide grooves 341 are extended in a direction parallel to the parts 340a of the seal member 340. The guide grooves 341 have a pair of guide surfaces 342. The pair of guide surfaces 342 are provided at different positions from each other in the protruding direction of the mount part 330, that is, the height direction thereof. The protrusions 322 and 323 are movable inside the guide grooves 341.

And, in a state that a bottom surface 353 of the case main body 352 is horizontal, the pair of guide surfaces 342 are parallel to each other in a plane in a perpendicular direction. Each of the pair of guide surfaces 342 has a first horizontal surface 343 which is horizontal and a first tilted surface 344 which is formed continuously from the first horizontal surface 343 and which is tilted upward.

The above-described phrase "upward (up)" means an upper side in the height direction. Also, each of the pair of guide surfaces 342 has a second horizontal surface 345 which is formed continuously from the first tilted surface 344 opposite to the first horizontal surface 343 and a second tilted surface 346 which is formed continuously from an end of the second horizontal surface 345 opposite to the first tilted surface 344. Further, each of the pair of guide surfaces 342 has a third horizontal surface 347 which is formed continuously from an end of the second tilted surface 346 opposite to the second horizontal surface 345. The third horizontal surface 347 is provided at a location of the guide groove 341 which is the closest to the protruding parts 333. A hole 339 is arranged in the guide groove 341 between the third horizontal surfaces 347 and the second tilted surfaces 346.

Next, an operation of attaching, in other words, installing the battery pack 312 to the attachment part 315 of the tool main body 311 will be explained. First, as illustrated in FIG. 45, the electric power tool 310 and the battery pack 312 are arranged so that the two guide grooves 341 and the protrusions 322 and 323 are positioned on the same straight line. Then, by approaching the electric power tool 310 and the battery pack 312 each other, the protrusions 322 enter the guide grooves 341. That is, the attachment part 315 and the battery pack 312 are relatively moved along the guide grooves 341. Here, for the sake of convenience, explanation will be made with taking such an example that the attachment part 315 and the battery pack 312 are relatively moved when the bottom surface 353 of the case main body 352 is substantially horizontal as illustrated in FIG. 45. Also, for the sake of convenience, such an example that the attachment part 315 is moved in the horizontal direction without moving the battery pack 312 will be explained.

Figure 46:
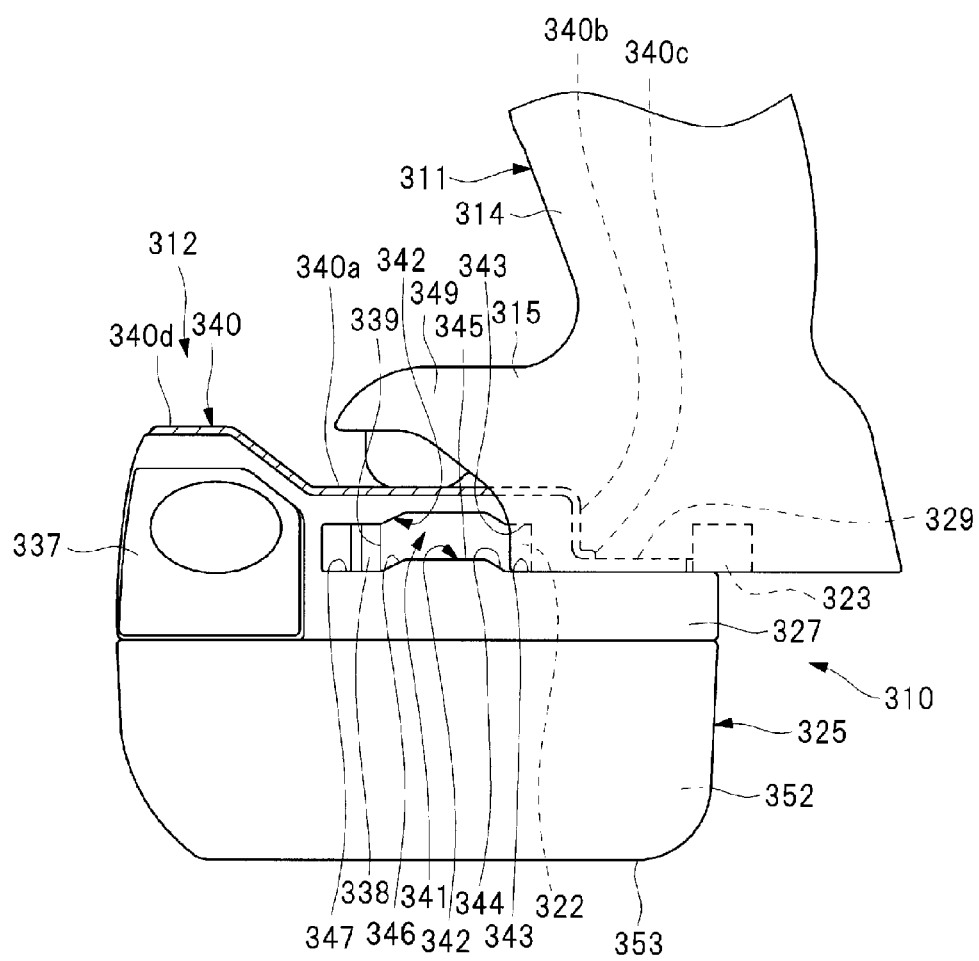
FIG. 46 is a side view taken during attachment of the battery pack to the tool main body in the electric power tool illustrated in FIG. 42.

As illustrated in FIG. 46, the protrusions 322 which have been moved into the guide grooves 341 are guided along the first horizontal surfaces 343, and the attachment part 315 is moved in the substantially horizontal direction. Then, the protrusions 322 are guided by the first tilted surfaces 344, so that the attachment part 315 is obliquely moved so as to gradually ascend. Further, the protrusions 322 are guided by the second horizontal surfaces 345, so that the attachment part 315 is moved in the horizontal direction. Still further, the protrusions 322 are guided by the second tilted surfaces 346, so that the attachment part 315 is obliquely moved in a descending direction. The protrusions 322 are guided by the second tilted surfaces 346, so that the seal member 340 is in contact with the attachment part 315 during the approach of the attachment part 315 to the cover 327, and besides, the seal member 340 is elastically deformed by the moving force of the attachment part 315. Further, the protrusions 322 are guided by the third horizontal surfaces 347, so that the attachment part 315 is moved in the horizontal direction.

Figure 47:
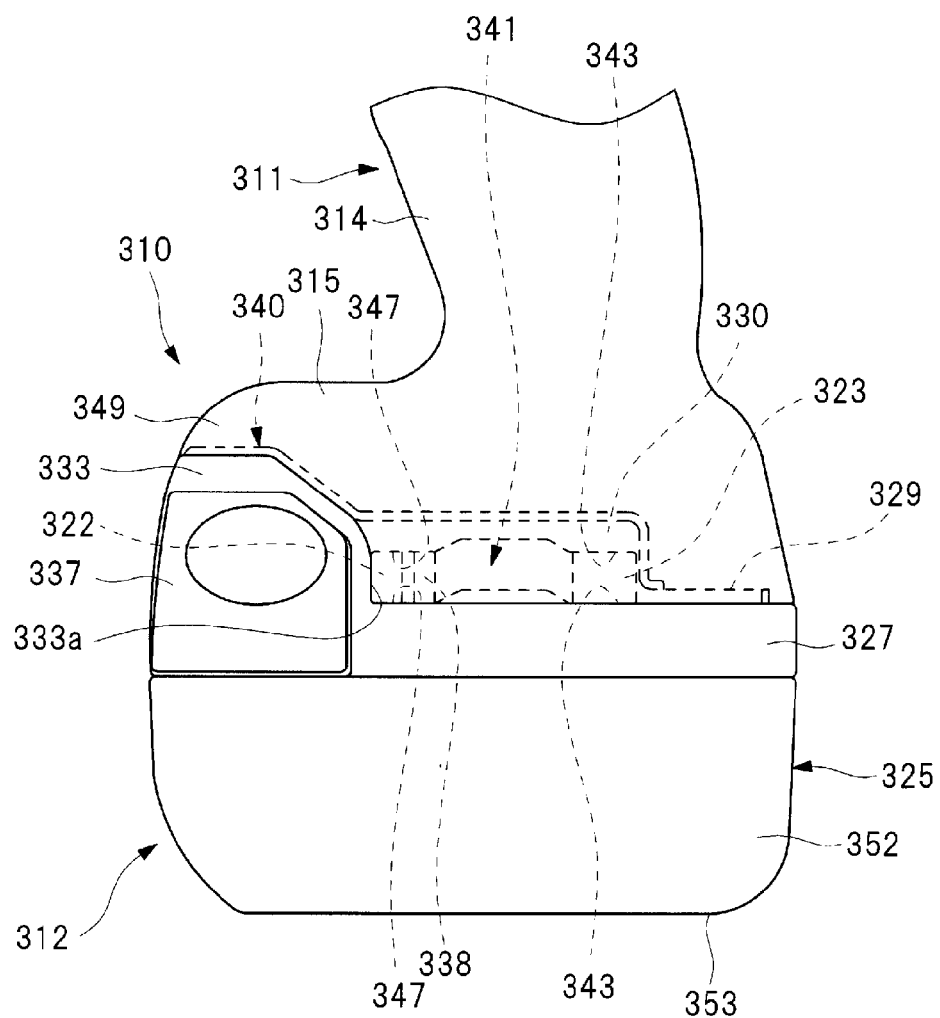
FIG. 47 is a side view of a state in which the battery pack is attached to the tool main body in the electric power tool illustrated in FIG. 42.
Figure 48:
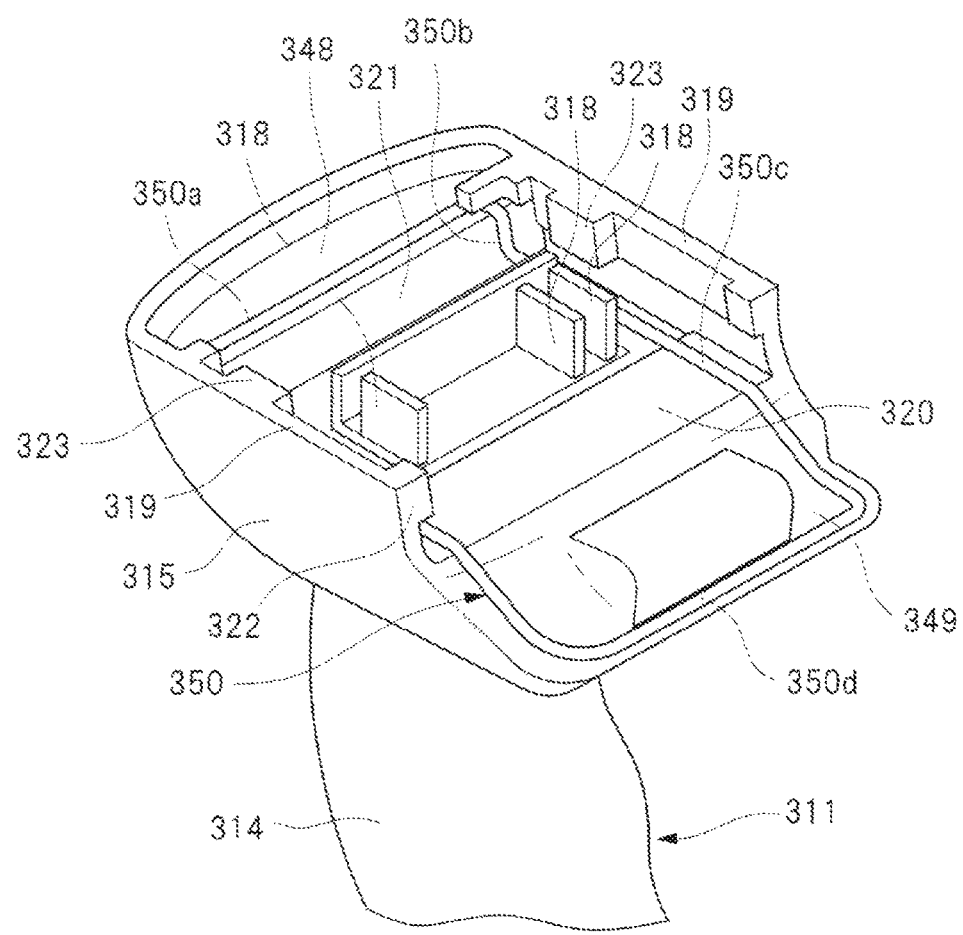
FIG. 48 is a partial perspective view illustrating an electric power tool according to a thirteenth embodiment of the present invention.

Here, the latches 338 are pushed by the protrusions 322 and are moved toward the inside of the cover 327. The protrusions 322 are moved while being in contact with the latches 338. At this time, the protrusions 323 are moved into the guide grooves 341. Then, as illustrated in FIG. 47, when the protrusions 322 are moved over the latches 338, the latches 338 are moved toward the outside of the cover 327 by the force of the elastic members, and the protrusions 322 and the latches 338 are engaged with each other. Also, when the protrusions 322 are in contact with end surfaces 333a of the protruding parts 333, the movement of the attachment part 315 with respect to the cover 327 is stopped.

In this manner, the attachment of the battery pack 312 to the attachment part 315 is completed. Note that, during a period of time from the moving of the protrusions 322 into the guide grooves 341 until the completion of the attachment of the battery pack 312 to the attachment part 315, the tool-side terminals 318 are moved into the terminal insertion holes 331 so that the tool-side terminals 318 and the battery-side terminals 326 are connected to each other. Therefore, in the electric power tool 310, electric power of the battery cell 324 can be supplied to the electric motor 316.

In the electric power tool 310 of the twelfth embodiment, during a period of time from the insertion of the protrusions 322 into the guide grooves 341 until a point prior to the protrusions 322 and the latches 338 are engaged with each other, the seal member 340 is not in contact with the attachment part 315. That is, during the attachment of the battery pack 312 to the attachment part 315, a gap is formed between the seal member 340 and the attachment part 315. Then, when the protrusions 322 and the latches 338 are engaged with each other, the seal member 340 is in contact with the attachment part 315 to form a seal surface. In a specific explanation, the parts 340d and 340e of the seal member 340 are adhered with a surface of the overhang part 349. Also, the parts 340a of the seal member 340 are adhered with the flat surface 320. Further, the parts 340b of the seal member 340 are adhered with the step part 321. Still further, the part 340c of the seal member 340 is adhered with the flat surface 348.

Therefore, the seal member 340 prevents the entering of the foreign substances into the part between the attachment part 315 and the cover 327. For example, the seal member 340 can prevent the entering of the foreign substances into the contact parts between the battery-side terminals 326 and the tool-side terminals 318. Also, the seal member 340 can prevent the entering of the foreign substances into the inside of the housing case 325 through the terminal insertion holes 331, the vent holes 335, and the opening 351.

As the foreign substances in the present invention, water, dust, sand, mud, and others are included. Note that, when the protrusions 322 and the latches 338 are engaged with each other, the detachment of the battery pack 312 from the attachment part 315 can be prevented even when the force in the direction of detaching the battery pack 312 from the attachment part 315 functions. Further, in the state that the protrusions 322 and the latches 338 are engaged with each other, the protrusion 323 is in contact with the first horizontal surface 343, and the protrusion 322 is in contact with the third horizontal surface 347. That is, the cover 327 and the attachment part 315 are in contact with each other at two locations in a plane in the perpendicular direction.

Note that, when the battery pack 312 is detached from the attachment part 315, by pushing the operation buttons 337 so as to move the latches 338 toward the inside of the cover 327, the engagement between the latches 338 and the protrusions 322 is released. Then, in FIG. 47, the attachment part 315 is moved rightward without moving the battery pack 312. Accordingly, the protrusions 322 are guided along the third horizontal surfaces 347, the second tilted surfaces 346, the second horizontal surfaces 345, the first tilted surfaces 344, and the first horizontal surfaces 343. Then, both of the protrusions 322 and 323 are withdrawn from the guide grooves 341, so that the battery pack 312 is detached from the attachment part 315.

In this manner, in the electric power tool 310 of the twelfth embodiment, in the process of attaching the battery pack 312 to the attachment part 315 of the tool main body 311, the attachment part 315 is guided so as to separate from the cover 327 once by the protrusions 322 and at least one of the guide grooves 341 and the first tilted surfaces 344. Therefore, a space between the seal member 340 and the attachment part 315 is widened once. Then, the protrusions 322 are guided so as to approach the cover 327 along the guide grooves 341 and the second tilted surfaces 346, and therefore, the seal member 340 is in contact with and is compressed by the attachment part 315 to form the seal surface, and the protrusions 322 are engaged with the latches 338.

On the other hand, in the process of detaching the battery pack 312 from the attachment part 315 of the tool main body 311, the space between the seal member 340 and the attachment part 315 is widened once by the second tilted surfaces 346. Therefore, contact and friction of the seal member 340 with the attachment part 315 can be suppressed in both of the case of attaching the battery pack 312 to the attachment part 315 and the case of detaching the battery pack 312 from the attachment part 315. Therefore, the wearing of the seal member 340 and the peel-off of the seal member 340 from the cover 327 can be prevented, and the sealing property and durability of the seal member 340 are improved.

Note that, as a method selected when the battery pack 312 is attached to the attachment part 315 or when the battery pack 312 is detached from the attachment part 315, a method of moving the attachment part 315 without moving the battery pack 312, a method of moving the battery pack 312 without moving the attachment part 315, and a method of moving both of the battery pack 312 and the attachment part 315 are included. In the electric power tool 310 of the twelfth embodiment, the effects similar to those described above can be obtained even when any of the above-described methods is selected.

Thirteenth Embodiment

Next, an electric power tool of the thirteenth embodiment will be explained based on FIGS. 42 and 48 to 50. In the electric power tool 310 of the thirteenth embodiment, a seal member 350 is attached to the attachment part 315. Also, in the electric power tool 310 of the thirteenth embodiment, the seal member 340 is not attached to the cover 327. The seal member 350 is integrally molded by using a material having a water-proof property such as a rubber-like elastic body or silicon. The seal member 350 is attached across the surface of the overhang part 349, the flat surface 320, the step part 321, and the flat surface 348. The seal member 350 is fixed to the attachment part 315 by using an adhesive agent. Alternatively, the seal member 350 may be integrated with the attachment part 315 by two-layer molding in a molding step of the attachment part 315. Also, a part 350a of the seal member 350 which is attached to the surface of the flat surface 348 is linearly extended in the substantially horizontal direction.

Further, parts 350b of the seal member 350 which are attached to the step part 321 are extended substantially at a right angle to the flat surface 320. Still further, parts 350c of the seal member 350 which are attached to the flat surface 320 are extended substantially horizontally. A part 350d of the seal member 350 which is attached to the surface of the overhang part 349 is bent in a U-shape. In this manner, when the attachment part 315 is viewed in a plane, the protrusions 322 and 323 are provided at different locations from each other in the same plane, and the seal member 350 is provided to have an endless shape, that is, an annular shape as a whole in the plane. The other configurations of the electric power tool 310 of the thirteenth embodiment are the same as the configurations of the electric power tool 310 of the twelfth embodiment.

Figure 49:
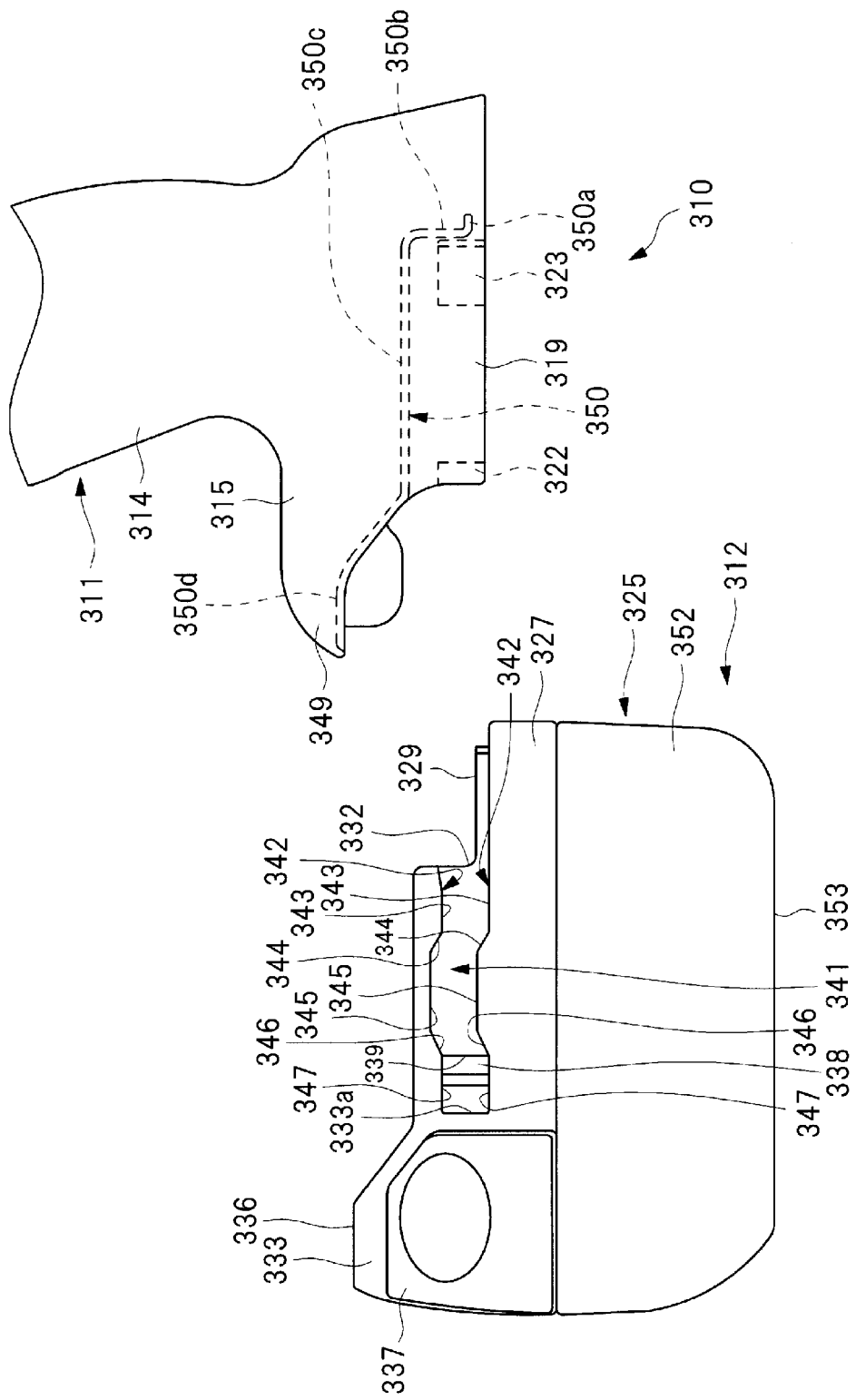
FIG. 49 is a partial side view of the electric power tool illustrated in FIG. 48.
Figure 50:
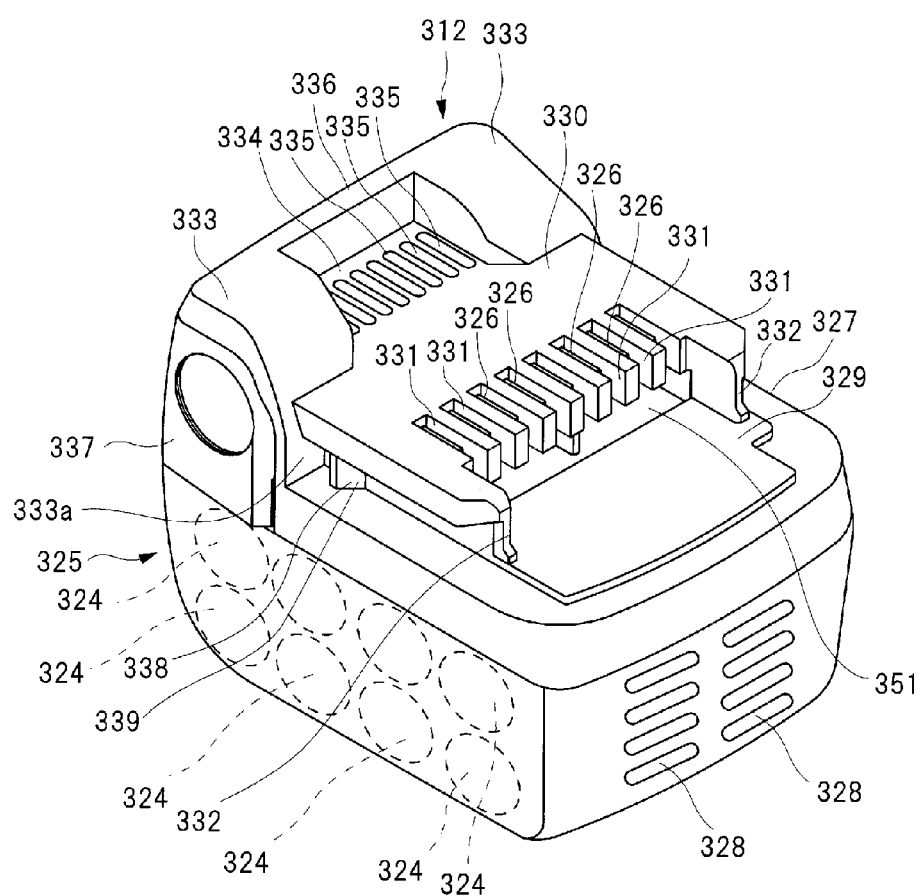
FIG. 50 is a perspective view of a battery pack illustrated in FIG. 49.

Next, an operation of attaching, that is, installing the battery pack 312 illustrated in FIG. 49 to the attachment part 315 of the tool main body 311 will be explained. First, the tool main body 311 and the battery pack 312 are arranged so that the two guide grooves 341 and the protrusions 322 and 323 are positioned on the same straight line. Then, when the tool main body 311 and the battery pack 312 are approached by each other, the protrusions 322 are moved into the guide grooves 341. That is, the attachment part 315 and the battery pack 312 are relatively moved along the guide grooves 341. Accordingly, as similar to the electric power tool 310 of the twelfth embodiment, the protrusions 322 are guided by the first horizontal surfaces 343. Then, the attachment part 315 is separated from the cover 327 by guiding the protrusions 322 by the first tilted surfaces 344. That is, the space between the seal member 350 and the cover 327 is widened once. Further, the protrusions 322 are guided along the second horizontal surfaces 345. Then, the cover 327 is approached by the attachment part 315 by guiding the protrusions 322 along the second tilted surfaces 346. Therefore, the seal member 350 is in contact with the surface of the cover 327, and besides, the seal member 350 is elastically deformed by the moving force of the attachment part 315. Then, when the protrusions 322 are moved over the latches 338, the protrusions 322 are engaged with the latches 338, and the protrusions 323 are stopped in a state that the protrusions are in contact with the first horizontal surfaces 343. Also in the electric power tool 310 of the thirteenth embodiment, in the process of attaching the battery pack 312 to the attachment part 315, the tool-side terminals 318 are moved into the terminal insertion holes 331, and the tool-side terminals 318 and the battery-side terminals 326 are connected to each other.

Further, also in the electric power tool 310 of the thirteenth embodiment, when the battery pack 312 is attached to the attachment part 315, the seal member 350 is not in contact with the cover 327 in a stage subsequent to the insertion of the protrusions 322 into the guide grooves 341 but prior to the engagement of the protrusions 322 with the latches 338. Then, at the moment of the engagement of the protrusions 322 with the latches 338, the seal member 350 is in contact with the cover 327 to form the seal surface having the endless shape. That is, the seal member 350 forms the annular seal surface so as to surround the vent holes 335, the connecting parts between the battery-side terminals 326 and the tool-side terminals 318, the terminal insertion holes 331, the opening 351, etc.

In a specific explanation, the part 350d of the seal member 350 is adhered with the protruding parts 333 and the connecting part 336. Also, the parts 350c of the seal member 350 are adhered with the surface of the mount part 330. Further, the parts 350b of the seal member 350 are adhered with the connecting parts 332. Still further, the part 350a of the seal member 350 is adhered with the surface of the plate part 329. Therefore, the seal member 350 prevents the entering of the foreign substances into the part between the attachment part 315 and the cover 327. For example, the seal member 350 can prevent the entering of the foreign substances into the connecting parts between the battery-side terminals 326 and the tool-side terminals 318. Also, it can prevent the entering of the foreign substances into the housing case 325 through the vent holes 335, the opening 351, and the terminal insertion holes 331. The other effects of the electric power tool 310 of the thirteenth embodiment are the same as the effects of the electric power tool 310 of the twelfth embodiment.

Further, in the electric power tool 310 of the thirteenth embodiment, in the process of attaching the battery pack 312 to the attachment part 315 of the tool main body 311, the space between the seal member 350 and the cover 327 is widened once, and the protrusions 322 are engaged with the latches 338, and then, the seal member 350 is in contact with the cover 327 to form the seal surface. On the other hand, in the process of detaching the battery pack 312 from the attachment part 315 of the tool main body 311, the space between the seal member 350 and the cover 327 is widened once. Therefore, both in the case of the attachment of the battery pack 312 to the attachment part 315 and in the case of the detachment of the battery pack 312 from the attachment part 315, contact and friction of the seal member 350 with the cover 327 can be suppressed. Therefore, the wearing of the seal member 350 and the peel-off of the seal member 350 from the attachment part 315 can be prevented, and the sealing property and durability of the seal member 350 are improved.

Note that, as the method selected when the battery pack 312 is attached to the attachment part 315 or when the battery pack 312 is detached from the attachment part 315, a method of moving the attachment part 315 without moving the battery pack 312, a method of moving the battery pack 312 without moving the attachment part 315, and a method of moving both of the battery pack 312 and the attachment part 315 are included. In the electric power tool 310 of the thirteenth embodiment, similar effects can be obtained even when any of the above-described methods is selected.

Here, a correspondence relation between the configuration explained in the present embodiment and the configuration of the present invention will be explained. The electric power tool 310 corresponds to an electric device of the present invention, the tool main body 311 corresponds to an electric-device main body of the present invention, the guide grooves 341 and the protrusions 322 and 323 correspond to a guide mechanism of the present invention, the guide grooves 341 and the protrusions 322 correspond to a contact preventing mechanism of the present invention, the latches 338 and the protrusions 322 correspond to a retaining mechanism of the present invention, the protrusions 322 correspond to latch hooks of the present invention, and the tool-side terminals 318 correspond to device-side terminals of the present invention. Also, the vent holes 335, the opening 351, the terminal insertion holes 331, and the connecting parts between the battery-side terminals 326 and the tool-side terminals 318 are included in the sealing target part of the present invention.

Fourteenth Embodiment

Figure 51:
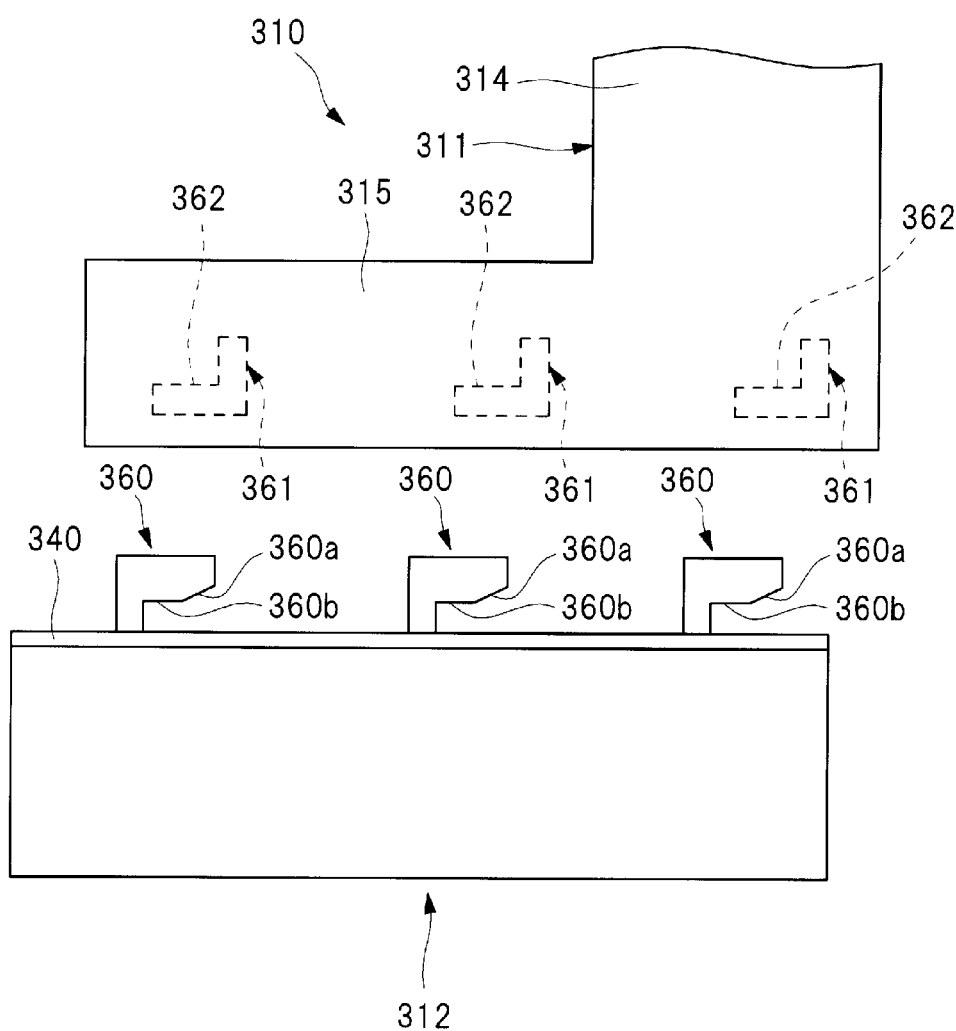
FIG. 51 is a schematic side view illustrating an electric power tool according to a fourteenth embodiment of the present invention.

Next, an electric power tool 310 of a fourteenth embodiment will be explained based on FIG. 51. The battery pack 312 is provided with a plurality of L-shaped guide parts 360 corresponding to the guide grooves 341 of the above-described embodiment. Further, the battery pack 312 is provided with the seal member 340 as similar to the above-described embodiment. The seal member 340 is attached to an upper surface of the battery pack 312. Each of the guide parts 360 has a tilted surface 360a and a flat surface 360b coupled to the tilted surface 360a. The flat surface 360b is parallel to the upper surface of the battery pack 312. The tilted surface 360a is tilted so as to intersect with the flat surface 360b. Note that the battery pack 312 is provided with latches which are not illustrated, and the attachment part 315 is provided with protrusions which are to be engaged with the latches. Illustration of the protrusions is omitted in FIG. 51. Also, tool-side terminals not illustrated are provided in the attachment part 315, and the battery-side terminals not illustrated are provided in the battery pack 312. The seal member 340 is provided in the battery pack 312 so as to surround the periphery of the battery-side terminals.

On the other hand, the attachment part 315 is provided with a plurality of protrusions 361 which are to be engaged with the guide parts 360. Each of the protrusions 361 is provided with a flat surface 362. The flat surface 362 is parallel to an end of the attachment part 315. When the battery pack 312 is attached to the attachment part 315, the battery pack 312 is approached by the attachment part 315 from above the battery pack 312, and the attachment part 315 is moved leftward in the drawing with respect to the battery pack 312. The flat surfaces 362 of the protrusions 361 are moved leftward along the tilted surfaces 360a of the guide parts 360, and besides, the flat surfaces 362 approach the battery pack 312 along the tilted surfaces 360a. Here, during from the start of the operation of attaching the battery pack 312 to the attachment part 315 until the completion of the operation, the seal member 340 is not in contact with the attachment part 315. And, when the protrusions are engaged with the latches so that the operation of attaching the battery pack 312 to the attachment part 315 is completed, the seal member 340 is in contact with the attachment part 315 to form the seal surface.

On the other hand, in a case that the battery pack 312 is detached from the attachment part 315, when the battery pack 312 and the attachment part 315 are relatively moved, the protrusions 361 are moved along the guide parts 360, so that the battery pack 312 is detached from the attachment part 315 without contact and friction of the seal member 340 with the attachment part 315. In this manner, also in the electric power tool 310 of the fourteenth embodiment, as similar to the electric power tools 310 of the twelfth embodiment and the thirteenth embodiment, the peel off of the seal member 340 can be prevented in both of the case of the attachment of the battery pack 312 to the attachment part 315 and the case of the detachment of the battery pack 312 from the attachment part 315.

Also, in the state that the latches are engaged with the protrusions in the attachment of the battery pack 312 to the attachment part 315, the seal member 340 is in contact with the attachment part 315. Therefore, the sealing property between the battery pack 312 and the attachment part 315 can be improved. Note that the seal member 340 may be provided in the attachment part 315, and the flat surface 360b may be not provided in the guide part 360. A correspondence relation between the configuration explained in the fourteenth embodiment and the configuration of the present invention will be explained. The guide part 360 and the protrusion 361 correspond to the guide mechanism and the contact preventing mechanism of the present invention.

The electric device of the present invention is not limited to the electric power tool of the twelfth embodiment to the electric power tool of the fourteenth embodiment, and various modifications can be made within the scope of the invention. For example, the electric device of the present invention includes an electric power tool having a structure in which an attachment part is provided with a guide groove and a cover is provided with a latch hook. The above-described guide groove and the latch hook are not illustrated. Also, the battery pack of the present invention includes a structure that houses battery cells less than eight or a structure that houses nine or more battery cells.

The present invention is not limited to the first embodiment to the fourteenth embodiment, and various modifications can be made within the scope of the invention. For example, in addition to the above-described electric power tools, the electric device of the present invention includes a grinder, a sander, a nail driver, a screwdriver, a tacker, a dust collector, a blower, a pump, a high-pressure washer, a chainsaw, a grass cutter, a hedge trimmer, a cultivator, and others. That is, the electric devices of the present invention include a device in which rotary motion caused by rotating an electric motor by electric power of a battery pack is converted into at least reciprocating motion or rotary motion of an operating member. Also, the electric devices of the present invention include a torchlight and others. That is, the electric devices of the present invention include a lighting device in which electric energy which is supplied from the battery pack is converted into optical energy.

INDUSTRIAL APPLICABILITY

The present invention can be utilized in, for example, a portable electric device to/from which a battery pack is attachable/detachable; the battery pack which is attachable/detachable to/from the electric device; and a portable electric apparatus configured by combining the electric device and the battery pack.

The invention claimed is:
1. An electric device comprising:
a battery pack retaining a battery cell and having battery-side terminals; and
a device main body having an attachment part to/from which the battery pack is attached/detached, wherein the device main body includes:
a guide mechanism which is provided to the attachment part and which regulates a direction in which the device main body and the battery pack are relatively moved to each other when the battery pack is attached/detached to/from the device main body, a terminal holder which is provided to the attachment part and in which is embedded a plurality of device-side terminals mechanically connected to the battery-side terminals when the battery pack is attached to the attachment part; and a seal member which is disposed between the attachment part and the terminal holder, the seal member preventing foreign substances from inside the device main body from entering between the attachment part and the terminal holder so that foreign substances are prevented from entering between the device-side terminals of the device main body and the battery-side terminals of the battery pack, and the seal member is attached to an outer periphery of the terminal holder, and the terminal holder is clamped and fixed to the attachment part via the seal member.

2. The electric device according to claim 1, wherein the seal member is further disposed between the attachment part and the battery pack when the battery pack is attached to the attachment part.

3. The electric device according to claim 1, wherein
the battery pack comprises a housing case housing the battery cell, and
the seal member contacts the housing case when the battery pack is attached to the attachment part.

4. The electric device according to claim 1, wherein
an annular inner groove is formed on an inner periphery of the seal member, and the terminal holder is attached to the seal member via the annular inner groove, and
an annular outer groove is formed on an outer periphery of the seal member, and the seal member is attached to the attachment part via the annular outer groove.

5. The electric device according to claim 1,
wherein the battery pack is provided with a housing case which houses the battery cell,
the housing case has a plate part and a mount part which are connected to each other via a connecting surface and which have different heights from each other, and
the seal member is provided over the mount part, the connecting surface, and the plate part.

6. The electric device according to claim 1, wherein the seal member surrounds the terminal holder.

7. The electric device according to claim 6, wherein the seal member entirely surrounds the terminal holder.

* * * * *